(12) United States Patent
Sapp et al.

(10) Patent No.: US 12,706,261 B2
(45) Date of Patent: Aug. 11, 2026

(54) VOLTAGE TRANSFORMER DISCONNECT SWITCH FOR UTILITY METERING SECTIONS OF A MEDIUM VOLTAGE SWITCHGEAR

(71) Applicant: IEM NEW SUB 2, LLC, Fremont, CA (US)

(72) Inventors: Dennis Wayne Sapp, Manteca, CA (US); Ashok Kulkarni, Fremont, CA (US); Jose Gonzalez, Stockton, CA (US)

(73) Assignee: IEM NEW SUB 2, LLC, Fremont, CA (US)

( * ) Notice: Subject to any disclaimer, the term of this patent is extended or adjusted under 35 U.S.C. 154(b) by 280 days.

(21) Appl. No.: 18/443,344

(22) Filed: Feb. 16, 2024

(65) Prior Publication Data

US 2025/0266222 A1 Aug. 21, 2025

(51) Int. Cl.
*H01H 21/22* (2006.01)
*H02B 1/04* (2006.01)

(52) U.S. Cl.
CPC ............... *H01H 21/22* (2013.01); *H02B 1/04* (2013.01)

(58) Field of Classification Search
CPC ...... H01H 33/6661; H01H 9/104; H01H 1/20; H01H 21/22; H01H 2033/6623;
(Continued)

(56) References Cited

U.S. PATENT DOCUMENTS 3,824,359 A * 7/1974 Date .................... H01H 33/127 218/10
4,139,747 A * 2/1979 Kelly ..................... H01H 33/02 200/48 KB (Continued)

FOREIGN PATENT DOCUMENTS

CN 114664591 A 6/2022
CN 115603217 A 1/2023

OTHER PUBLICATIONS

European Application No. 25158129.4, "Extended European Search Report", May 21, 2025, 8 pages.

(Continued)

*Primary Examiner* — Michael A Matey
(74) *Attorney, Agent, or Firm* — Kilpatrick Townsend & Stockton LLP

(57) ABSTRACT

A voltage transformer switch assembly (VTSA) including a voltage transformer disconnect switch (VTDS) for a utility metering section of a medium voltage switchgear, is provided. The VTDS includes one switch blade for each phase of a voltage transformer switch input bus. Upper and lower clips allow a tight connection to the switch blades for connecting the VTDS to a main bus or a ground bus. A switch handle operates the VTDS via a drive system. An upper fuse clip bus is connected to the VTDS in a connected ON position using braided copper elements or fuse clips. The fuse clips installed on upper and lower fuse clip buses allow a convenient installation of fuses of a voltage transformer. The VTSA is adapted for a low current rating and multiple voltage ratings. The VTSA is disposed in an enclosure that meets multiple electrical enclosure requirements and that withstands stringent rain tests.

19 Claims, 62 Drawing Sheets

(58) Field of Classification Search
CPC .... H01H 31/02; H01H 33/022; H01H 33/121; H01H 33/666; H01H 71/04; H01H 71/08; H01H 71/125; H01H 85/0241; H01H 9/10; H01H 9/102; H01H 9/16; H01H 9/22; H01H 9/282; H02B 1/04; H02B 1/30; H02B 1/565; H02B 1/20; H02B 1/21; H02B 1/18; H02B 11/04; H02B 11/10; H02B 13/02; H02B 13/0356; H01B 17/42
See application file for complete search history.

(56) References Cited

U.S. PATENT DOCUMENTS 4,263,487 A * 4/1981 Welter .................... H01H 3/30 200/48 KB
4,419,549 A * 12/1983 Osborne .................. H01H 3/36 200/50.16
4,797,516 A * 1/1989 Clark .................... H02B 11/26 361/628
4,866,568 A * 9/1989 Eggebrecht ............ H02B 11/12 361/603
5,483,416 A * 1/1996 Goe, Jr. ................. H02B 11/24 361/600
11,735,385 B2 8/2023 Hanna et al.
2011/0163836 A1* 7/2011 Darr ...................... H01H 9/282 337/143
2011/0176258 A1* 7/2011 Creighton ............. H02B 1/056 361/642
2015/0027987 A1* 1/2015 Senne ................... H01H 33/53 218/94
2016/0141122 A1* 5/2016 Darko ................... H01H 3/227 200/50.01
2019/0052067 A1* 2/2019 Benson ................... H02B 1/14
2023/0411938 A1* 12/2023 Ashtekar ............. H02B 13/075

OTHER PUBLICATIONS

CA3,264,298, “Office Action”, May 29, 2026, 4 pages.
EP25158129.4, “Intention to Grant”, Jun. 23, 2026, 8 pages.

* cited by examiner

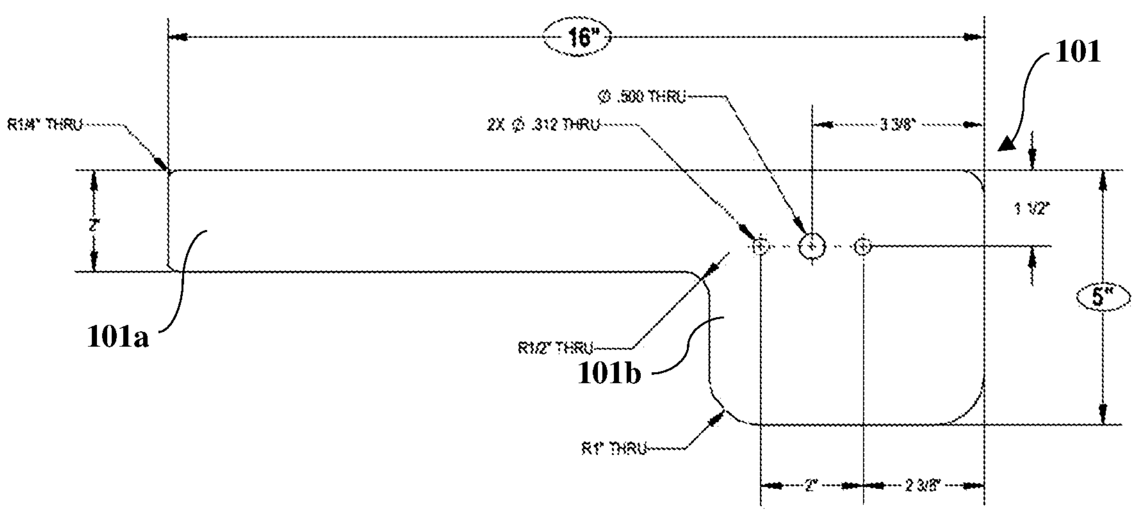
FIG. 2
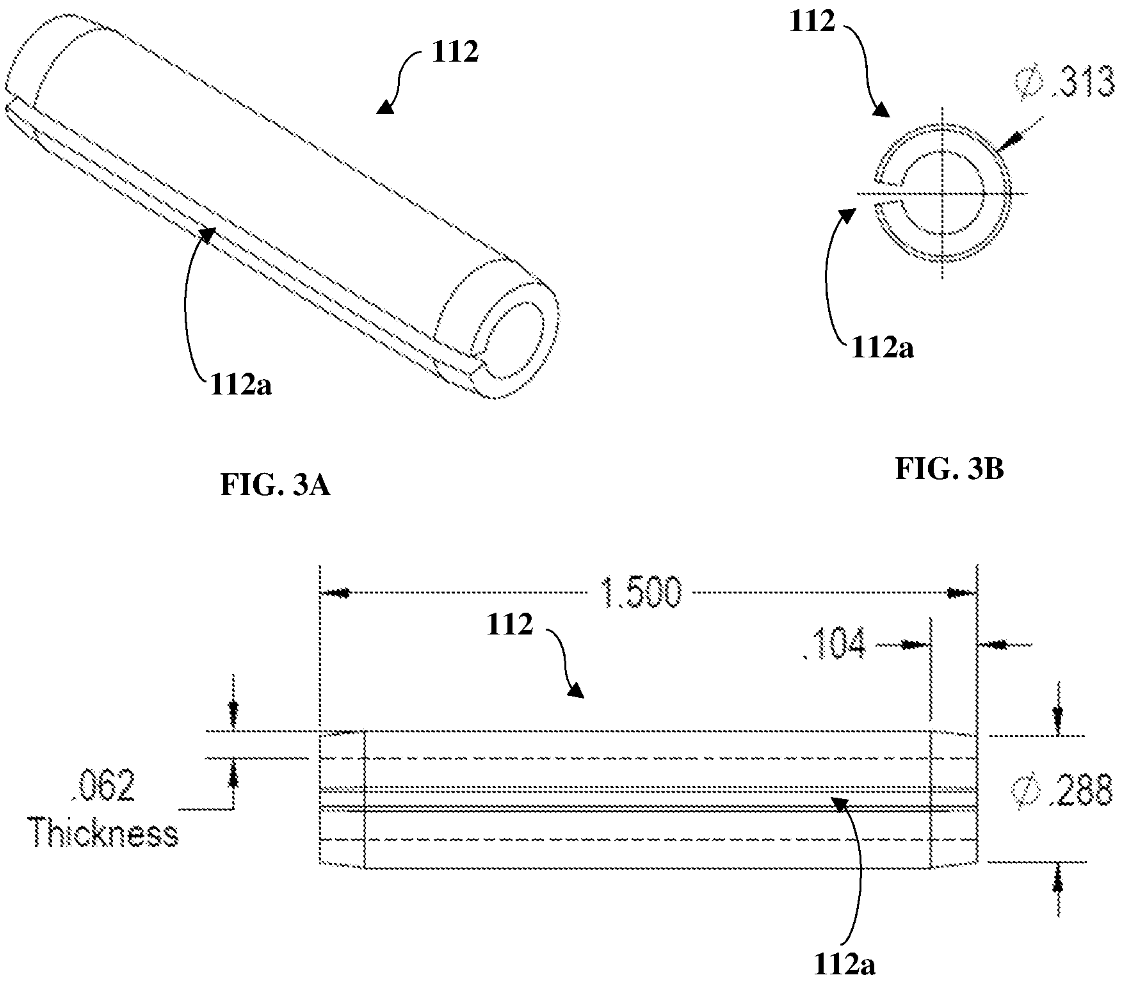
FIG. 3A
FIG. 3B
FIG. 3C 500
110
100
101
102a
515
513

500
515
110
110c
110b
110a
507
513
514
100
509a
512
509b
516

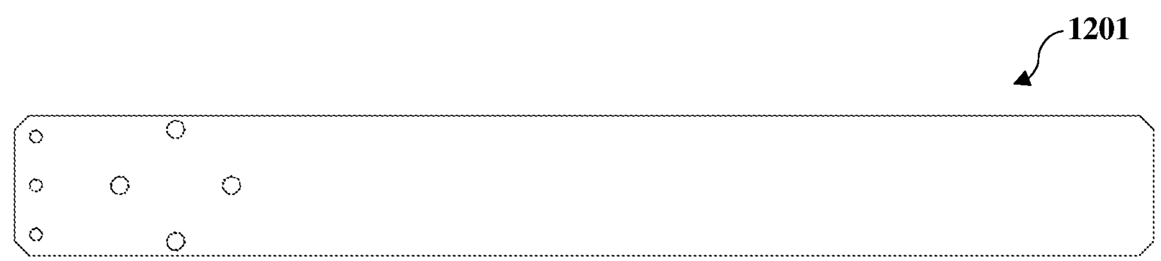
FIG. 14
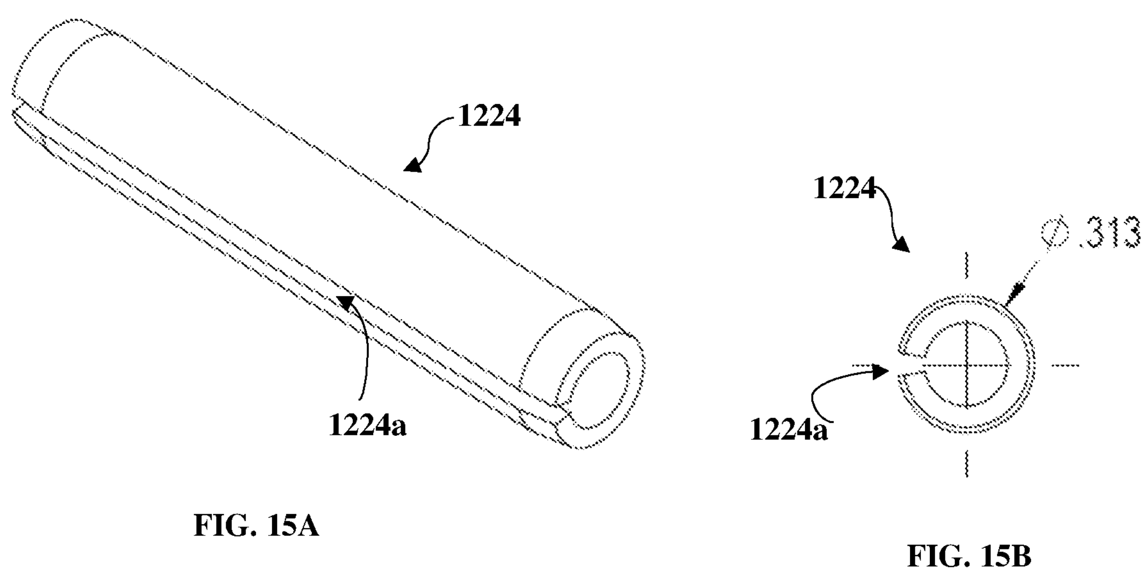
FIG. 15A
FIG. 15B
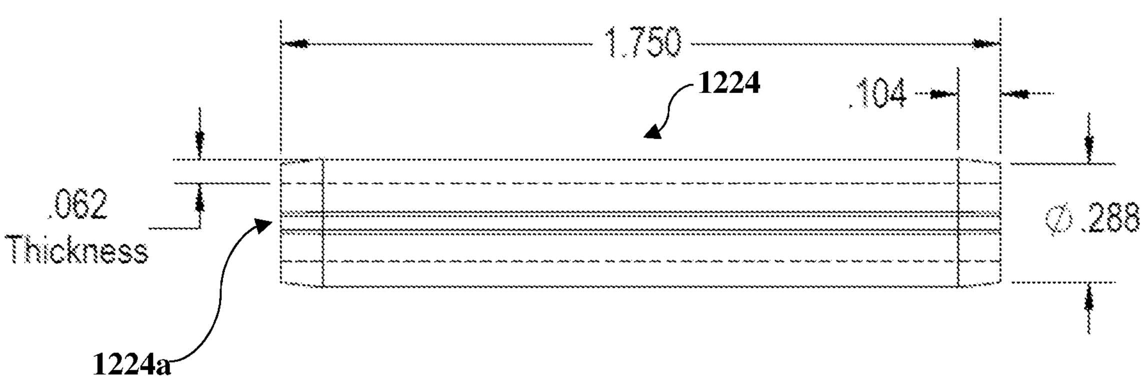
FIG. 15C

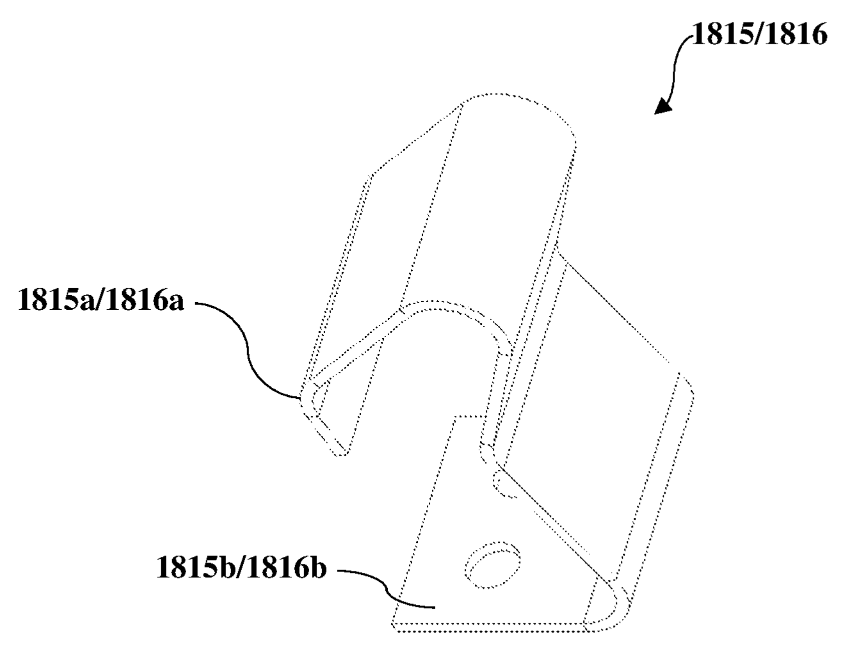
FIG. 21A
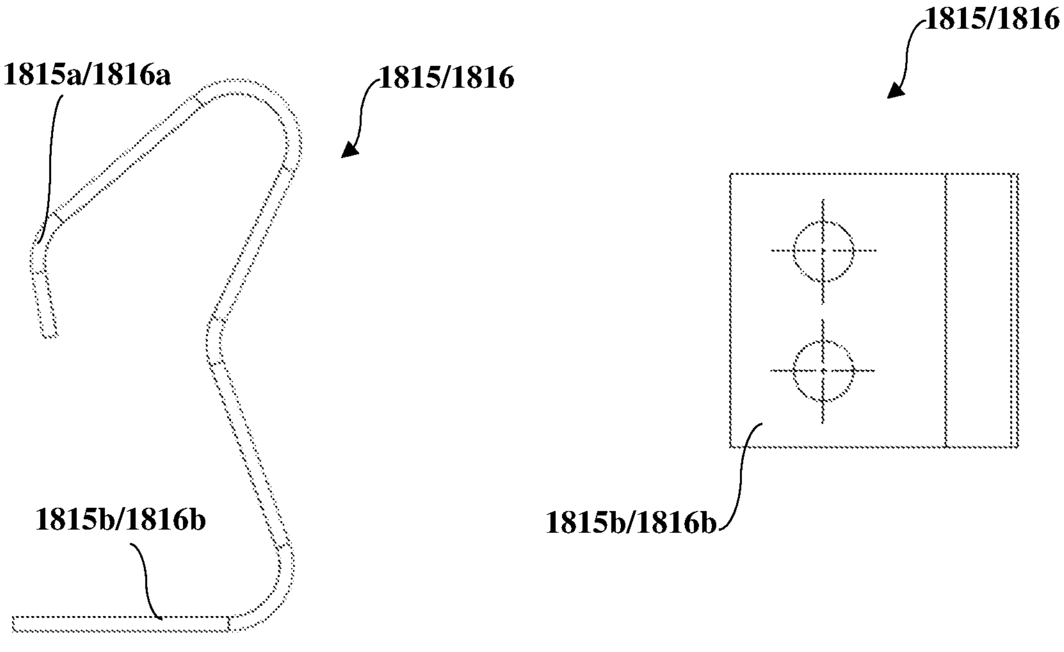
FIG. 21B
FIG. 21C

VOLTAGE TRANSFORMER DISCONNECT SWITCH FOR UTILITY METERING SECTIONS OF A MEDIUM VOLTAGE SWITCHGEAR

BACKGROUND

A utility metering section of a medium voltage switchgear typically comprises current transformers and voltage transformers for customer metering and meter sockets for installing a power meter. Based on the operating voltage, the utility metering section of the medium voltage switchgear is often divided into multiple medium voltage switchgear classes. The medium voltage switchgear is divided, for example, into 5-kilovolt (kV), 15 kV, 27 kV, and 38 kV voltage classes. To optimize cost, most manufacturers combine 5 kV and 15 kV voltage classes into one design, thereby rendering three medium voltage switchgear designs: 5/15 kV, 27 kV, and 38 kV.

Conventional load interrupter switches available at 5 kilovolts (kV), 15 kV, 27 kV, and 38 kV voltage have higher current ratings, for example, 150 amperes (150 A), 300 amperes (300 A), 600 amperes (600 A), and 1200 amperes (1200 A). In utility metering sections of switchgears, a voltage transformer requires a disconnect switch for safety reasons and for maintenance. The disconnect switch does not need a high current rating. A disconnect switch that is rated, for example, about 20 amperes (20 A), would be more than sufficient for a voltage transformer disconnection application. Furthermore, the disconnect switch does not have to be a load break switch since the disconnect switch is only opened when the power is turned off. Consequently, there is a need for a low-cost switch that is optimized as a voltage transformer disconnect switch at a low current rating; that can be fabricated easily for supply chain reasons; and that meets dimensional and safety requirements of electric utilities.

A large number of electric utilities are members of the Electric Utility Service Equipment Requirements Committee (EUSERC). The EUSERC promotes uniform electric service requirements among member utilities, publishes existing utility service requirements for electric service equipment, and provides direction for the development of future metering technology. Furthermore, the EUSERC supports the development of safe and cost-effective metering and service equipment for member utilities, and establishes manufacturing and installation requirements for the metering and service equipment that is acceptable to all member utilities. Underwriters Laboratories (UL) is an associate member of the EUSERC and testing requirements are considered when developing EUSERC utility metering section requirements. A number of utilities that are not members of the EUSERC may have minor requirements that may be slightly different from the EUSERC requirements. A utility metering section of the medium voltage switchgear needs to meet predefined utility requirements, for example, the EUSERC requirements, without affecting the design of the voltage transformer switch. For example, the design of the voltage transformer disconnect switch must meet the following design features:

1. Size and spacings: The voltage transformer disconnect switch at various operating voltages must withstand both dielectric and lightning impulse voltages that depend on the operating voltage. The following table summarizes the required withstand voltages. Basic insulation level (BIL) in the following table refers to a level of insulation that can withstand a lightning impulse with a peak voltage that depends on the voltage class of the voltage transformer disconnect switch as shown in the table below. The dielectric test voltage at a power frequency of, for example, about 60 Hertz (Hz), also depends on the voltage class and is applied for one minute in a typical design and production test to ensure there is no breakdown of insulation. When designs for 5 kV and 15 kV voltage classes are combined into a single product, the combined design must meet the requirements for a 15 kV voltage class.

| Voltage Class, kV | Lightning Impulse Voltage or BIL, peak kV | Dielectric Withstand Voltage, kV |
|---|---|---|
| 5 | 60 | 19 |
| 15 | 95 | 36 |
| 27 | 125 | 60 |
| 38 | 150 | 80 |

2. Current ratings: Typical medium voltage load interrupter switches are rated 300 amperes (A), 600 A, and 1200 A. There is a need for a low-cost, easy-to-manufacture, and optimized voltage transformer disconnect switch that carries a low current, and is not required to open when energized, thereby requiring a low current rating.
3. Enclosure test requirements: The voltage transformer disconnect switch is required to meet Underwriters Laboratories (UL) safety requirements for mechanical and environmental factors. The voltage transformer disconnect switch must pass UL rain tests and UL mechanical and electrical safety tests.
4. Mechanical endurance: The voltage transformer disconnect switch must be able to operate 500 cycles continuously without failure in conjunction with safety interlocks to meet UL safety requirements.
5. The voltage transformer disconnect switch must meet specific requirements of utilities. Typically, most utilities follow the Electric Utility Service Equipment Requirements Committee (EUSERC) guidelines for a utility switch. There is a need for a voltage transformer disconnect switch that follows the EUSERC guidelines and accommodates minor changes, for example, enclosure dimensional changes, number of current transformers connected therewithin such as three (3) current transformers instead of two (2) current transformers, etc., required by other utilities that are not members of the EUSERC.
6. Basic switch design: Since the basic insulation level (BIL) and dielectric test voltages are different, the clearance and creepage distances required are also different. Therefore, sizes of the enclosures for different voltage classes are also different. A 38 kV voltage transformer disconnect switch is much larger than a 15 kV voltage transformer disconnect switch or a 27 kV voltage transformer disconnect switch. Consequently, an enclosure for a 15 kV voltage transformer disconnect switch is the smallest of the enclosures of the three voltage transformer disconnect switch designs.

The enclosures for the voltage transformer disconnect switches are typically classified into the following three different categories depending on their use.

1. Category A: Category A is the most stringent category. Category A enclosures are intended to provide a degree of protection against contact with enclosed equipment in ground-level installations that are subject to deliberate unauthorized acts by members of the unsupervised general public. Category A utility metering switch enclosures must meet stringent Institute of Electrical and Electronics Engineers (IEEE)/National Electrical Manufacturers Association (NEMA) 3R test requirements. In addition to a stringent rain test that simulates rain driven by 30 miles per hour (mph) wind at the rate of 0.2 inch per minute per vertical surface for 5 minutes, mechanical tests for the enclosure and door handles must be met for category A enclosures. For safety, an outer door or a lockable barrier must protect all viewing windows. Furthermore, an electrical rod entry test needs to be performed to ensure that a 0.5-inch or 13-millimeter (mm) diameter rod inserted through any opening in the enclosure does not touch any live parts inside the voltage transformer disconnect switch enclosure.

2. Category B: Category B enclosures are intended for use in installations that are not subject to deliberate unauthorized acts by members of the unsupervised general public, primarily to provide a degree of protection to unauthorized and untrained personnel against accidental contact with enclosed equipment.
3. Category C: Category C enclosures provide a degree of protection against contact with enclosed equipment in secured installations intended to be accessible only by authorized persons.

Furthermore, there are many challenges in preventing entry of rain into an enclosure of a large and wide utility metering section of a medium voltage switchgear, especially in the rear of the utility metering section. The large and wide utility metering section typically requires two rear doors and there are difficulties in preventing rain from seeping between the two rear doors and coming in contact with live parts in the enclosure. Water that leaks in may touch a ground bus at the bottom in the rear of the enclosure. American National Standards Institute (ANSI)/the Institute of Electrical and Electronics Engineers (IEEE) rain tests typically simulate wind gusts of 30 miles per hour (mph) at the enclosure and require three jets, each at 60 per square inch (psi), spraying water on each side of the enclosure at three different heights.

Hence, there is a long-felt need for a voltage transformer disconnect switch assembly comprising a low-cost, easy-to-manufacture, voltage transformer disconnect switch with a low current rating and housed in an enclosure that meets the above-disclosed requirements and design safety tests for utility metering sections of a medium voltage switchgear.

SUMMARY OF THE INVENTION

This summary is provided to introduce a selection of concepts in a simplified form that are further disclosed in the detailed description of the invention. This summary is not intended to determine the scope of the claimed subject matter. The terms "first" and "second" are used herein for descriptive purposes only and are not to be construed to indicate or imply relative importance.

The system disclosed herein addresses the above-recited need for a voltage transformer disconnect switch assembly comprising a low-cost, easy-to-manufacture, voltage transformer disconnect switch with a low current rating and housed in an enclosure that meets the above-disclosed requirements and design safety tests for utility metering sections of a medium voltage switchgear. The voltage transformer disconnect switch is a low-cost switch that is optimized at a low current rating of, for example, about 20 amperes, which covers all switch ratings; that is fabricated easily for supply chain reasons; and that meets dimensional and safety requirements of electric utilities. In an embodiment, a utility metering section of the medium voltage switchgear is configured as a utility metering cabinet comprising a voltage transformer switch compartment, a fuse compartment, and a current transformer and cable compartment. In an embodiment, the voltage transformer switch compartment is disposed in a front, upper location of the utility metering section; the fuse compartment is disposed in a front, bottom location of the utility metering section; and the current transformer and cable compartment is disposed in a rear location of the utility metering section. The voltage transformer switch compartment is configured to house the voltage transformer disconnect switch of the voltage transformer switch assembly disclosed herein. The fuse compartment is configured to accommodate a voltage transformer and input fuses of the voltage transformer. The current transformer and cable compartment is configured to house current transformers and a main bus. The main bus is a multi-phase, main medium voltage bus.

The voltage transformer switch compartment, the fuse compartment, and the current transformer and cable compartment are arranged to meet predefined utility requirements comprising, for example, Electric Utility Service Equipment Requirements Committee (EUSERC) requirements for the utility metering section of the medium voltage switchgear. The voltage transformer switch assembly is disposed in an enclosure configured to meet predefined electrical enclosure requirements comprising, for example, National Electrical Manufacturers Association (NEMA) 3R requirements and the American National Standards Institute (ANSI)/the Institute of Electrical and Electronics Engineers (IEEE) Category A requirements. The voltage transformer switch assembly is adapted for a substantially low current rating of, for example, about 20 amperes (A), and multiple voltage ratings comprising, for example, 5 kilovolts (kV), 15 kV, 27 kV, and 38 kV.

The voltage transformer switch assembly disclosed herein comprises a voltage transformer disconnect switch, multiple clips, and a switch handle assembly. The voltage transformer disconnect switch is housed in the voltage transformer switch compartment of the utility metering section of the medium voltage switchgear. The voltage transformer disconnect switch comprises multiple switch blades, one for each phase of a voltage transformer switch input bus. The voltage transformer switch input bus is a multi-phase, medium voltage bus. The switch blades are mounted between insulators in the voltage transformer switch compartment. In an embodiment, the voltage transformer switch assembly further comprises pin members, for example, spring pins, configured to snap into place and secure the insulators to the switch blades sandwiched therebetween in the voltage transformer switch compartment. In an embodiment, the voltage transformer switch assembly with a 38 kV voltage transformer disconnect switch further comprises support clamps bolted between the insulators. The support clamps are configured to support the insulators within the voltage transformer switch assembly. In an embodiment, the support clamps comprise U-shaped openings configured to accommodate and support the insulators. The switch blades are connected to a ground bus to ground the voltage transformer disconnect switch for safety during maintenance and service. Upper parts of the switch blades are configured to connect to: (a) the voltage transformer switch input bus that connects a voltage transformer to the main bus of the utility metering section via cables; or (b) the ground bus for safety.

The clips of the voltage transformer switch assembly are configured to connect the voltage transformer disconnect switch to the main bus via the voltage transformer switch input bus by insulated cables or to the ground bus. The clips are configured for a tight connection to the switch blades, when the switch blades are engaged with the clips. The clips comprise upper main power clips and lower grounding clips. Upper parts of the switch blades are configured to engage with the upper main power clips for connections to the voltage transformer switch input bus, herein referred to as "input bus connections". Furthermore, the upper parts of the switch blades are configured to engage with the lower grounding clips for connections to the ground bus, herein referred to as "ground bus connections". In an embodiment, the voltage transformer switch assembly further comprises first fuse clips disposed in the fuse compartment of the utility metering section. In an embodiment, lower parts of the switch blades are configured to engage with the first fuse clips for lower bus connections in the fuse compartment. In an embodiment, the voltage transformer switch assembly further comprises second fuse clips installed on fuse clip buses disposed in the fuse compartment of the utility metering section. The fuse clip buses are configured to connect the voltage transformer disconnect switch to the second fuse clips. The second fuse clips are configured to connect the input fuses of the voltage transformer to the voltage transformer switch input bus. In an embodiment, the lower parts of the switch blades are connected to upper fuse clip buses in the fuse compartment using the first fuse clips. In another embodiment, the lower parts of the switch blades are connected to the upper fuse clip buses in the fuse compartment using braided copper elements, for example, braided copper wires or cables.

The switch handle assembly is operably connected to the voltage transformer disconnect switch via a drive system. The switch handle assembly comprises a switch handle configured to operate the voltage transformer disconnect switch. In an embodiment, the drive system is a chain drive comprising a chain wrapped around a first sprocket wheel and a second sprocket wheel. The first sprocket wheel is connected to the switch handle assembly, and the second sprocket wheel is operably connected to an end insulator to facilitate smooth motion of the voltage transformer disconnect switch and the switch handle. The second sprocket wheel is further operably connected to a fixed bracket and a moving bracket via a shaft configured to facilitate motion of the switch handle. The moving bracket is operably connected to the end insulator via an arm of the voltage transformer switch assembly. The arm is configured as a sheet metal bracket comprising grooves cut thereinto. The grooves of the arm are configured to restrict motion of the moving bracket, for example, to only about 90 degrees, via bushings moving within the grooves of the arm. In an embodiment, the arm and the moving bracket define an interface between the drive system and the voltage transformer disconnect switch to prevent the switch handle from operating, for example, more than about 180 degrees from a top position to a bottom position. The grooves of the arm are configured to transfer motion between the moving bracket and the voltage transformer disconnect switch. In an embodiment, the moving bracket is configured to move, for example, only about 90 degrees about the shaft to move the switch blades from a connected ON position to a grounded position.

In an embodiment, the voltage transformer switch assembly further comprises safety interlocking devices connected to the switch handle assembly and to a door of the fuse compartment of the utility metering section. The safety interlocking devices are configured to provide safety for opening and closing of the fuse compartment, ensuring that the voltage transformer disconnect switch is grounded before the fuse compartment is opened for maintenance.

In an embodiment, rails and mounting brackets are disposed at a bottom end of the fuse compartment of the utility metering section. The rails and the mounting brackets are configured to mount the voltage transformer in the fuse compartment in accordance with predefined utility requirements, for example, Electric Utility Service Equipment Requirements Committee (EUSERC) requirements.

In an embodiment, the enclosure that houses the voltage transformer switch assembly is further configured to withstand predefined stringent rain tests comprising, for example, the Institute of Electrical and Electronics Engineers (IEEE) rain test, the American National Standards Institute (ANSI) rain test, etc., by using a rain shield assembly. In an embodiment, the rain shield assembly comprises a first shield and a second shield. The first shield is configured to prevent water from entering the enclosure from the top of the enclosure. The second shield is configured with a gasket to prevent water directed at the enclosure via wind gusts.

In one or more embodiments, related systems comprise circuitry for executing the methods disclosed herein. The circuitry is configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific structures and components disclosed herein. The description of a structure or a component referenced by a numeral in a drawing is applicable to the description of that structure or component shown by that same numeral in any subsequent drawing herein. The terms "front", "rear", "side", "top", "bottom", "upper", "lower", "inner", "outer", etc., are based on an orientation or a positional relationship shown in the appended drawings, and are recited merely for describing the embodiments herein, rather than indicating or implying that the device, component, or structure referenced must have a particular orientation or position or must be constructed and operated in a particular orientation, and therefore should not be construed as limiting the embodiments herein.

FIG. 2 illustrates a side elevation view of an embodiment of a switch blade of the 15 kV voltage transformer disconnect switch shown in FIG. 1A.

FIGS. 3A-3C illustrate a left-side perspective view, a front elevation view, and a left-side elevation view, respectively, of an embodiment of a spring pin configured to secure insulators to switch blades of the 15 kV voltage transformer disconnect switch.

FIG. 14 illustrates a side elevation view of an embodiment of a switch blade of the 27 kV voltage transformer disconnect switch shown in FIG. 12.

FIGS. 15A-15C illustrate a left-side perspective view, a front elevation view, and a left-side elevation view, respectively, of an embodiment of a spring pin configured to secure insulators to switch blades of the 27 kV voltage transformer disconnect switch and a 38 kV voltage transformer disconnect switch.

FIGS. 21A-21C illustrate a perspective view, a side elevation view, and a top plan view, respectively, of an embodiment of a clip configured to connect the 38 kV voltage transformer disconnect switch to a main bus via a voltage transformer switch input bus or to a ground bus.

DETAILED DESCRIPTION OF THE INVENTION

Disclosed herein is a voltage transformer switch assembly for a utility metering section of a medium voltage switchgear. In an embodiment, the medium voltage switchgear is a medium voltage, metal-enclosed switchgear. The voltage transformer switch assembly is adapted for a substantially low current rating of, for example, about 20 amperes (20 A). Furthermore, the voltage transformer switch assembly is adapted for multiple voltage ratings comprising, for example, 5 kilovolts (kV), 15 kilovolts, 27 kilovolts, and 38 kilovolts by adjusting length of insulators and insulation components in the voltage transformer switch assembly. The voltage transformer switch assembly comprises a voltage transformer disconnect switch housed in a voltage transformer switch compartment of the utility metering section of the medium voltage switchgear. In an embodiment, the utility metering section of the medium voltage switchgear is configured as a utility metering cabinet, for example, a medium voltage, metal-enclosed utility metering cabinet, comprising the voltage transformer switch compartment, a fuse compartment, and a current transformer and cable compartment as disclosed in the descriptions of FIGS. 7A-7G, FIGS. 17A-17J, and FIGS. 23A-23G. Since the 15 kV, 27 kV, and 38 kV voltage transformer disconnect switches require different phase-to-phase clearance and creepage distances, the design of each voltage transformer disconnect switch is configured to accommodate electrical safety distances required.

Figures 1A, 1B, 1C:
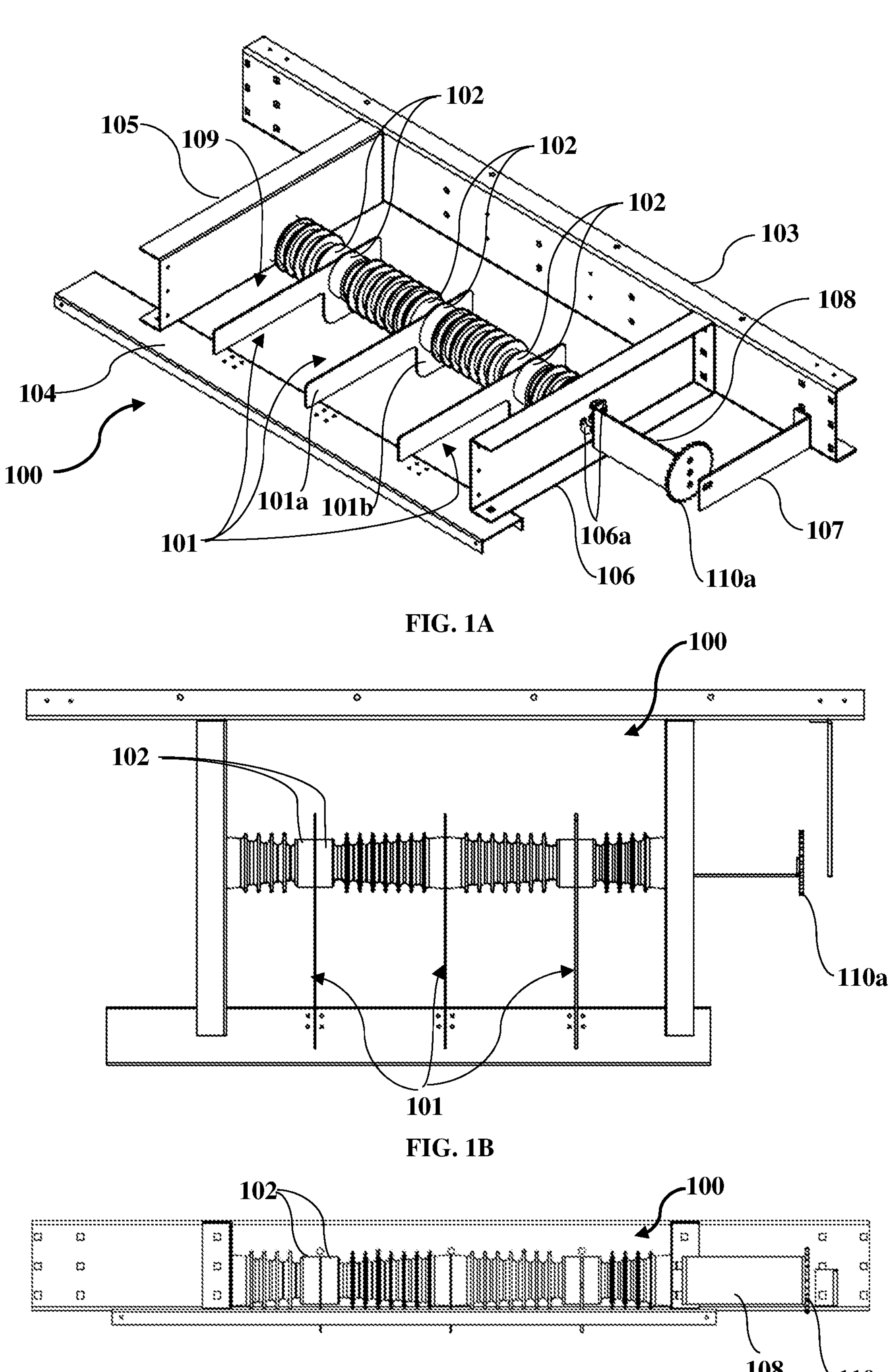
FIG. 1A illustrates a top perspective view of an embodiment of a 15-kilovolt (kV) voltage transformer disconnect switch.
FIG. 1B illustrates a top plan view of the embodiment of the 15 kV voltage transformer disconnect switch shown in FIG. 1A.
FIG. 1C illustrates a front elevation view of the embodiment of the 15 kV voltage transformer disconnect switch shown in FIG. 1A.
Figure 5A:
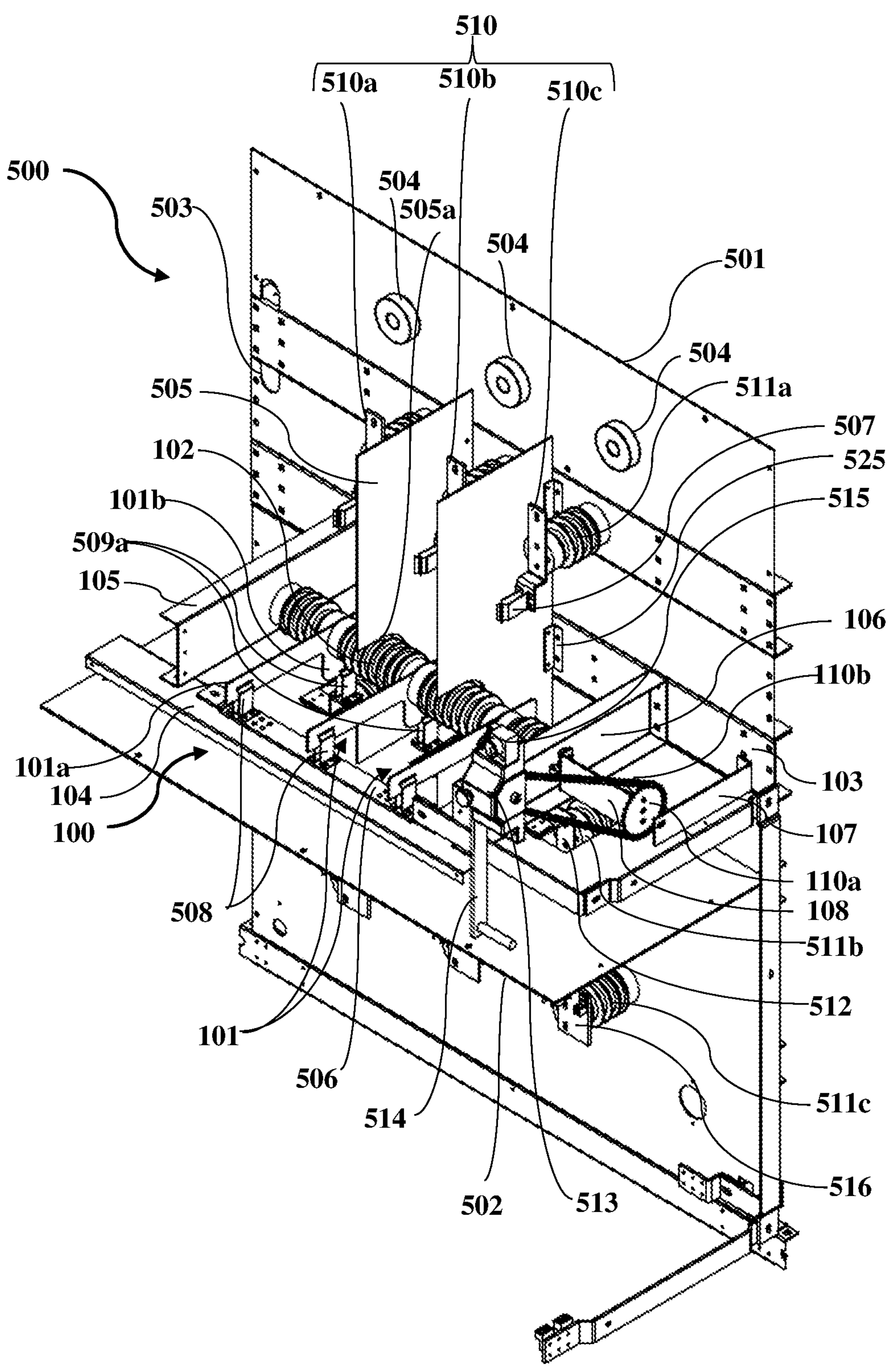
FIG. 5A illustrates a top perspective view of an embodiment of a voltage transformer switch assembly comprising the 15 kV voltage transformer disconnect switch shown in FIG. 1A.
Figure 5B:
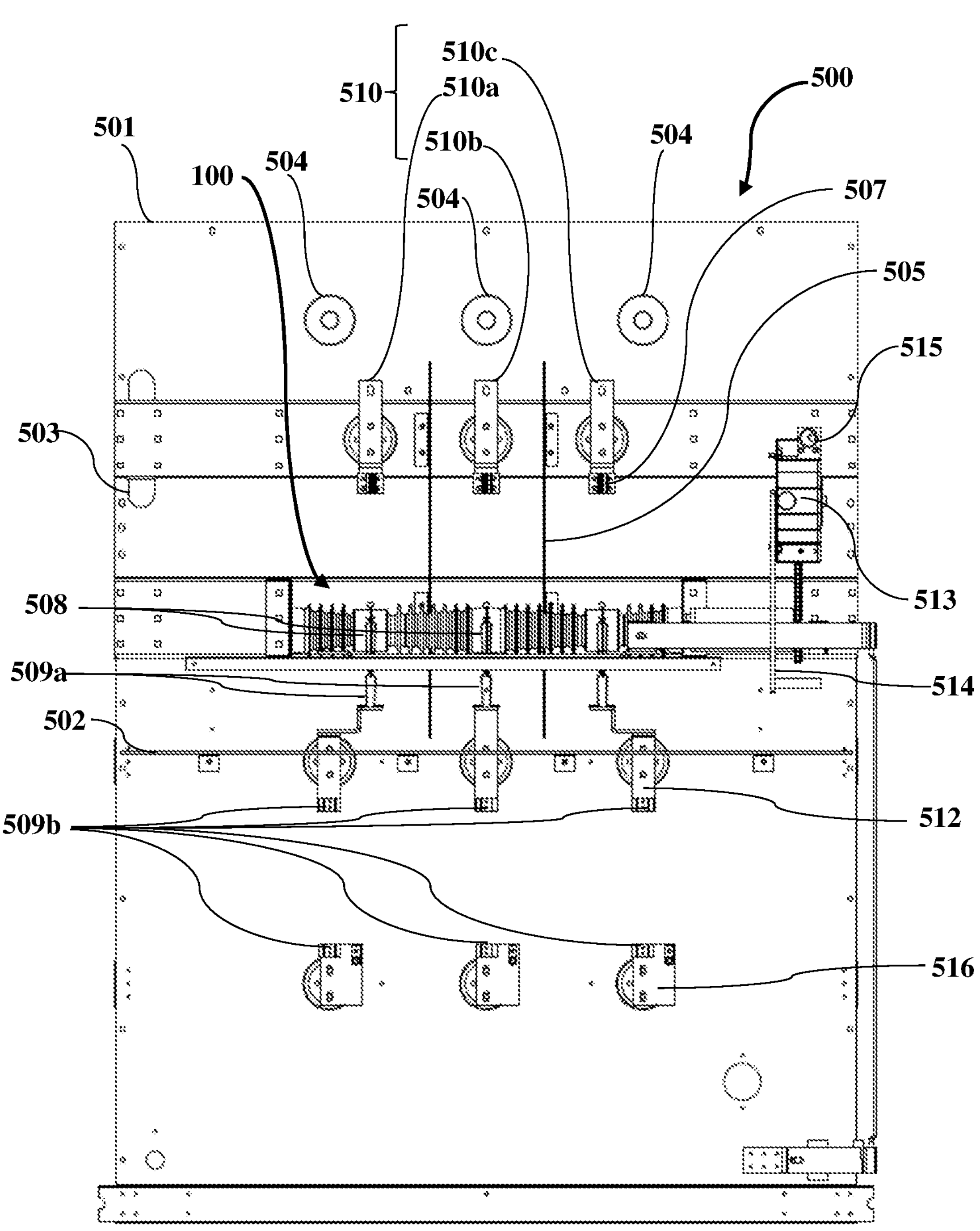
FIG. 5B illustrates a front elevation view of the embodiment of the voltage transformer switch assembly shown in FIG. 5A.

FIG. 1A illustrates a top perspective view of an embodiment of a 15-kilovolt (kV) voltage transformer disconnect switch 100. The voltage transformer disconnect switch 100 comprises multiple switch blades 101, for example, three switch blades 101, one for each phase of a voltage transformer switch input bus 510, as illustrated in FIG. 1A and FIGS. 5A-5B. The voltage transformer switch input bus 510 is a multi-phase, medium voltage bus comprising three input buses 510*a*, 510*b*, and 510*c* as illustrated in FIGS. 5A-5B. The switch blades 101 are made, for example, of ¼-inch thick aluminum. FIG. 1B and FIG. 1C illustrate a top plan view and a front elevation view, respectively, of the embodiment of the 15 kV voltage transformer disconnect switch 100 shown in FIG. 1A. The switch blades 101 are disposed in a space 109 defined by opposing channels 103 and 104 and opposing arms 105 and 106. The opposing channels comprise a rear support channel 103 and a ground bus support channel 104. In an example, the length of the rear support channel 103 is about 56.875 inches; the height of the rear support channel 103 is about 6.0625 inches; the width of the rear support channel 103 is about 2 inches; and the thickness of the rear support channel 103 is about 0.188 inches. A metal sheet with an overall length of about 56.875 inches and an overall width of about 9.375 inches is used to construct the rear support channel 103. The ground bus support channel 104 is configured to support a ground bus 506 as illustrated in FIG. 5A. In an example, the length of the ground bus support channel 104 is about 41 inches; the height of the ground bus support channel 104 is about 3.9375 inches; the width of the ground bus support channel 104 is about 1 inch; and the thickness of the ground bus support channel 104 is about 0.105 inches. A metal sheet with an overall length of about 41 inches and an overall width of about 5.5 inches is used to construct the ground bus support channel 104. The channels 103 and 104 are configured to provide structural support to the voltage transformer disconnect switch 100. Furthermore, the channels 103 and 104 and the arms 105 and 106 provide ground (GRD) planes in the voltage transformer switch assembly 500 illustrated in FIGS. 5A-5D. The rear support channel 103 is made, for example, from a pickled and oiled (P&O) carbon steel sheet of 7 gauge (ga) size. The ground bus support channel 104 is made, for example, from a P&O carbon steel sheet of 12 ga size. In an embodiment, the channels 103 and 104 and the arms 105 and 106 are generally rectangular-shaped sheet metal pieces.

The switch blades 101 are mounted between insulators 102 in a voltage transformer switch compartment 707 of a 15 kV utility metering cabinet 700 illustrated in FIGS. 7A-7D. In an embodiment, each of the switch blades 101 is configured as a generally L-shaped structure comprising an upper part 101*a* and a lower part 101*b*. The insulators 102 that sandwich the switch blades 101 provide sufficient electrical insulation by increasing the creepage distances between each phase to ground, and between phases to withstand peak lightning impulse voltages. The insulators 102 are made, for example, of glass polyester. FIGS. 1A-1C also illustrate a sprocket wheel 110*a* of a chain drive 110 configured to drive a switch handle assembly 513 shown in FIG. 5A, FIG. 5D, and FIGS. 7G-7K, which operates the voltage transformer disconnect switch 100, for example, to one of two positions, namely, a connected ON position and a grounded position. The connected ON position is referred to as a closed position of the voltage transformer disconnect switch 100. The grounded position is referred to as an open position of the voltage transformer disconnect switch 100. In an embodiment, the arm 106 is configured as a sheet metal bracket comprising grooves 106*a* cut thereinto. The grooves 106*a* of the arm 106 are configured to restrict motion of a moving bracket 108, and in turn, a switch handle 514 of the switch handle assembly 513 shown in FIG. 5D and FIGS. 7G-7K. One face of the sprocket wheel 110*a* is connected to the arm 106 via the movable bracket 108, while the other face of the sprocket wheel 110*a* is connected to a fixed bracket 107 that extends substantially perpendicularly from the rear support channel 103.

Figure 1D:
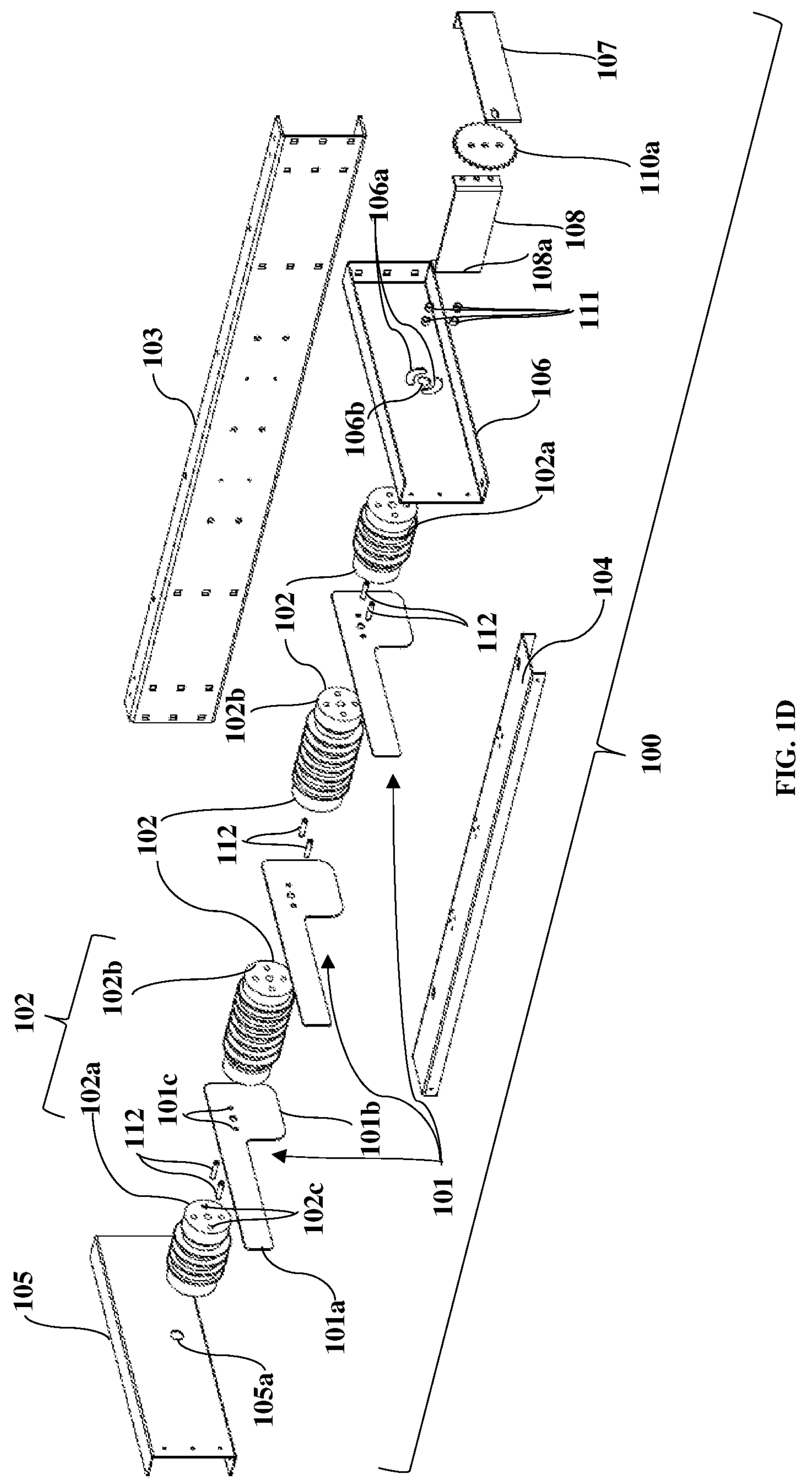
FIG. 1D illustrates a perspective, exploded view of the embodiment of the 15 kV voltage transformer disconnect switch shown in FIG. 1A.

FIG. 1D illustrates a perspective, exploded view of the embodiment of the 15 kV voltage transformer disconnect switch 100 shown in FIG. 1A. As illustrated in FIG. 1D, the voltage transformer disconnect switch 100 comprises three switch blades 101, each sandwiched between a pair of insulators 102. In an example, the switch blades 101 proximal to the arms 105 and 106 are each sandwiched between a 6-inch insulator 102*a* and an 8.75-inch insulator 102*b*, while the central switch blade 101 is sandwiched between two 8.75-inch insulators 102*b*. That is, the insulators 102*b* between phases are 8.75 inches long and the insulators 102*a* at the ends on each side connected to the frame of the 15 kV utility metering cabinet 700 illustrated in FIGS. 7A-7D, are 6 inches long. That is, the distance between an outside A or C phase and the frame of the 15 kV voltage transformer disconnect switch 100, that is, the phase-to-ground distance, is about 6 inches. The insulators 102 are made, for example, of flame-resistant, fiberglass-reinforced, thermoset polyester molding compounds. The insulators 102*b* are, for example, Glastic® standoff insulators. In another example, the 6-inch insulators 102*a* and the 8.75-inch insulators 102*b* are manufactured by H-J International, Inc.

Each of the switch blades 101 is connected to a corresponding pair of insulators 102 using pin members, for example, spring pins 112. The spring pins 112 are configured to snap into place and secure the insulators 102 to the switch blades 101 sandwiched therebetween. To secure each switch blade 101 between two insulators 102, holes 102*c* of the insulators 102 are first aligned with the holes 101*c* of each switch blade 101. The spring pins 112 are inserted into the aligned holes 102*c* and 101*c*. The diameter of the spring pins 112 is slightly larger than the diameter of the holes 102*c* and 101*c*. The spring pins 112 are compressed when inserted into the aligned holes 102*c* and 101*c*. In an embodiment, each of the spring pins 112 comprises a longitudinal slot 112*a* as illustrated in FIGS. 3A-3C. As the spring pins 112 are inserted into the aligned holes 102*c* and 101*c*, the slots 112*a* allow the spring pins 112 to expand slightly, which creates a snug fit within the aligned holes 102*c* and 101*c*. This expansion generates a radial force that holds the spring pins 112 in place and prevents the spring pins 112 from falling out. An interference fit between the spring pins 112 and the aligned holes 102*c* and 101*a* provides a form of retention, thereby securely connecting the switch blades 101 to the insulators 102.

The arm 105 is configured as a sheet metal control bracket with a generally circular hole 105*a*. The generally circular hole 105*a* of the arm 105 is configured to receive a fastener, for example, a ½-inch bolt, to connect the 6-inch insulator 102*a* to the arm 105. The sprocket wheel 110*a* of the chain drive 110 illustrated in FIG. 5D and FIGS. 7G-7K is operably connected to the fixed bracket 107 and the moveable bracket 108 via a shaft 113 illustrated in FIGS. 7I-7L. In an example, the shaft 113 is a ½-inch bolt with flat and lock washers. Another fastener, for example, a ½-inch bolt 114 illustrated in FIG. 7J and FIG. 7L, connects the other end or side 108*a* of the moveable bracket 108 to the insulator 102 via a generally circular hole 106*b* disposed between the two slots or grooves 106*a* of the arm 106. The shaft 113, that is, the ½-inch bolt, allows the sprocket wheel 110*a* to rotate the insulator-switch-blade assembly. In an embodiment as illustrated in FIG. 1D, the moveable bracket 108 is connected to the insulator 102 using fasteners, for example, four hollow, generally cylindrical bushings 111 and two ⅜" bolts (not shown). The bushings 111 are configured to facilitate rotation of the switch blades 101, in communication with the switch handle assembly 513 and the chain drive 110 disclosed in the descriptions of FIGS. 5A-5D and FIGS. 7G-7L. In an embodiment, two hollow, generally cylindrical bushings 111 are disposed in series for each groove 106*a* of the arm 106 to increase the length. In another embodiment, a single long bushing is used for connecting the moveable bracket 108 to the insulator 102*a*. The hollow, generally cylindrical bushings 111 move within the grooves 106*a* of the arm 106 to provide a smooth motion and to limit the motion of the insulator-switch-blade shaft to 90 degrees while a switch handle 514 of the switch handle assembly 513 shown in FIG. 5D and FIGS. 7G-7H moves from a top position to a bottom position or an equivalent of 180 degrees. In an example, the dimensions of the bushings 111 are about 0.50 inches×0.375 inches.

FIG. 2 illustrates a side elevation view of an embodiment of a switch blade 101 of the 15 kV voltage transformer disconnect switch 100 shown in FIG. 1A. The switch blade 101 comprises an elongate upper part 101*a* and a wide lower part 101*b* as illustrated in FIG. 2. In an example, the length of the switch blade 101 is about 16 inches; the thickness of the switch blade 101 is about 0.125 inches; the width of the upper part 101*a* of the switch blade 101 is about 2 inches; and the width of the lower part 101*b* of the switch blade 101 is about 5 inches. The switch blade 101 is made, for example, from an ¼-inch aluminum sheet.

FIGS. 3A-3C illustrate a left-side perspective view, a front elevation view, and a left-side elevation view, respectively, of an embodiment of the spring pin 112 configured to secure the insulators 102 to the switch blades 101 of the 15 kV voltage transformer disconnect switch 100 shown in FIG. 1A. In an embodiment, the spring pin 112 comprises a longitudinal slot 112*a* defined along a length of the spring pin 112. In an example, the length of the spring pin 112 is about 1.5 inches, the diameter of the spring pin 112 is about 0.313 inches, and thickness of the spring pin 112 is about 0.062 inches. In an example, the diameter of the spring pin 112 is about 0.312 inches. The spring pin 112 snaps into place and secures the insulators 102 to the switch blades 101 sandwiched therebetween in the voltage transformer switch compartment 707 as disclosed in the description of FIG. 1D. The spring pin 112 is made, for example, from steel. In an embodiment, the 15 kV voltage transformer disconnect switch 100 uses two spring pins 112 at each connection of the insulators 102 to the switch blade 101.

Figure 4A:
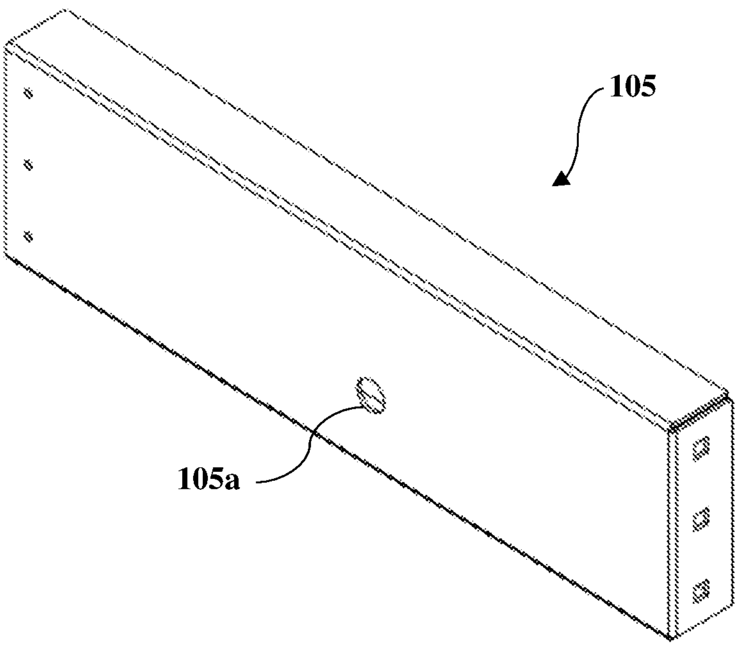
FIGS. 4A-4B illustrate perspective views of opposing arms of the 15 kV voltage transformer disconnect switch.
Figure 4B:
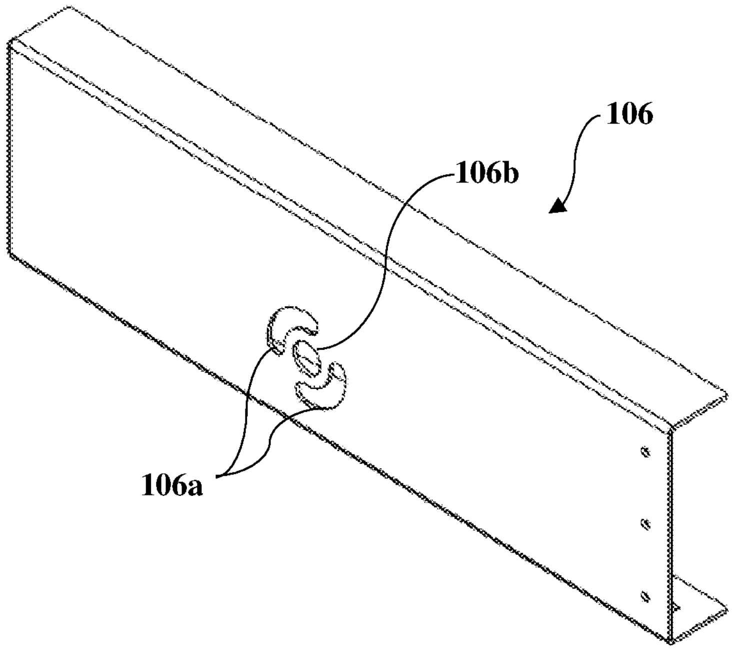

FIGS. 4A-4B illustrate perspective views of the opposing arms 105 and 106 of the 15 kV voltage transformer disconnect switch 100 shown in FIG. 1A. The arm 105 is configured as a sheet metal control bracket with a generally circular hole 105*a* as illustrated in FIG. 4A. The generally circular hole 105*a* is substantially centrally disposed on the arm 105. In an embodiment, the 6-inch insulator 102*a* proximal to the arm 105 as illustrated in FIG. 1D, is connected to the arm 105, for example, using a ½-inch bolt inserted through the generally circular hole 105*a* of the arm 105. In an example, the length of the arm 105 is about 21.5 inches; the height of the arm 105 is about 6 inches, and the width of the arm 105 is about 1.9375 inches. A metal sheet with an overall length of about 23.1875 inches and an overall width of about 9.375 inches is used to construct the arm 105. The arm 106 is configured as a sheet metal control bracket with grooves 106*a* disposed around a generally circular hole 106*b* as illustrated in FIG. 4B. In an embodiment, the 6-inch insulator 102*a* proximal to the arm 106 as illustrated in FIG. 1D, is connected to the arm 106, for example, using a ½-inch bolt 114 inserted through the generally circular hole 106*b* of the arm 106 as illustrated in FIG. 7J and FIG. 7L. In an example, the length of the arm 106 is about 21.3125 inches; the height of the arm 106 is about 6 inches, and the width of the arm 106 is about 1.9375 inches. A metal sheet with an overall length of about 23.1875 inches and an overall width of about 9.375 inches is used to construct the arm 106. Each of the arms 105 and 106 is made, for example, from a pickled and oiled (P&O) carbon steel sheet of 12 gauge (ga) size.

FIG. 5A illustrates a top perspective view of an embodiment of the voltage transformer switch assembly 500 comprising the 15 kV voltage transformer disconnect switch 100 shown in FIG. 1A. The voltage transformer switch assembly 500 further comprises multiple clips 507 and 508 configured to connect the voltage transformer disconnect switch 100 to a main bus 519 illustrated in FIG. 7G via a voltage transformer switch input bus 510, or to a ground bus 506. The main bus 519 is a multi-phase, main medium voltage bus disposed in a current transformer and cable compartment 710 of the utility metering cabinet 700 as illustrated in FIG. 7G. The clips 507 and 508 are made, for example, of copper. The clips 507 and 508 are configured for a tight connection to the switch blades 101, when the switch blades 101 are engaged with the clips 507 or 508. The clips comprise upper main power clips 507 and lower grounding clips 508. The upper parts 101*a* of the switch blades 101 are configured to connect to (a) the voltage transformer switch input bus 510 that connects a voltage transformer (not shown) to the main bus 519 of the utility metering cabinet 700 illustrated in FIGS. 7A-7K via cables 520 illustrated in FIG. 11A; or (b) the ground bus 506 for safety.

The ground bus 506 is attached to the ground bus support channel 104 of the voltage transformer disconnect switch 100. As illustrated in FIG. 5A, the switch blades 101 are connected to the ground bus 506 to ground the voltage transformer disconnect switch 100 for safety during maintenance and service. The upper parts 101*a* of the switch blades 101 are configured to engage with the upper main power clips 507 for input bus connections in the utility metering cabinet 700 and with the lower grounding clips 508 for ground bus connections in the utility metering cabinet 700. As used herein, "input bus connections" refer to connections to the voltage transformer switch input bus 510. Also, as used herein, "ground bus connections" refer to connections to the ground bus 506. The input bus connections comprise connections to the voltage transformer switch input bus 510 and in turn, to the main bus 519 via a riser bus 518 illustrated in FIG. 7G. That is, the voltage transformer switch input bus 510 is connected to the riser bus 518 using insulated cables 520. The riser bus 518 is in turn connected to the main bus 519 as illustrated in FIG. 7G. The upper main power clips 507 are connected to the voltage transformer switch input bus 510 which connects to the main bus 519 via the cables 520 connected to the rear riser bus 518. The upper main power clips 507 connect the voltage transformer disconnect switch 100 to the main bus 519 via the voltage transformer switch input bus 510 using the insulated cables 520. The ground bus connections comprise connections to the ground bus 506 attached to the ground bus support channel 104 of the voltage transformer disconnect switch 100.

Figures 5C, 5D:
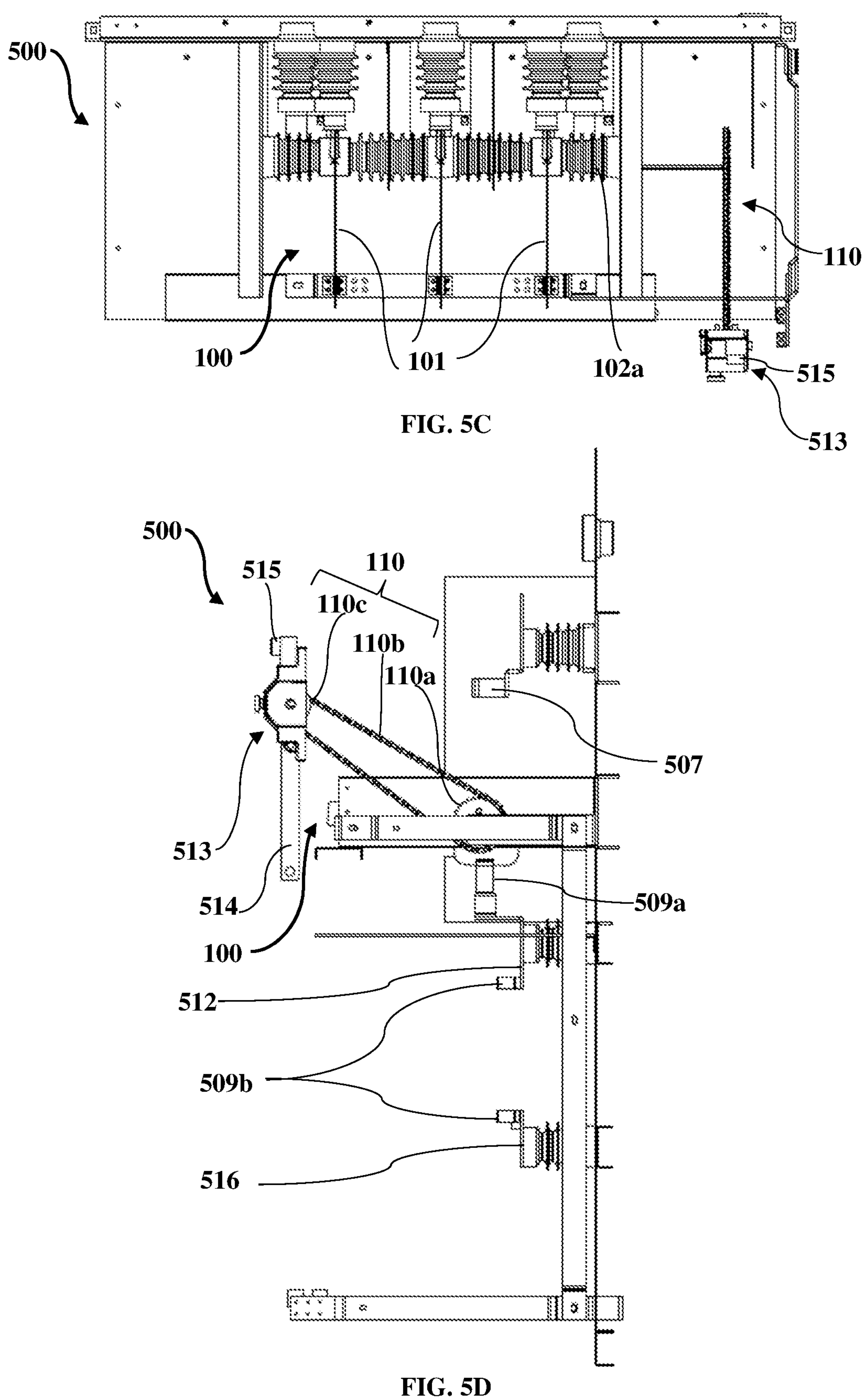
FIG. 5C illustrates a top plan view of the embodiment of the voltage transformer switch assembly shown in FIG. 5A.
FIG. 5D illustrates a right-side elevation view of the embodiment of the voltage transformer switch assembly shown in FIG. 5A.

The voltage transformer switch assembly 500 further comprises fuse clips 509*a* as illustrated in FIGS. 5A-5B and FIG. 5D. FIGS. 5B-5C illustrate a front elevation view and a top plan view, respectively, of the embodiment of the voltage transformer switch assembly 500 shown in FIG. 5A. The fuse clips 509*a* are disposed in a fuse compartment 709 of the utility metering cabinet 700 illustrated in FIGS. 7B-7D. In an embodiment, the lower parts 101*b* of the switch blades 101 are configured to engage with the fuse clips 509*a* as illustrated in FIGS. 5A-5B, FIG. 5D, FIG. 7I, and FIG. 7K, for lower bus connections in the fuse compartment 709. The lower bus connections comprise connections to upper fuse clip buses 512 in the fuse compartment 709 as illustrated in FIG. 5B and FIG. 5D. The upper fuse clip buses 512 are connected to the voltage transformer disconnect switch 100 in the connected ON position via either braided copper elements, for example, braided copper wires 523 illustrated in FIG. 11C-11D, or braided copper cables, or via the fuse clips 509*a*. Input fuses of a voltage transformer (not shown) are attached to fuse clips 509*b* that are installed on the fuse clip buses 512 and 516 illustrated in FIG. 5B and FIG. 11D, in the fuse compartment 709 by the utility. The voltage transformer is connected from the lower fuse clip buses 516 via short cables by the utility.

Figure 11A:
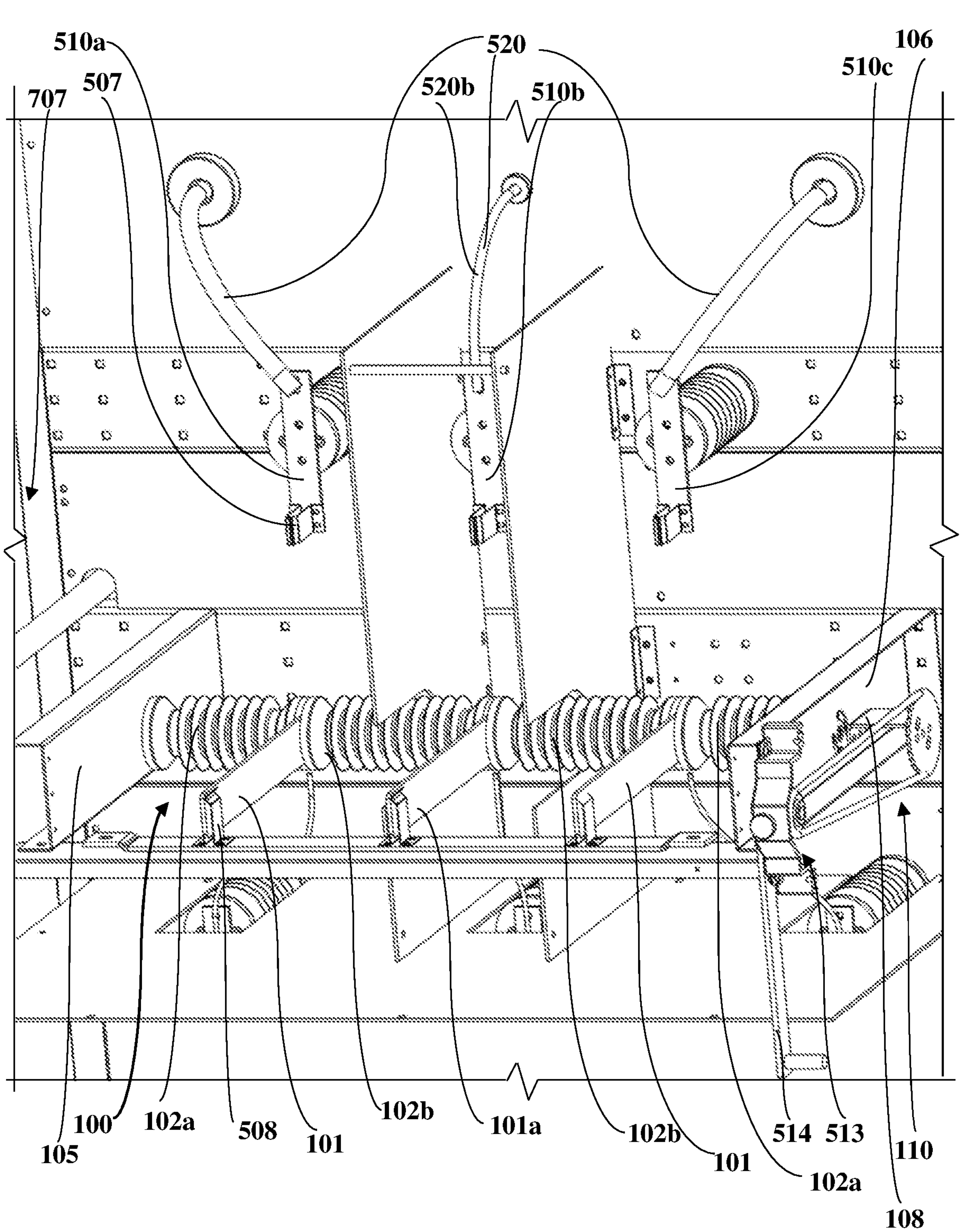
FIGS. 11A-11B illustrate perspective views of an embodiment of the 15 kV voltage transformer disconnect switch, showing switch blades mounted between alternative insulators in a grounded position and a connected ON position, respectively.
Figure 11B:
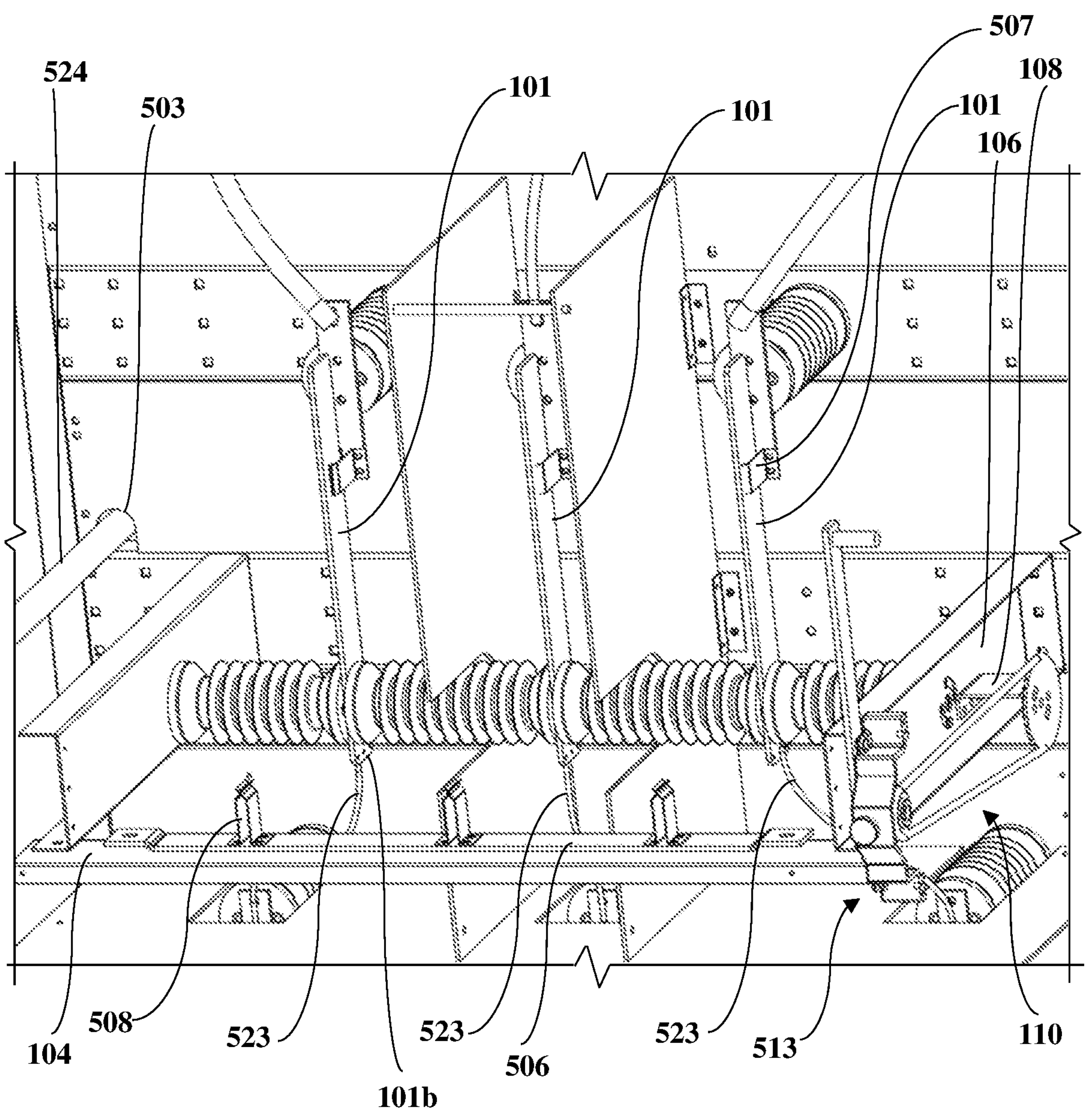

The voltage transformer switch assembly 500 further comprises a rear barrier 501, an insulating barrier 502 disposed between the voltage transformer switch compartment 707 illustrated in FIGS. 7A-7D and the fuse compartment 709, a control cable bushing 503, wall bushings 504 for the input cables 520, phase barriers 505, the voltage transformer switch input bus 510 comprising input buses 510*a*, 510*b*, and 510*c*, standoff insulators 511*a*, 511*b*, and 511*c*, and fuse clip buses 512 and 516 as illustrated in FIGS. 5A-5B and FIG. 5D. The rear barrier 501, the insulating barrier 502 disposed between the voltage transformer switch compartment 707 and the fuse compartment 709, and the phase barriers 505 are made, for example, of thermoset fiberglass-reinforced polyester insulating materials, for example, Glastic GPO-3 materials produced by the Glastic company. The rear barrier 501 is a Glastic insulator configured to provide improved insulation for lightning impulse voltages by enhancing the creepage distance between phase input cables 520 and the ground. The insulating barrier 502 separates and insulates the voltage transformer switch compartment 707 from the fuse compartment 709. The control cable bushing 503 provides an opening for a conduit 524 used for conveying control cables of meters used in the utility metering cabinet 700 as illustrated in FIG. 11B. The wall bushings 504 are disposed on the rear barrier 501. The wall bushings 504 provide a controlled and insulated passage for electrical conductors, cables, and busbars to pass through the rear barrier 501. The wall bushings 504 insulate the cables 520 that connect the voltage transformer switch input bus 510 to the main bus 519 via the riser bus 518 in the current transformer and cable compartment 710. The wall bushings 504 are made, for example, of glass polyester or porcelain. The wall bushings 504 along with the rear barrier 501 also provide sufficient insulation to withstand peak lightning impulse voltages. Since the metal of an enclosure 701 of the utility metering cabinet 700 illustrated in FIGS. 7A-7G is at ground voltage, the rear barrier 501 provides sufficient creepage distance from a phase voltage level of the cable connection to the ground.

The phase barriers 505 extend substantially perpendicularly to the rear barrier 501. The phase barriers 505 are attached to the rear barrier 501 using fasteners, for example, L-shaped, angle bracket clamps 525. In an embodiment, the phase barriers 505 comprise U-shaped cutouts or openings 505*a* configured to accommodate the insulators 102 as illustrated in FIG. 5A and FIG. 7K. The phase barriers 505 separate the input buses 510*a*, 510*b*, and 510*c* that connect to the main bus 519 via a cable connection from the voltage transformer switch input bus 510 to the riser bus 518 in the current transformer and cable compartment 710 and in turn to the main bus 519 at the top of the enclosure 701. The phase barriers 505 serve as insulating barriers between the input buses 510*a*, 510*b*, and 510*c* and prevent electrical arcing or short circuits between adjacent phases within the voltage transformer switch assembly 500. In addition, the phase barriers 505 provide additional insulation, both clearance or through air, and creepage, required to withstand peak lightning impulse voltages between phases. When the upper parts 101*a* of the switch blades 101 are engaged with the upper main power clips 507, the input buses 510*a*, 510*b*, and 510*c* connect the switch blades 101 to the riser bus 518 in the current transformer and cable compartment 710 via the cables 520, which connects the voltage transformer to the main bus 519 of the utility metering cabinet 700.

The standoff insulators 511*a*, 511*b*, and 511*c* are provided for the voltage transformer switch input bus 510, the upper fuse clip buses 512, and the lower fuse clip buses 516, respectively. The standoff insulators 511*a*, 511*b*, and 511*c* provide sufficient electrical insulation by increasing the creepage distances between each phase to ground, and between phases to withstand peak lightning impulse voltages. The fuse clip buses 512 and 516 are made, for example, of copper. The upper and lower fuse clip buses 512 and 516 provide a convenient method for a utility to insert suitable fuses in the fuse compartment 709 illustrated in FIG. 5B and FIGS. 7B-7D. That is, the fuse clips 509*b* installed in the upper and lower fuse clip buses 512 and 516 allow the utility to conveniently install suitable fuses in the fuse compartment 709. The ground bus 506, the voltage transformer switch input buses 510*a*, 510*b*, and 510*c*, and the upper and lower fuse clip buses 512 and 516 are made, for example, of copper. The ground bus 506 and the voltage transformer switch input buses 510*a*, 510*b*, and 510*c* are made, for example, of 2"×¼" copper.

FIG. 5D illustrates a right-side elevation view of the embodiment of the voltage transformer switch assembly 500 shown in FIG. 5A. The voltage transformer switch assembly 500 further comprises a switch handle assembly 513 operably connected to the voltage transformer disconnect switch 100 via a drive system, for example, a chain drive 110. The switch handle assembly 513 comprises a switch handle 514 configured to operate the voltage transformer disconnect switch 100. In an embodiment, the switch handle assembly 513 is a standard, off-the-shelf, commercially available switch handle assembly that is used for load interrupter switches. The switch handle assembly 513 is, for example, the PowerCon® switch handle assembly A013-039. Alternative switch handle assemblies from other manufacturers, for example, Asea Brown Boveri (ABB) Ltd., can also be used. The chain drive 110 comprises a chain 110*b* wrapped around a first sprocket wheel 110*c* and a second sprocket wheel 110*a*. The first sprocket wheel 110*c* is connected to the switch handle assembly 513. The second sprocket wheel 110*a* is operably connected to an end insulator 102*a* illustrated in FIG. 5C and FIGS. 7I-7K, to facilitate smooth motion of the voltage transformer disconnect switch 100 and the switch handle 514. The second sprocket wheel 110*a* is further operably connected to the fixed bracket 107 and the moveable bracket 108 via the shaft 113, for example, the ½-inch bolt with flat and lock washers, as disclosed in the description of FIG. 1D. The shaft 113 is configured to facilitate motion of the switch handle 514.

The moving bracket 108 is operably connected to the end insulator 102*a* via the arm 106 of the voltage transformer switch assembly 500. The grooves 106*a* of the arm 106 illustrated in FIG. 1D and FIG. 7L, are configured to restrict motion of the moving bracket 108, for example, to only about 90 degrees via the bushings 111 moving within the grooves 106*a* of the arm 106. The arm 106 and the moving bracket 108 define an interface between the chain drive 110 and the voltage transformer disconnect switch 100 to prevent the switch handle 514 from operating, for example, more than about 180 degrees from a top position to a bottom position. The grooves 106*a* of the arm 106 are configured to transfer motion between the moving bracket 108 and the voltage transformer disconnect switch 100. The hollow cylindrical bushings 111 illustrated in FIG. 1D move within the grooves 106*a* to provide a smooth motion and to limit the motion of the moving bracket 108 to 90 degrees about the shaft 113, while the switch handle 514 moves from the top position to the bottom position or moves an equivalent of 180 degrees. The moving bracket 108 moves, for example, only about 90 degrees about the shaft 113 to move the switch blades 101 from a connected ON position to a grounded position. In FIGS. 5A-5D, the switch handle 514 is shown in a downward position, which renders the switch blades 101 of the voltage transformer disconnect switch 100 in the grounded position.

In an embodiment as illustrated in FIGS. 5A-5D, the voltage transformer switch assembly 500 further comprises safety interlocking devices 515 and 517 connected to the switch handle assembly 513 and to a door 706 of the fuse compartment 709 of the utility metering cabinet 700 illustrated in FIGS. 7A-7D, respectively. The safety interlocking devices 515 and 517 are, for example, KIRK® keys of Kirk Key Interlock Company, LLC. The safety interlocking devices 515 and 517 are configured to provide safety for opening and closing of the fuse compartment 709, ensuring that the voltage transformer disconnect switch 100 is grounded before the fuse compartment 709 is opened for maintenance. The safety interlocking devices 515 and 517 execute key interlocking between the voltage transformer disconnect switch 100 and the door 706 of the fuse compartment 709 so that, for personal safety, the fuse compartment 709 cannot be entered until the following conditions are met:

(a) the voltage transformer disconnect switch 100 is fully open and visibly grounded; (b) when the voltage transformer disconnect switch 100 is fully open, the switch blades 101 are grounded automatically; and (c) the voltage transformer disconnect switch 100 is locked open with the safety interlocking device 515. The safety interlocking devices 515 and 517 prevent closing of the voltage transformer disconnect switch 100 without first closing and locking of the fuse compartment 709. In an embodiment, the switch handle 514 of the switch handle assembly 513 is pad-lockable in the closed position. The door 706 of the fuse compartment 709, when opened, provides unobstructed access to the voltage transformer and fuses. In an embodiment, the voltage transformer disconnect switch 100 has a minimum voltage rating equal to the supplied customer equipment.

Figures 6A, 6B, 6C:
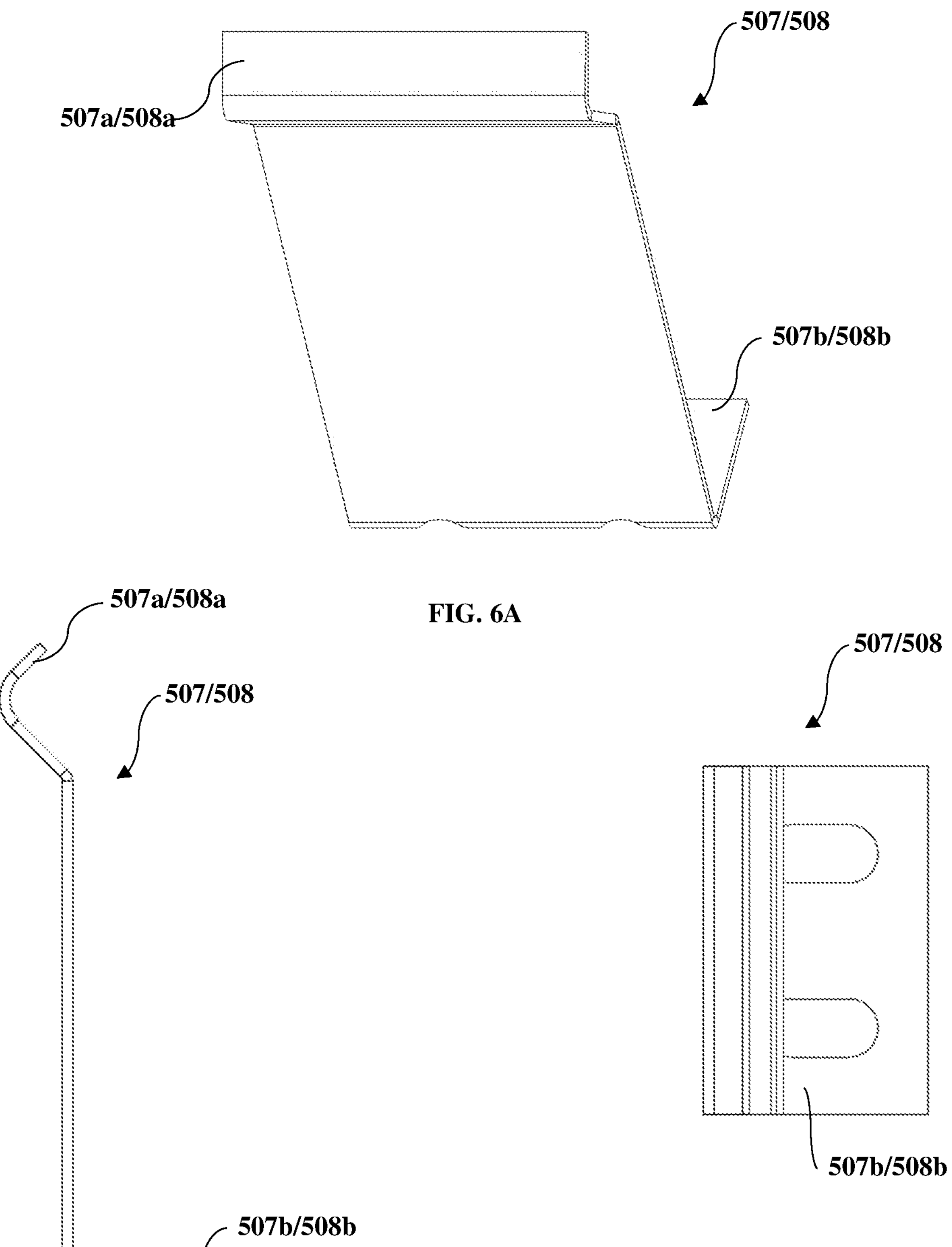
FIGS. 6A-6C illustrate a perspective view, a side elevation view, and a top plan view, respectively, of an embodiment of a clip configured to connect the 15 kV voltage transformer disconnect switch to a main bus via a voltage transformer switch input bus or to a ground bus.

FIGS. 6A-6C illustrate a perspective view, a side elevation view, and a top plan view, respectively, of an embodiment of a clip 507/508 configured to connect the 15 kV voltage transformer disconnect switch 100 to the main bus 519 shown in FIG. 7G via the voltage transformer switch input bus 510, or to the ground bus 506 shown in FIG. 5A. A pair of clips 507/508 of the type shown in FIGS. 6A-6C, is attached back to back such that their curved upper ends 507*a*/508*a* abut each other to allow a tight engagement with the switch blades 101 as illustrated in FIG. 5A. Bases 507*b*/508*b* of each clip 507/508 are attached to the voltage transformer switch input bus 510 or to the ground bus 506 as illustrated in FIG. 5A, to allow a tight connection of the switch blades 101 to the upper main power clips 507 and the lower grounding clips 508, when the switch blades 101 are engaged with the clips 507 or 508. In an example, the length of each clip 507/508 is about 1.5 inches, the height of each clip 507/508 is about 2.875 inches, the width of the base 507*b*/508*b* of each clip 507/508 is about 0.97 inches, and the thickness of each clip 507/508 is about 0.045 inches. The clip 507/508 is made, for example, from a beryllium sheet of 18 gauge (ga) size.

Figure 7A:
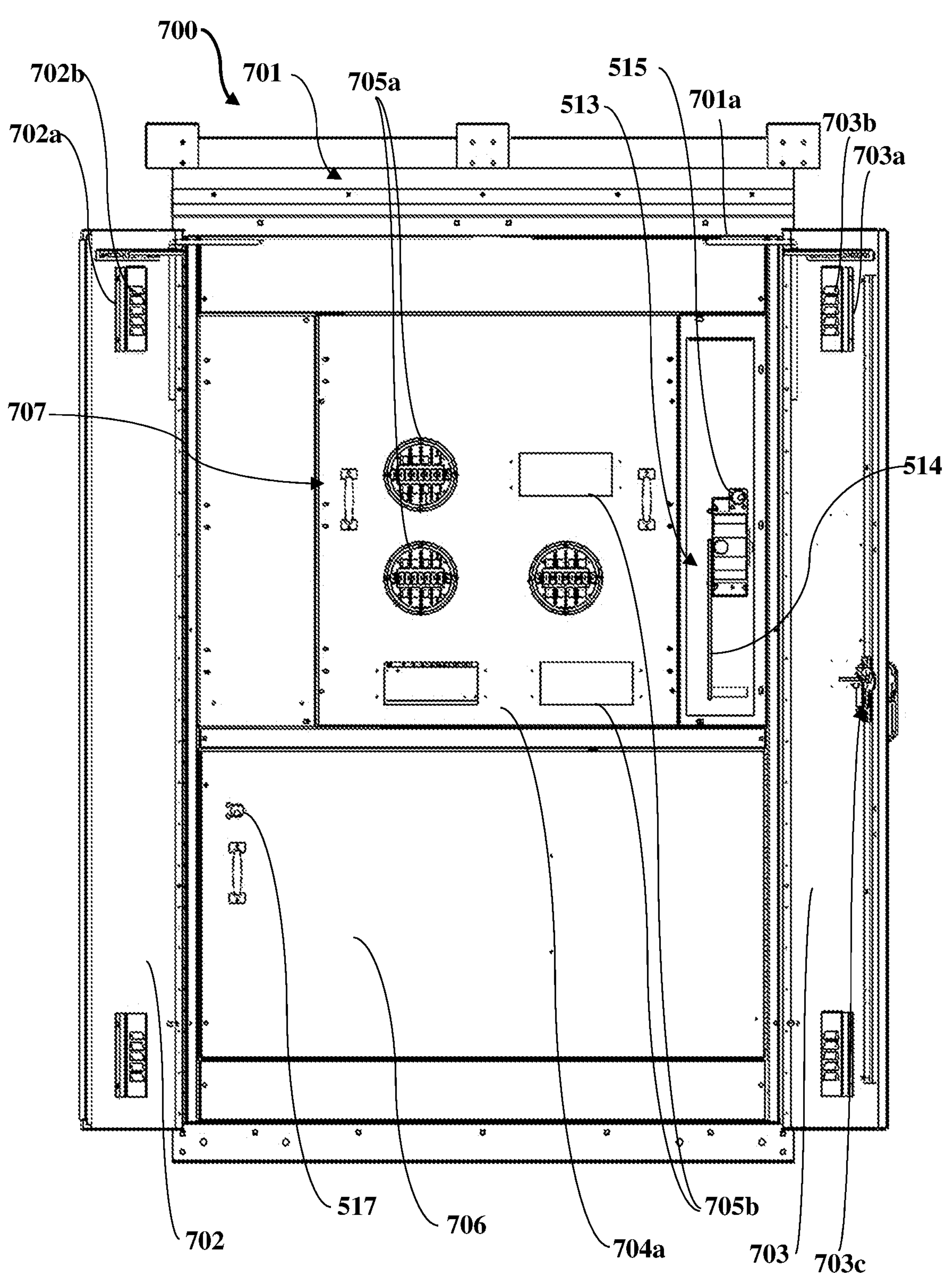
FIG. 7A illustrates a front elevation view of an embodiment of a 15 kV utility metering cabinet, showing front outer doors open and compartment doors closed.
Figure 7B:
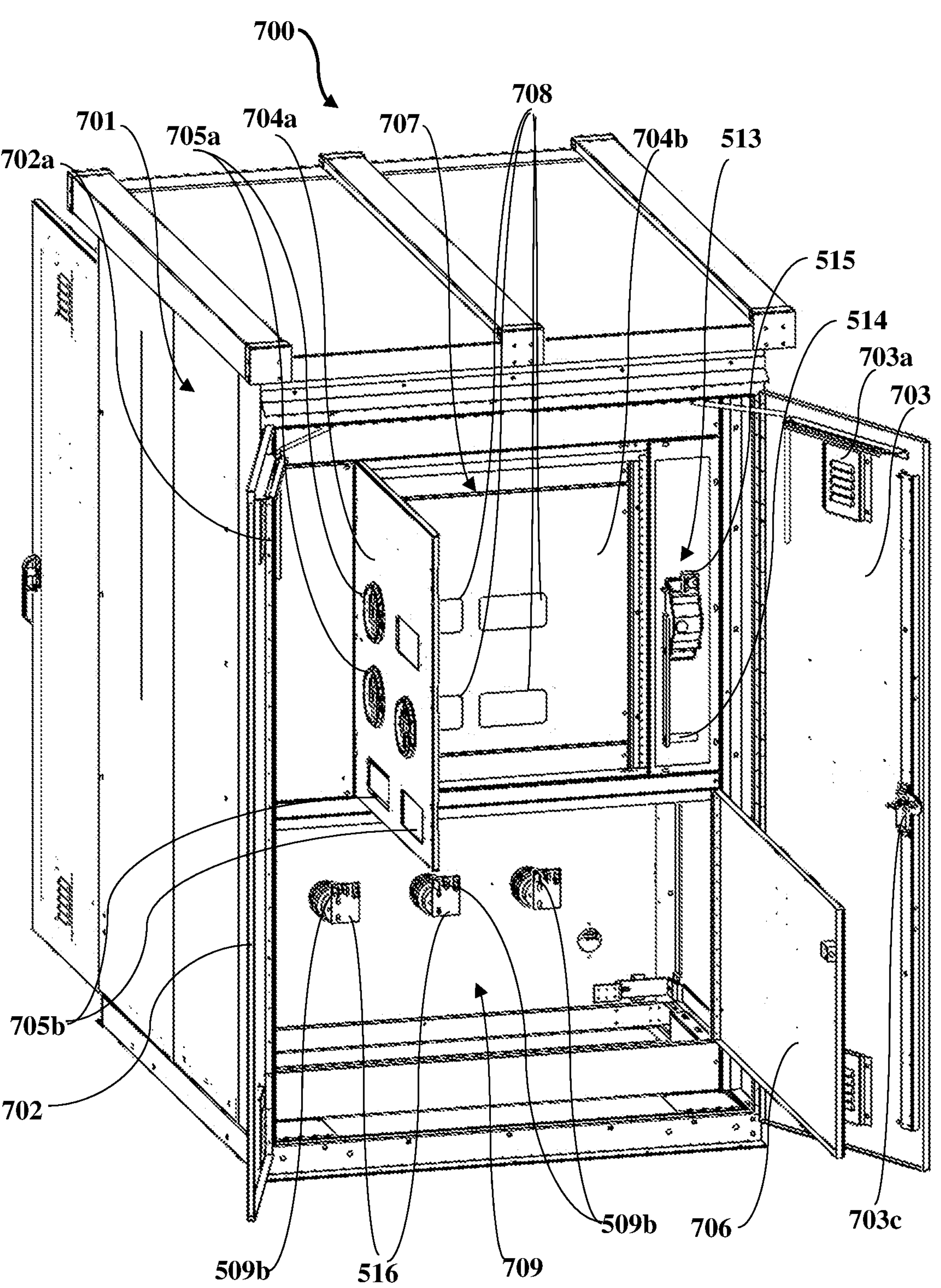
FIG. 7B illustrates a front perspective view of the embodiment of the 15 kV utility metering cabinet shown in FIG. 7A, showing a voltage transformer switch compartment, a fuse compartment, and a switch handle assembly thereof with the compartment doors open.

FIG. 7A illustrates a front elevation view of an embodiment of a 15 kV utility metering cabinet 700, showing front outer doors 702 and 703 open and compartment doors 704*a* and 706 closed. The utility metering cabinet 700 comprises an enclosure 701 configured to meet predefined electrical enclosure requirements comprising, for example, National Electrical Manufacturers Association (NEMA) 3R requirements and the American National Standards Institute (ANSI)/the Institute of Electrical and Electronics Engineers (IEEE) Category A requirements. For example, the enclosure 701 is designed for outdoor NEMA 3R and meets IEEE C37.20.3 Category A requirements. The voltage transformer switch assembly 500 comprising the voltage transformer disconnect switch 100 illustrated in FIGS. 1A-1D and the switch handle assembly 513 with the switch handle 514 is disposed in an upper part of the enclosure 701 of the utility metering cabinet 700, that is, in the voltage transformer switch compartment 707 of the enclosure 701. In an embodiment, the outer doors 702 and 703 comprise gaskets (not shown) and louvers 702*a* and 703*a*. The louvers 702*a* and 703*a* comprise filters 702*b* and 703*b*, respectively, as illustrated in FIGS. 7A-7B. The outer doors 702 and 703 are secured using latches, for example, 703*c*. The latches 703*c* are, for example, 3-point door latches and are secured at the top and bottom of the door 703 with a pair of rollers that secure the door 703 to a frame 701*a* of the enclosure 701.

The voltage transformer switch compartment 707 comprises an outer door 704*a* and an inner door 704*b* as illustrated in FIG. 7B. In an embodiment, the outer door 704*a* of the voltage transformer switch compartment 707 is hinged in two places to provide flexibility. The outer door 704*a* accommodates Underwriters Laboratories (UL)-recognized meter sockets 705*a* and spaces 705*b* for test switches (not shown). Utility meters (not shown) are plugged into the meter sockets 705*a* by a utility. A 5 kV utility metering cabinet is similar to the 15 kV utility metering cabinet 700. In an embodiment, a 5 kV utility metering cabinet with the voltage transformer disconnect switch 100 is constructed identical to the 15 kV utility metering cabinet 700 with the voltage transformer disconnect switch 100. The voltage transformer disconnect switch 100 is more compact and the width of the enclosure of the 5 kV utility metering cabinet is less than the width of the enclosure 701 of the 15 kV utility metering cabinet 700. For example, the width of the 5 kV utility metering cabinet is about 48 inches, and the width of the 15 kV utility metering cabinet 700 is about 60 inches. In an example, the dimensions of the 5 kV utility metering cabinet with the voltage transformer disconnect switch 100 are 48" W×48" D×90" H, and the dimensions of the 15 kV utility metering cabinet 700 with the voltage transformer disconnect switch 100 are 60" W×48" D×90" H, where W denotes width, D denotes depth, and H denotes height. Shorter insulators are used for the voltage transformer disconnect switch 100 in the 5 kV utility metering cabinet and the switch blades 101 are identical for both the 5 kV and 15 kV voltage transformer disconnect switches. In an example, the basic insulation level (BIL) of the 5 kV/15 kV utility metering cabinet is about 95 kV; the dielectric voltage rating of the 5 kV/15 kV utility metering cabinet is about 36 kV; and the current ratings of the 5 kV/15 kV utility metering cabinet and the associated metal-enclosed switchgear are about 600 A, 1200 A, 2000 A, and 3000 A.

FIG. 7B illustrates a front perspective view of the embodiment of the 15 kV utility metering cabinet 700 shown in FIG. 7A, showing a voltage transformer switch compartment 707, a fuse compartment 709, and the switch handle assembly 513 thereof with the compartment doors 704*a* and 706 open. In an embodiment as illustrated in FIG. 7B, the voltage transformer switch compartment 707 is disposed in a front, upper location of the utility metering cabinet 700, and the fuse compartment 709 is disposed in a front, bottom location of the utility metering cabinet 700. The inner door 704*b* of the voltage transformer switch compartment 707 is, for example, a bolted sheet metal door with viewing windows or ports 708 configured to allow viewing of an open position or a closed position of the voltage transformer disconnect switch 100 illustrated in FIGS. 1A-1D, ensuring safety of the utility metering cabinet 700 during maintenance. The viewing windows 708 allow an operator to view the position of the switch blades 101 and determine whether the switch blades 101 are in a connected ON position or in a grounded position. In an embodiment, a Lexan® barrier is fixed inside the inner door 704*b* of the voltage transformer switch compartment 707. The Lexan® barrier provides additional safety for the voltage transformer disconnect switch 100. In another embodiment, the inner door 704*b* is a Lexan® inner door configured to execute both a protection function as well as a viewing function. The Lexan® inner door is free of viewing windows and provides a full view of the voltage transformer disconnect switch 100 and the position of the switch blades 101 for operational safety.

Figure 7C:
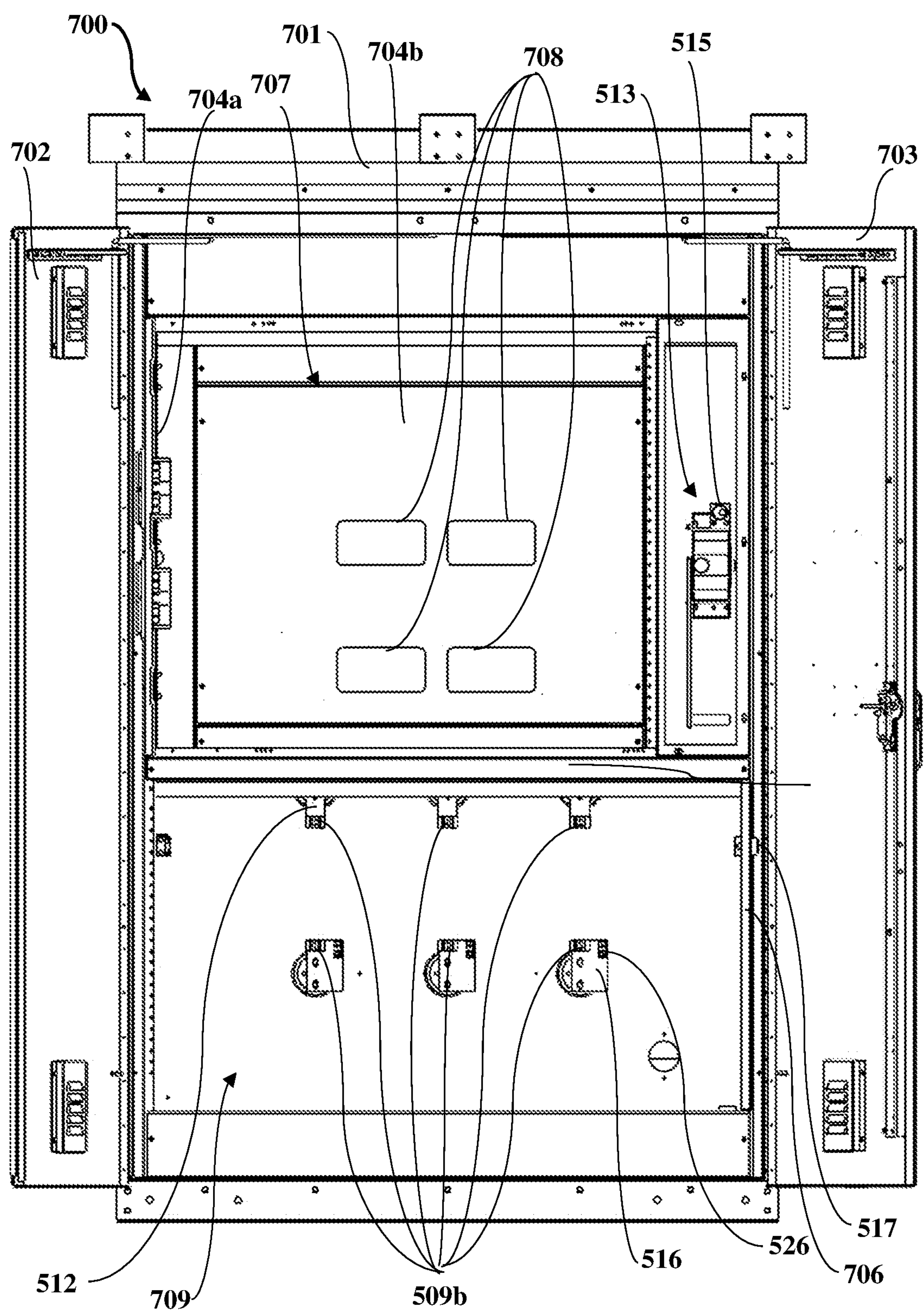
FIG. 7C illustrates a front elevation view of the embodiment of the 15 kV utility metering cabinet shown in FIG. 7A, showing the voltage transformer switch compartment, the fuse compartment, and the switch handle assembly thereof.

The fuse compartment 709 is configured to accommodate a voltage transformer (not shown) and input fuses (not shown) of the voltage transformer. The fuse compartment 709 houses fuses for protection of the voltage transformer in front and the voltage transformer that is mounted at the bottom. The fuse compartment 709 contains fuses for the input of the voltage transformer. FIG. 7C illustrates a front elevation view of the embodiment of the 15 kV utility metering cabinet 700 shown in FIG. 7A, showing the voltage transformer switch compartment 707, the fuse compartment 709, and the switch handle assembly 513 thereof. Also illustrated in FIGS. 7B-7C are fuse clips 509*b* configured to connect to input fuses of the voltage transformer and to connect the input fuses of the voltage transformer to the voltage transformer switch input bus 510, and in turn, to the main bus 519. The fuse clips 509*b* are installed on the upper and lower fuse clip buses 512 and 516 disposed in the fuse compartment 709 of the utility metering cabinet 700. A utility connects the lower fuse clip bus 516 to the input of the voltage transformer using a cable (not shown) from the lower fuse clip bus 516. The cable connects to a mechanical lug 526 disposed, for example, at the right side of the lower fuse clip bus 516 as illustrated in FIGS. 7C-7D and FIG. 11D.

Figure 7D:
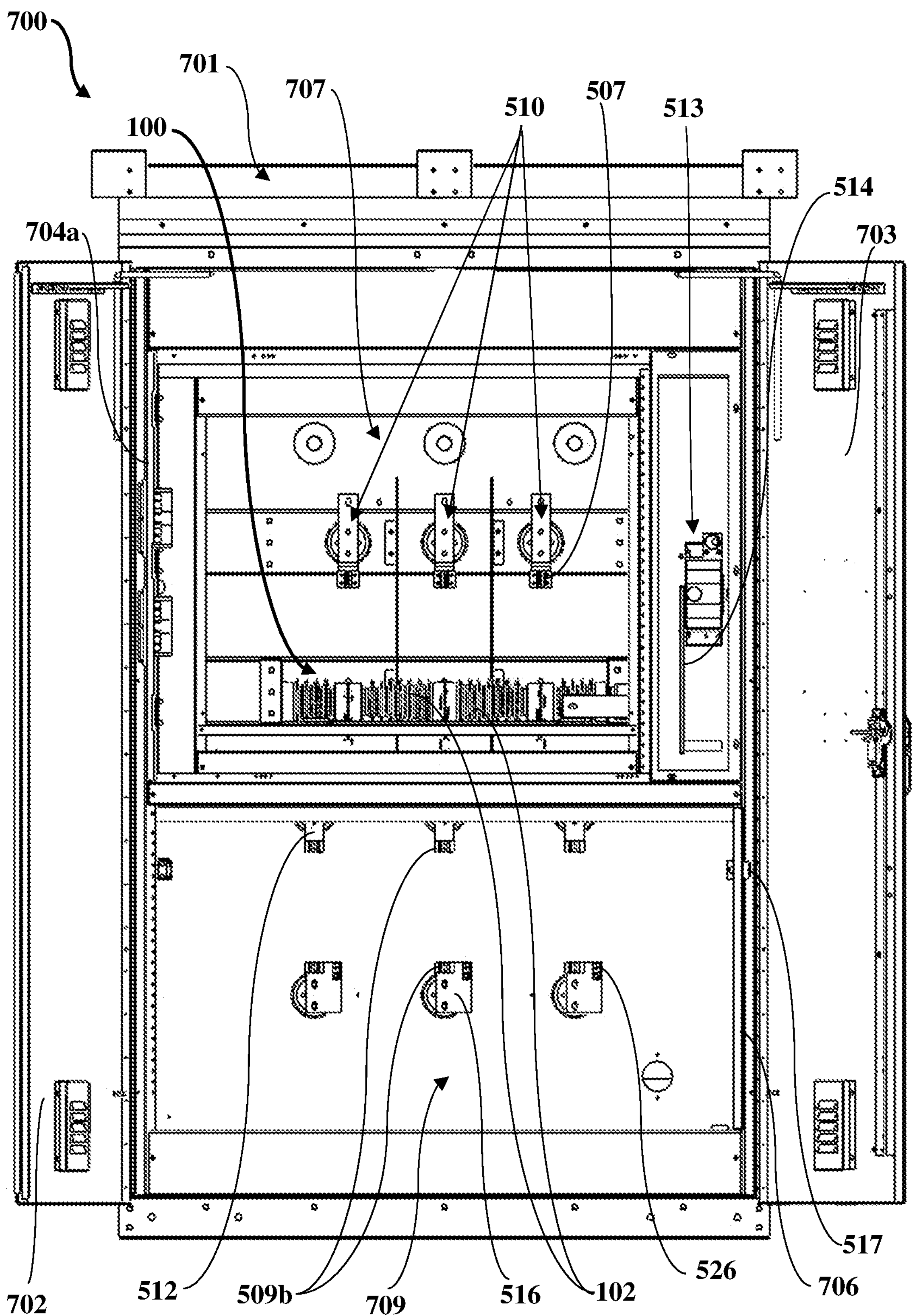
FIG. 7D illustrates a front elevation view of the embodiment of the 15 kV utility metering cabinet shown in FIG. 7A, showing the 15 kV voltage transformer disconnect switch housed in the voltage transformer switch compartment.

FIG. 7D illustrates a front elevation view of the embodiment of the 15 kV utility metering cabinet 700 shown in FIG. 7A, showing the 15 kV voltage transformer disconnect switch 100 housed in the voltage transformer switch compartment 707. FIG. 7D illustrates the switch blades 101 of the voltage transformer disconnect switch 100 in a grounded position. In the grounded position, the switch handle 514 of the switch handle assembly 513 is in a downward position or a down position and the upper parts 101*a* of the switch blades 101 are engaged with the lower grounding clips 508 of the voltage transformer switch assembly 500 as shown in FIG. 5A. The insulators 102 illustrated in FIG. 7D are manufactured, for example, by H-J International, Inc.

Figure 7E:
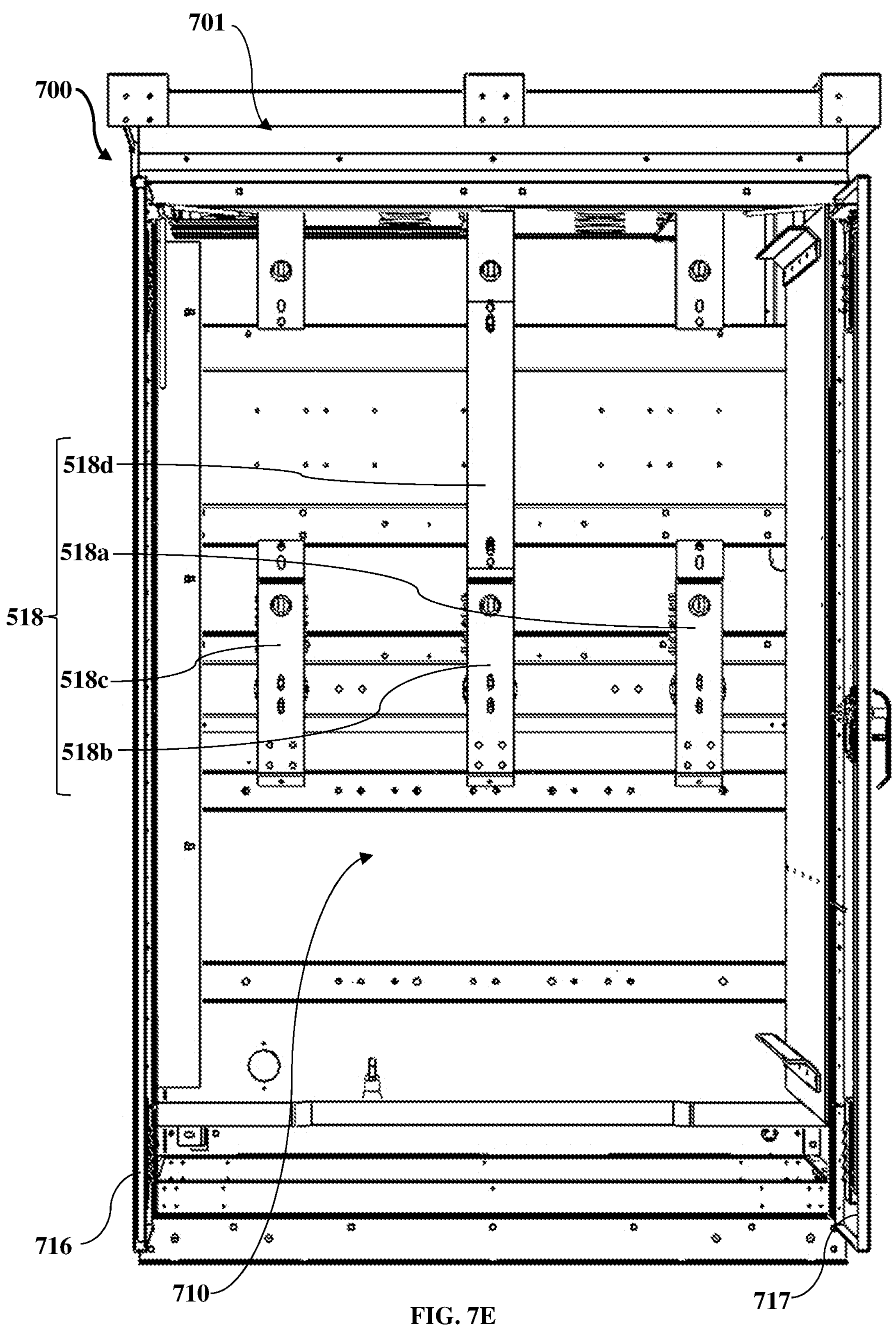
FIG. 7E illustrates a rear elevation view of the embodiment of the 15 kV utility metering cabinet shown in FIG. 7A, showing a current transformer and cable compartment where riser buses are prepared for installing two current transformers.

FIG. 7E illustrates a rear elevation view of the embodiment of the 15 kV utility metering cabinet 700 shown in FIG. 7A, showing a current transformer and cable compartment 710 where a riser bus 518 comprising riser phase buses, namely, an A-phase bus 518*a*, a B-phase bus 518*b*, and a C-phase bus 518*c*, are prepared for installing two current transformers (not shown). FIG. 7E also illustrates rear doors 716 and 717 of the 15 kV utility metering cabinet 700 in an open condition, providing access to the current transformer and cable compartment 710. The riser buses 518*a*, 518*b*, and 518*c* connect to the main bus 519 at the top of the enclosure 701 illustrated in FIG. 7G. The riser bus 518 is located in the rear current transformer and cable compartment 710. The riser bus 518 has provisions for mounting two or three bar type current transformers and supports incoming cable connections. In an embodiment, there is a second riser bus that connects to the main bus 519 if the main bus 519 is in the middle of the rear current transformer and cable compartment 710. The current transformer and cable compartment 710 is disposed in a rear location of the utility metering cabinet 700. The current transformer and cable compartment 710 is configured to house the current transformers. The current transformer and cable compartment 710 houses the main bus 519 where the current transformers are connected. The main bus 519 is brought out for current transformer and cable connections in the rear location of the utility metering cabinet 700. The main bus 519 is also connected to the voltage transformer disconnect switch 100 illustrated in FIGS. 1A-1D, via cables 520 and the riser buses 518*a*, 518*b*, and 518*c* illustrated in FIG. 11A and FIGS. 7E-7G. The riser buses 518*a*, 518*b*, and 518*c* are, for example, copper (Cu) buses. In an example, the main bus sizes comprise: one 600 A copper bus of size ¼"×2"; one 1200 A copper bus of size ¼"×4"; two 2000 A copper buses, each of size ¼"×4", or one 2000 A copper bus of size ⅜"×6"; and three 3000 A copper buses, each of size ¼"×4", or two 3000 A copper buses, each of size ¼"×6". The current transformer and cable compartment 710 contains cable connections at the bottom of the three bus bars, that is, the three riser buses 518*a*, 518*b*, and 518*c*. The current transformers are installed by a utility and hence are not supplied by a manufacturer of the medium voltage switchgear. The current transformers used by the utility are, for example, bar type current transformers. The utility mounts two current transformers, that is, phases A and C, to bridge the gaps in the phase buses A 518*a* and C 518*c* illustrated in FIG. 7E.

Figure 7F:
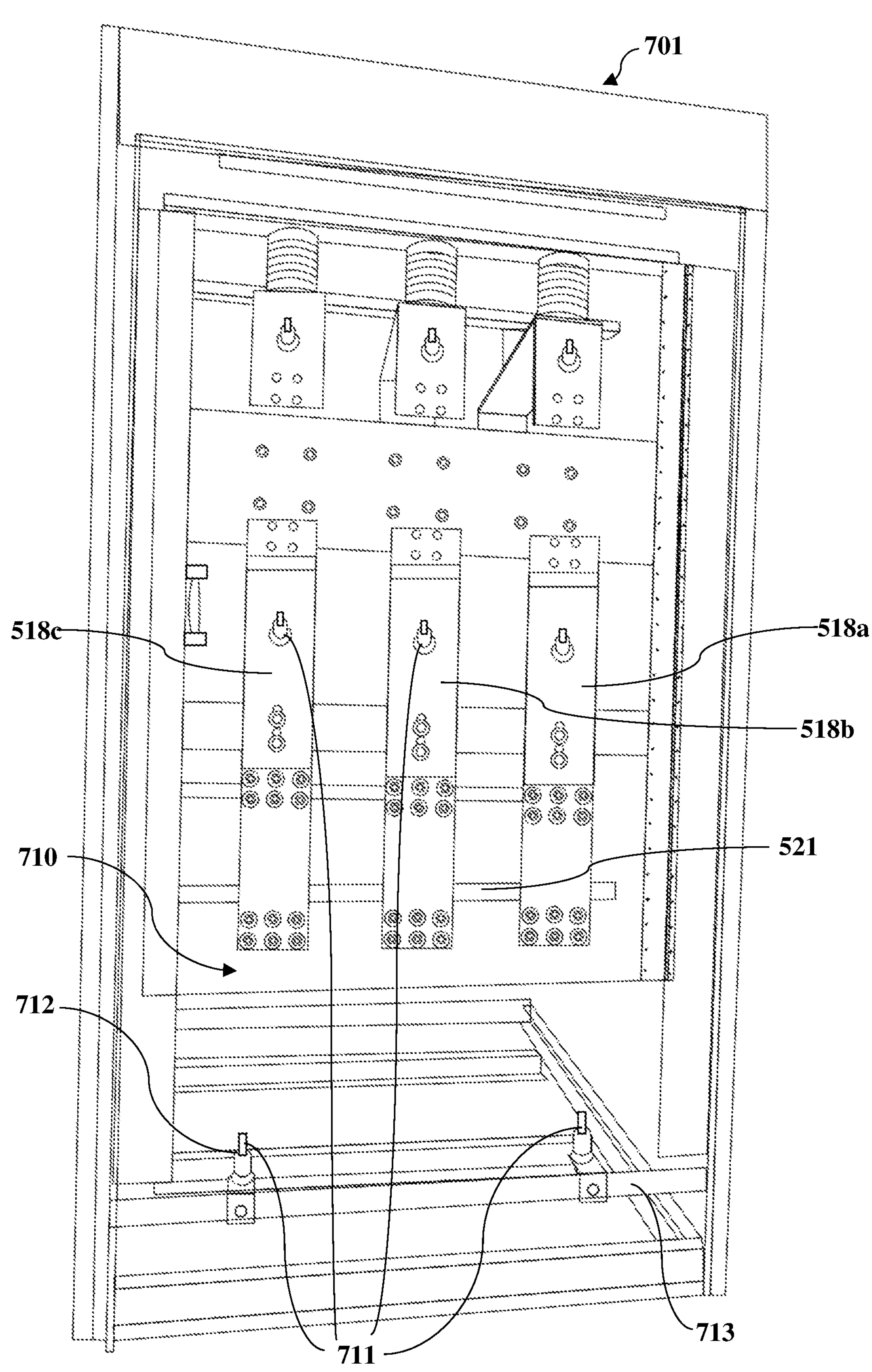
FIG. 7F illustrates a partial, rear perspective view of the embodiment of the 15 kV utility metering cabinet shown in FIG. 7A, showing the riser buses prepared for installing three current transformers in the current transformer and cable compartment.
Figure 7G:
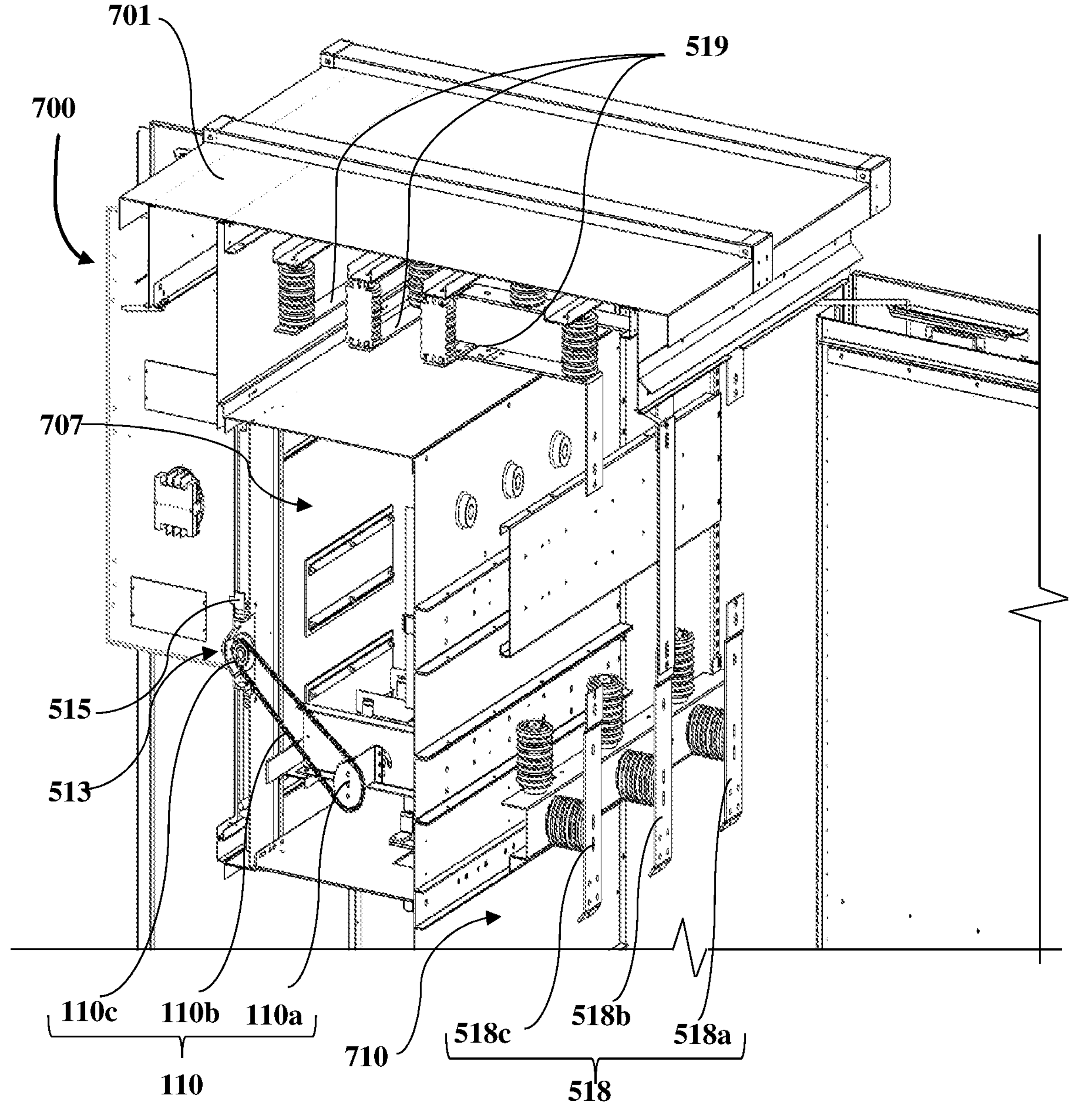
FIG. 7G illustrates a partial, rear perspective, cutaway view of the embodiment of the 15 kV utility metering cabinet shown in FIG. 7A, showing the main bus at the top of an enclosure of the 15 kV utility metering cabinet.

FIG. 7F illustrates a partial, rear perspective view of the embodiment of the 15 kV utility metering cabinet 700 shown in FIG. 7A, showing the riser buses 518*a*, 518*b*, and 518*c* prepared for installing three current transformers (not shown) in the current transformer and cable compartment 710. As some utilities may elect to use three current transformers instead of two current transformers, a link 518*d* of the B-phase bus 518*b* is removed to install a third current transformer (not shown) as illustrated in FIG. 7F. In an example, a bar type current transformer is installed for B-phase, if needed, by supplying the utility metering cabinet 700 with a B-phase bus link 518*d* as illustrated in FIG. 7E, that can be removed easily. The current transformers are mounted in the current transformer and cable compartment 710 in accordance with the Electric Utility Service Equipment Requirements Committee (EUSERC) mounting guidelines. The input connections to the voltage transformer disconnect switch 100 illustrated in FIGS. 1A-1D, are cable connected using a high voltage cable with phases A, B, and C. Due to large distances through air between the phases, a lower voltage-rated cable, that is, a kV-rated cable is used for the input connections. For example, a 5 kV-rated cable is used for the 15 kV voltage transformer disconnect switch 100, a 15 kV-rated cable is used for the 27 kV voltage transformer disconnect switch 1200 illustrated in FIG. 12, and a 27 kV-rated cable is used for the 38 kV voltage transformer disconnect switch 1800 illustrated in FIGS. 18A-18D. Furthermore, since the phase-to-phase and phase-to-ground distances for the cables 520 are large, in an embodiment, 600V AC-rated cables are used for the input connections. For example, a stiff 600V AC-rated cable with a polyvinyl chloride (PVC) insulation manufactured by Grayline, LLC, that is easy to route inside the enclosure 701 and maintain a proper distance between the phases is used to provide a reliable connection that saves cost. FIG. 11A illustrates a 600V-rated cable 520*b* with a PVC insulation for the B-phase. The 600V-rated cable 520*b* is small in diameter. The 600V-rated cable 520*b* is stiff and easy to route inside a medium voltage utility metering cabinet. In an embodiment, a braided copper wire with no insulation is used for switch-to-fuse bus connections. These cable connections are basic insulated level (BIL) and dielectric safety tested by Underwriters Laboratories to ensure that there is no flash-over. The cables (not shown in FIG. 7F) that connect the voltage transformer switch input bus 510 illustrated in FIG. 7D to the riser buses 518*a*, 518*b*, and 518*c* illustrated in FIGS. 7E-7F, are secured to Glastic supports 521 with cable ties. The Glastic supports 521 maintain a suitable distance between phase cables. Also illustrated in FIG. 7F are ground studs 711 with insulating covers 712 configured to facilitate equipment grounding before performing service or maintenance of the current transformer and cable compartment 710 as disclosed in the description of FIG. 9B.

The voltage transformer switch compartment 707, the fuse compartment 709, and the current transformer and cable compartment 710 illustrated in FIGS. 7B-7F, are arranged to meet predefined utility requirements comprising, for example, Electric Utility Service Equipment Requirements Committee (EUSERC) requirements for the utility metering cabinet 700 of the medium voltage switchgear. The voltage transformer disconnect switch 100 illustrated in FIGS. 1A-1D follows the EUSERC guidelines and accommodates minor changes, for example, enclosure dimensional changes, number of current transformers connected there-within such as three (3) current transformers instead of two (2) current transformers, etc., required by utilities that are not members of the EUSERC.

FIG. 7G illustrates a partial, rear perspective, cutaway view of the embodiment of the 15 kV utility metering cabinet 700 shown in FIG. 7A, showing the main bus 519 at the top of the enclosure 701 of the 15 kV utility metering cabinet 700. The riser buses 518*a*, 518*b*, and 518*c* disposed in the current transformer and cable compartment 710 connect to the main bus 519 at the top of the enclosure 701. Three upper main power clips 507 illustrated in FIG. 5A connect the voltage transformer disconnect switch 100 to the main bus 519 via the 3-phase riser buses 518*a*, 518*b*, and 518*c* as follows. The upper main power clips 507 are connected to the voltage transformer switch input bus 510 comprising the input buses 510*a*, 510*b*, and 510*c* illustrated in FIG. 5A, which are cable connected to the riser buses 518*a*, 518*b*, and 518*c* disposed in the current transformer and cable compartment 710. The riser buses 518*a*, 518*b*, and 518*c* are in turn connected to the main bus 519 at the top of the enclosure 701 as illustrated in FIG. 7G. Also illustrated in FIG. 7G is the chain drive 110 comprising the chain 110*b* wrapped around the first sprocket wheel 110*c* and the second sprocket wheel 110*a* in the voltage transformer switch compartment 707.

Figure 7H:
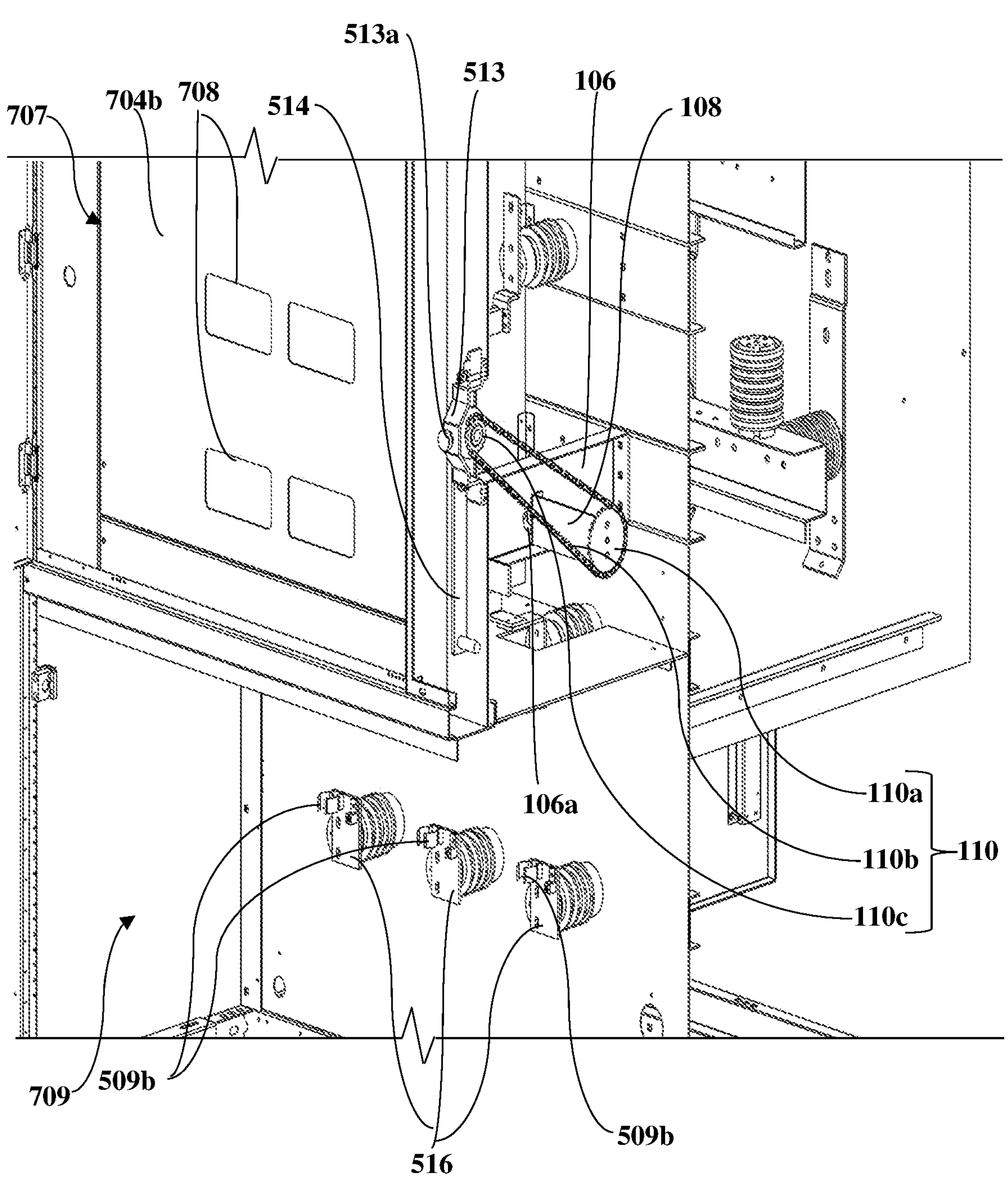
FIG. 7H illustrates a partial, right-side perspective, cutaway view of the embodiment of the 15 kV utility metering cabinet shown in FIG. 7A, showing the switch handle assembly operably connected to the 15 kV voltage transformer disconnect switch via a drive system.
Figure 7I:
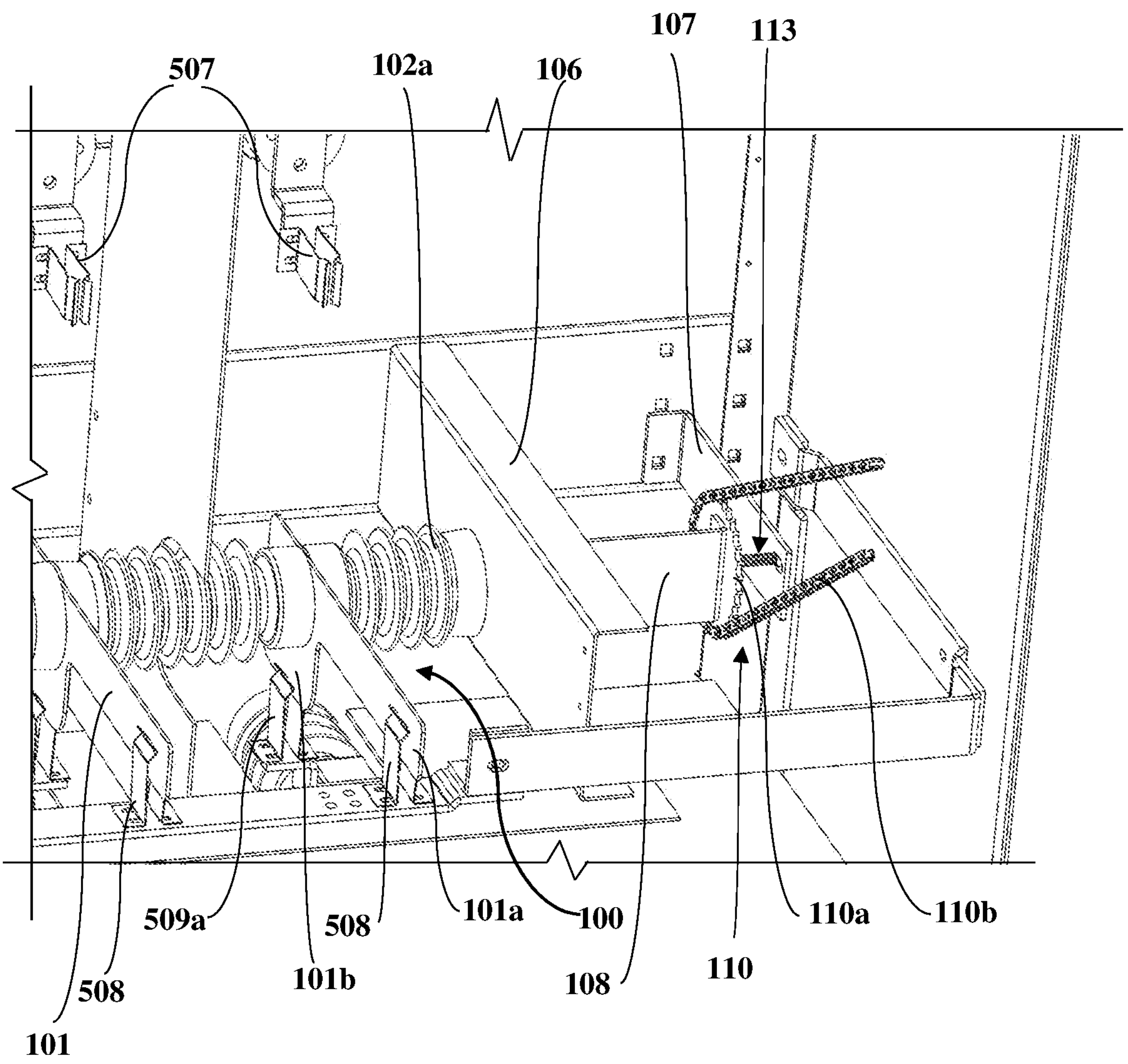
FIGS. 7I-7L illustrate partial, cutaway, perspective views of the drive system in the voltage transformer switch assembly of the embodiment of the 15 kV utility metering cabinet shown in FIG. 7A.
Figure 7J:
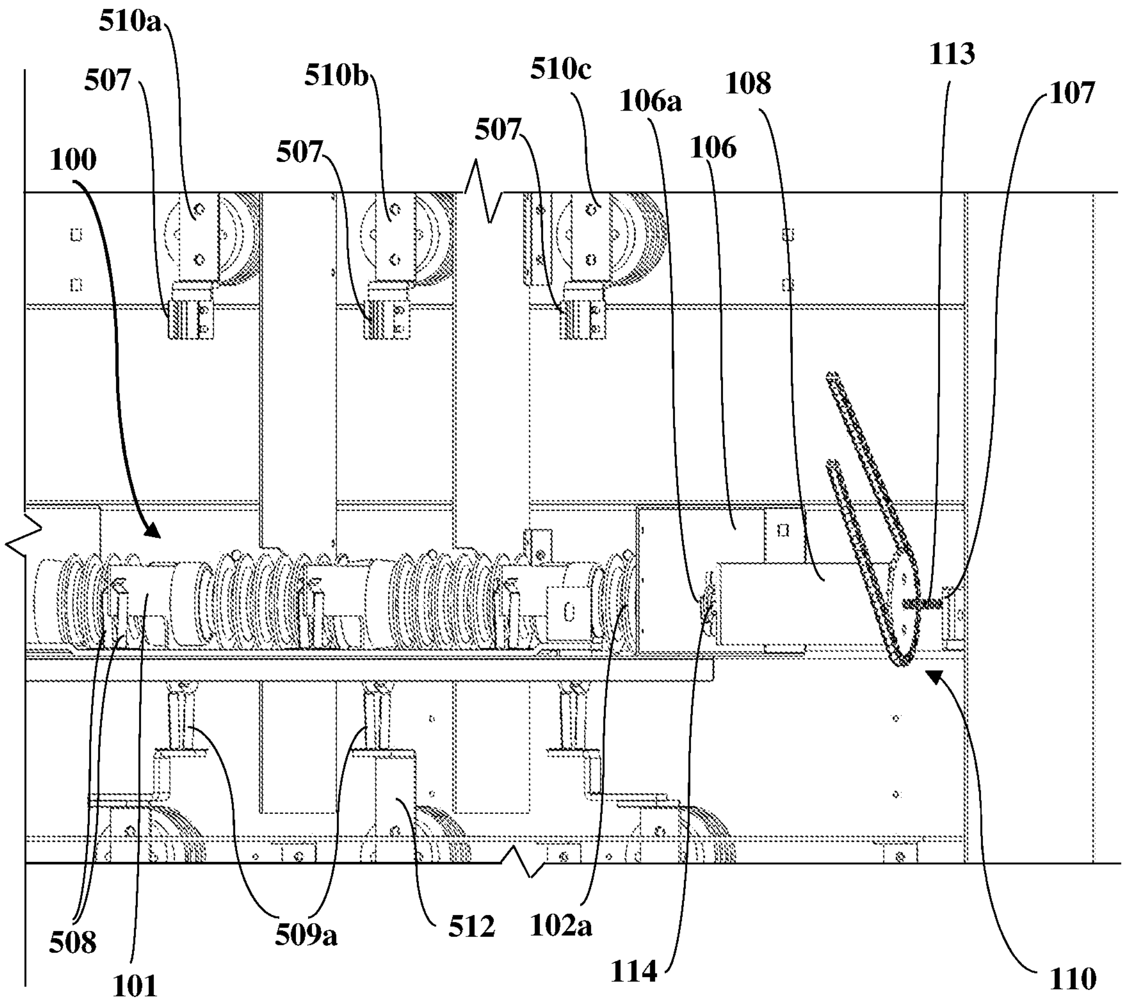
Figure 7K:
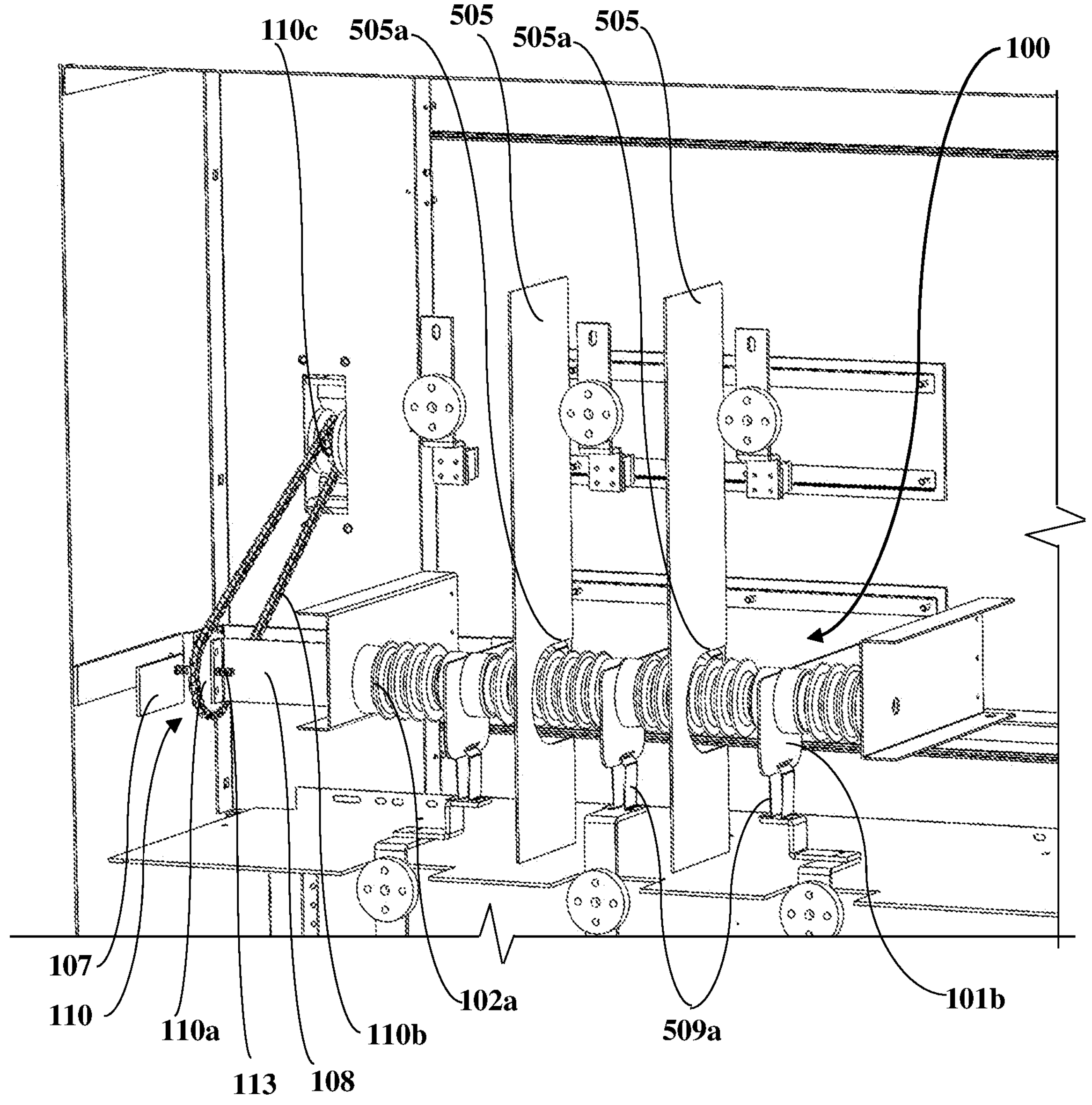
Figure 7L:
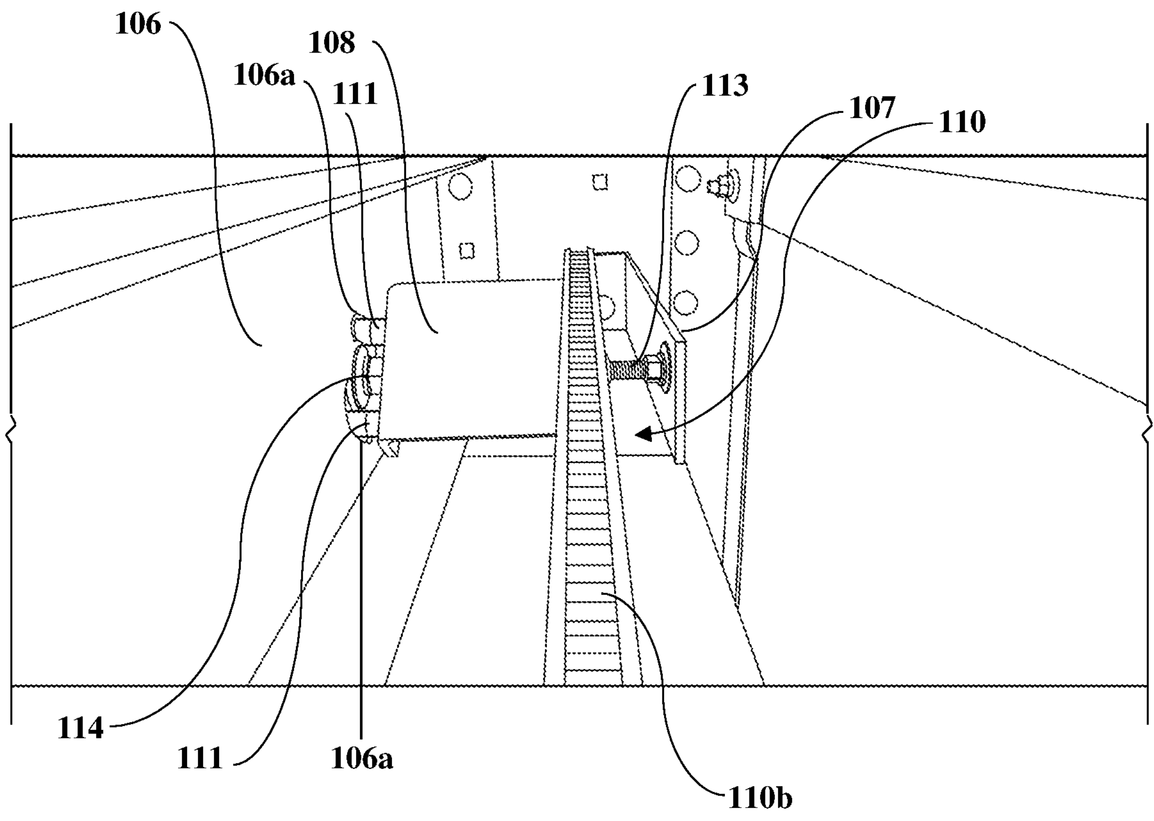
Figure 8A:
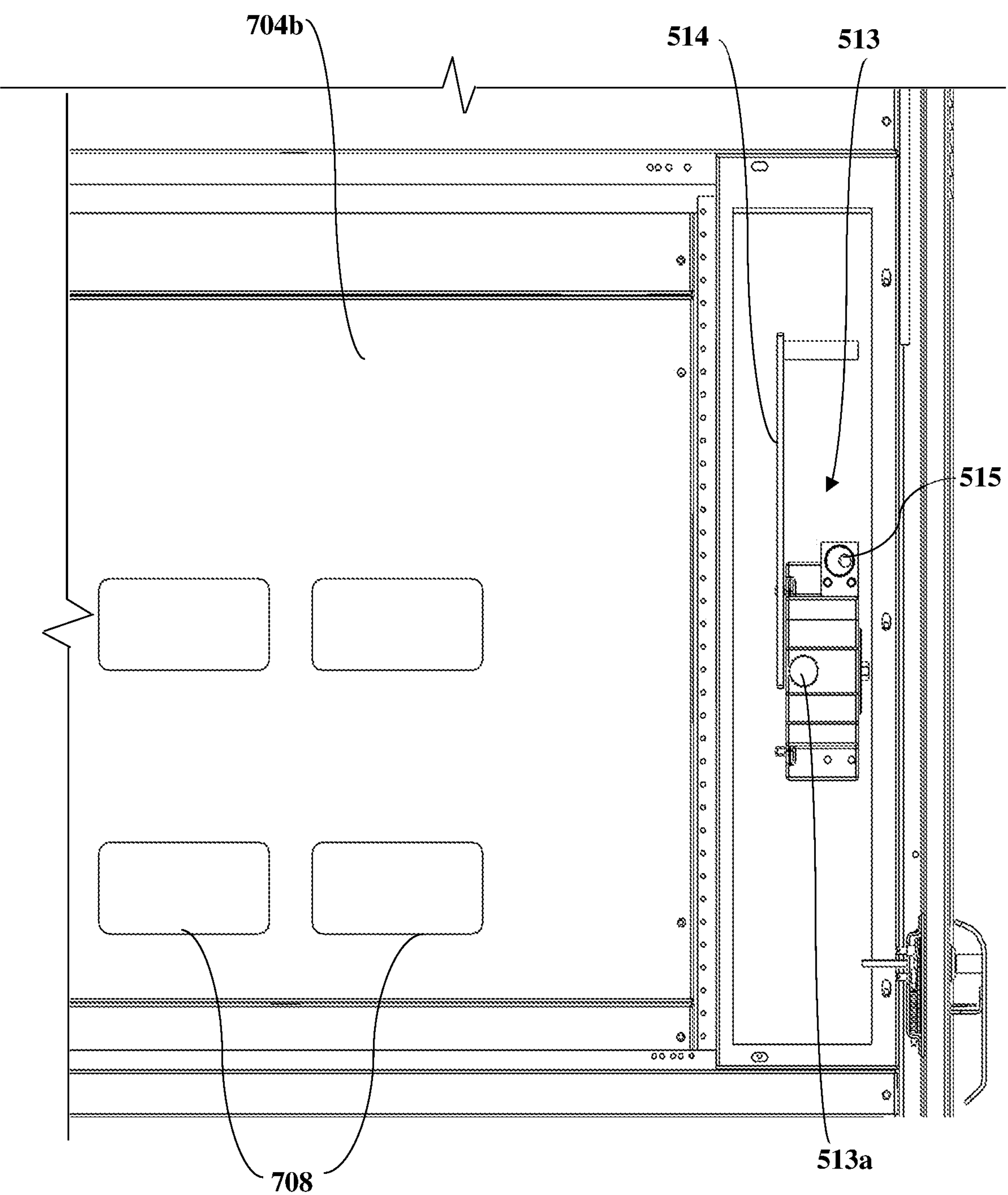
FIGS. 8A-8B illustrate embodiments of safety interlocking devices connected to the switch handle assembly and a door of the fuse compartment of the embodiment of the 15 kV utility metering cabinet shown in FIGS. 7A-7B.

FIG. 7H illustrates a partial, right-side perspective, cut-away view of the embodiment of the 15 kV utility metering cabinet 700 shown in FIG. 7A, showing the switch handle assembly 513 operably connected to the 15 kV voltage transformer disconnect switch 100 via a drive system, that is, the chain drive 110. At one end, for example, the right end, of the 15 kV voltage transformer disconnect switch 100, the switch handle 514 is connected to the switch handle assembly 513 via the chain drive 110. The sprocket wheel 110*a* is attached to the moving bracket 108, which in turn, connects to an end insulator 102*a* proximal to the arm 106 illustrated in FIGS. 7I-7K, via the hollow, generally cylindrical bushings 111 illustrated in FIG. 1D. The hollow, generally cylindrical bushings 111 move within the grooves 106*a* of the arm 106 to provide a smooth motion and to limit the motion of the insulator-switch-blade shaft and in turn the moving bracket 108 to 90 degrees while the switch handle 514 of the switch handle assembly 513 moves from a top position to a bottom position or an equivalent of 180 degrees. The motion of the switch handle 514 is restricted by the grooves 106*a* cut in the arm 106. In an embodiment, two ⅜-inch screws connect the sprocket wheel 110*a* to the insulator 102*a* of the voltage transformer disconnect switch 100 to facilitate smooth motion for the voltage transformer disconnect switch 100 and the switch handle 514 that operates the voltage transformer disconnect switch 100. The switch handle assembly 513 comprises a circular knob 513*a* as illustrated in FIG. 7H and FIG. 8A, configured to be pulled out to operate the switch handle 514. The circular knob 513*a* ensures that the switch handle 514 is not accidently operated when the power is on.

The switch handle 514 of the switch handle assembly 513 is shown in a downward position or a bottom position in FIG. 7H. When the switch handle 514 is in the downward position, the upper parts 101*a* of the switch blades 101 of the voltage transformer disconnect switch 100 are engaged with the lower grounding clips 508 that are connected to the ground bus 506 as illustrated in FIG. 5A, thereby grounding the voltage transformer disconnect switch 100. The insulator-switch-blade shaft and in turn the moving bracket 108 moves only about 90 degrees to move the switch blades 101 from a connected ON position to a grounded position.

FIGS. 7I-7L illustrate partial, cutaway, perspective views of the drive system, that is, the chain drive 110, in the voltage transformer switch assembly 500 of the embodiment of the 15 kV utility metering cabinet 700 shown in FIG. 7A. When the switch handle 514 moves in an upward direction from the bottom position, the first sprocket wheel 110*c* that is connected to the switch handle 514 rotates, for example, in a clockwise direction, causing the second sprocket wheel 110*a* to also rotate in a clockwise direction by the transfer of motion from the chain 110*b* of the chain drive 110. The rotation of the second sprocket wheel 110*a* in the clockwise direction causes the moving bracket 108 to rotate about 90 degrees in a clockwise direction about the shaft 113 from a vertical position illustrated in FIGS. 7G-7K to a horizontal position as illustrated in FIG. 7L. The rotation of the moving bracket 108 is restricted by the grooves 106*a* cut into the arm 106 of the voltage transformer disconnect switch 100 illustrated in FIG. 7H and FIG. 7J. The bushings 111 connected to one end 108*a* of the moving bracket 108 illustrated in FIG. 1D, move within and are restricted by the grooves 106*a* to restrict the motion of the moving bracket 108 and in turn the switch handle 514 via the chain drive 110. Similarly, when the switch handle 514 moves in a downward direction from the top position, the first sprocket wheel 110*c* that is connected to the switch handle 514 rotates, for example, in a counter clockwise direction, causing the second sprocket wheel 110*a* to also rotate in a counter clockwise direction by the transfer of motion from the chain 110*b* of the chain drive 110. The rotation of the second sprocket wheel 110*a* in the counter clockwise direction causes the moving bracket 108 to rotate about 90 degrees about the shaft 113 in a counter clockwise direction from the horizontal position illustrated in FIG. 7L to the vertical position illustrated in FIGS. 7G-7K. The rotation of the moving bracket 108 about the shaft 113 is restricted by the grooves 106*a* cut into the arm 106 of the voltage transformer disconnect switch 100. The bushings 111 move within and are restricted by the grooves 106*a* to restrict the motion of the moving bracket 108 and in turn the switch handle 514 via the chain drive 110.

Figure 8B:
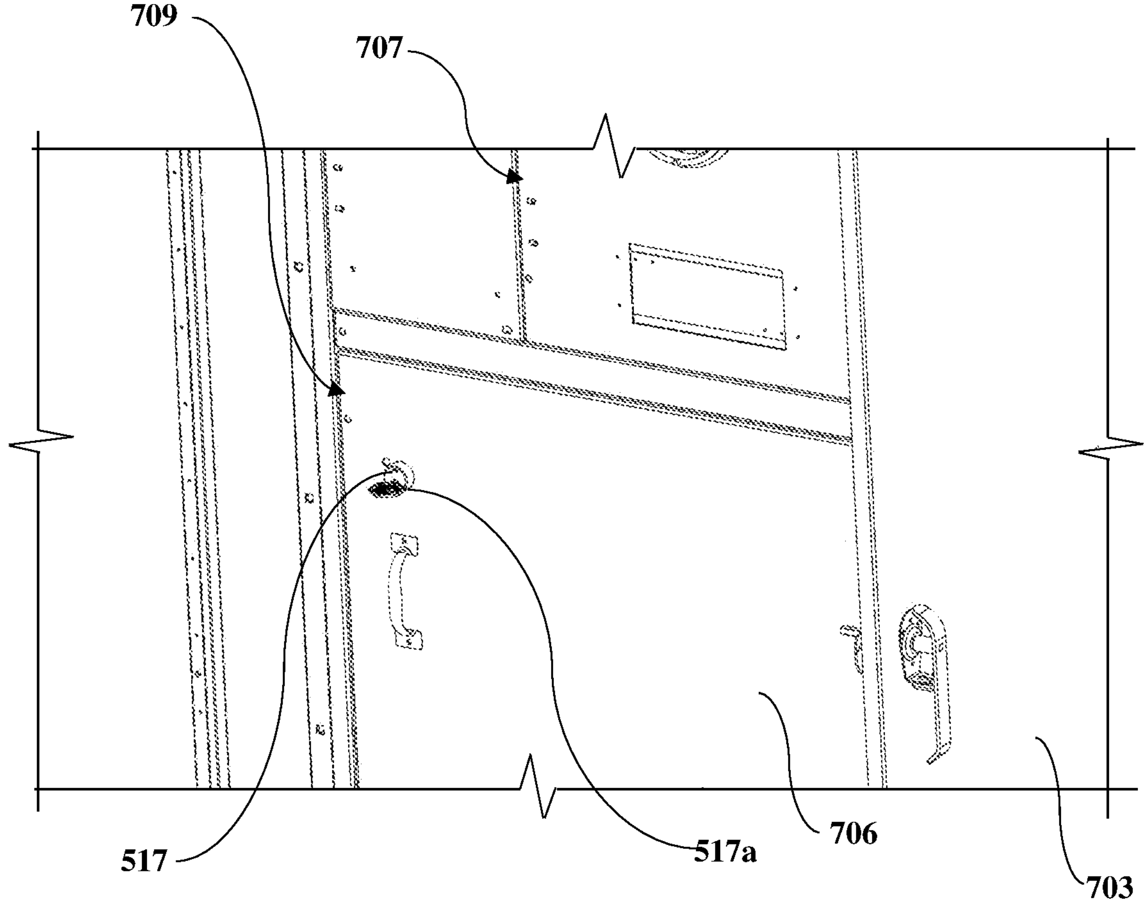

FIGS. 8A-8B illustrate embodiments of safety interlocking devices 515 and 517 connected to the switch handle assembly 513 and a door 706 of the fuse compartment 709 of the embodiment of the 15 kV utility metering cabinet 700 shown in FIGS. 7A-7B. The safety interlocking devices 515 and 517 are, for example, KIRK® keys. All utilities require that the fuse compartment 709 cannot be opened when the voltage transformer disconnect switch 100 illustrated in FIGS. 1A-1D, is in the connected ON position, for safety. The safety interlocking devices 515 and 517 are provided to ensure that the fuse compartment 709 is not opened when the main bus 519 is energized and the fuse compartment 709 has high voltage at the fuse clip buses 512 and 516 illustrated in FIGS. 7C-7D. The safety interlocking devices 515 and 517 ensure that the fuse compartment 709 can be opened only when the switch blades 101 of the voltage transformer disconnect switch 100 are connected to the ground bus 506 as illustrated in FIG. 5A. To open the door 706 of the fuse compartment 709, the power is first disconnected to terminate the flow of power to the voltage transformer switch compartment 707 illustrated in FIG. 7D. A switch knob 513*a* is then pulled to operate the switch handle assembly 513 and the voltage transformer disconnect switch 100 is opened, that is, the voltage transformer disconnect switch 100 is grounded. At this point, a key 517*a* from the safety interlocking device 515 attached to the top of the switch handle assembly 513 can be removed, and the same key 517*a* is used to open the door 706 of the fuse compartment 709 as illustrated in FIG. 8B. FIG. 8B illustrates the key 517*a* used to open the door 706 of the fuse compartment 709. When the voltage transformer disconnect switch 100 is in the closed position, that is, the connected ON position, the key 517*a* cannot be removed and therefore the fuse compartment 709 cannot be opened, thereby ensuring safety of the voltage transformer disconnect switch 100.

Figure 9A:
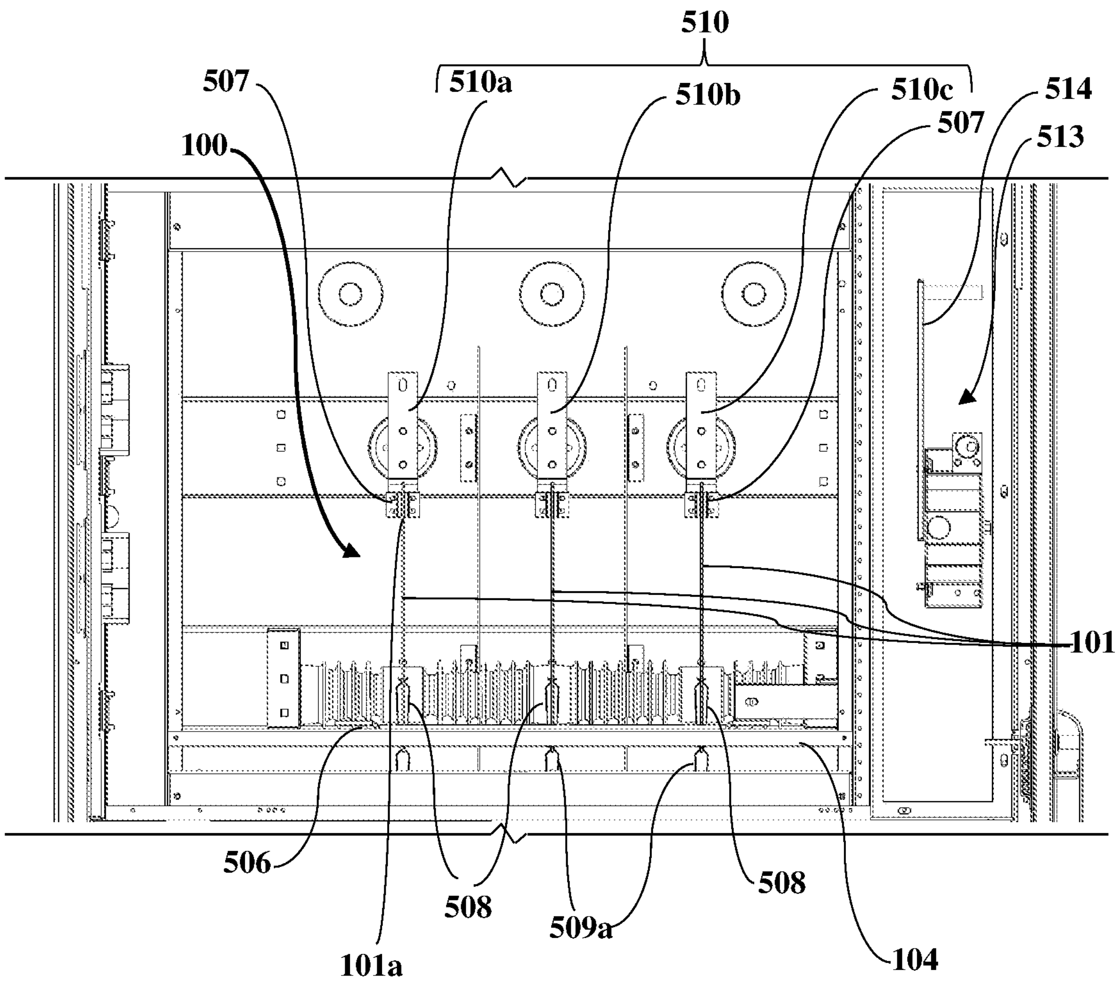
FIG. 9A illustrates a front elevation view of the 15 kV voltage transformer disconnect switch, showing the switch blades in a connected ON position.

FIG. 9A illustrates a front elevation view of the 15 kV voltage transformer disconnect switch 100, showing the switch blades 101 in a connected ON position. As used herein, "connected ON position" refers to a state of the voltage transformer disconnect switch 100 when the voltage transformer (not shown) is actively connected to an electric circuit within the utility metering cabinet 700 shown in FIG. 7A and provides voltage measurements. In the connected ON position, the switch handle 514 of the switch handle assembly 513 is in an upward position or a top position and the upper parts 101*a* of the switch blades 101 are engaged with the upper main power clips 507 of the voltage transformer switch assembly 500 shown in FIG. 5A. When the voltage transformer disconnect switch 100 is in the connected ON position, the voltage transformer disconnect switch 100 provides a direct electrical connection between the voltage transformer and the monitored electric circuit, thereby allowing the voltage transformer to accurately measure a voltage level of the electric circuit and provide the voltage level information, for example, to protective relays, meters, or other monitoring devices.

Figure 9B:
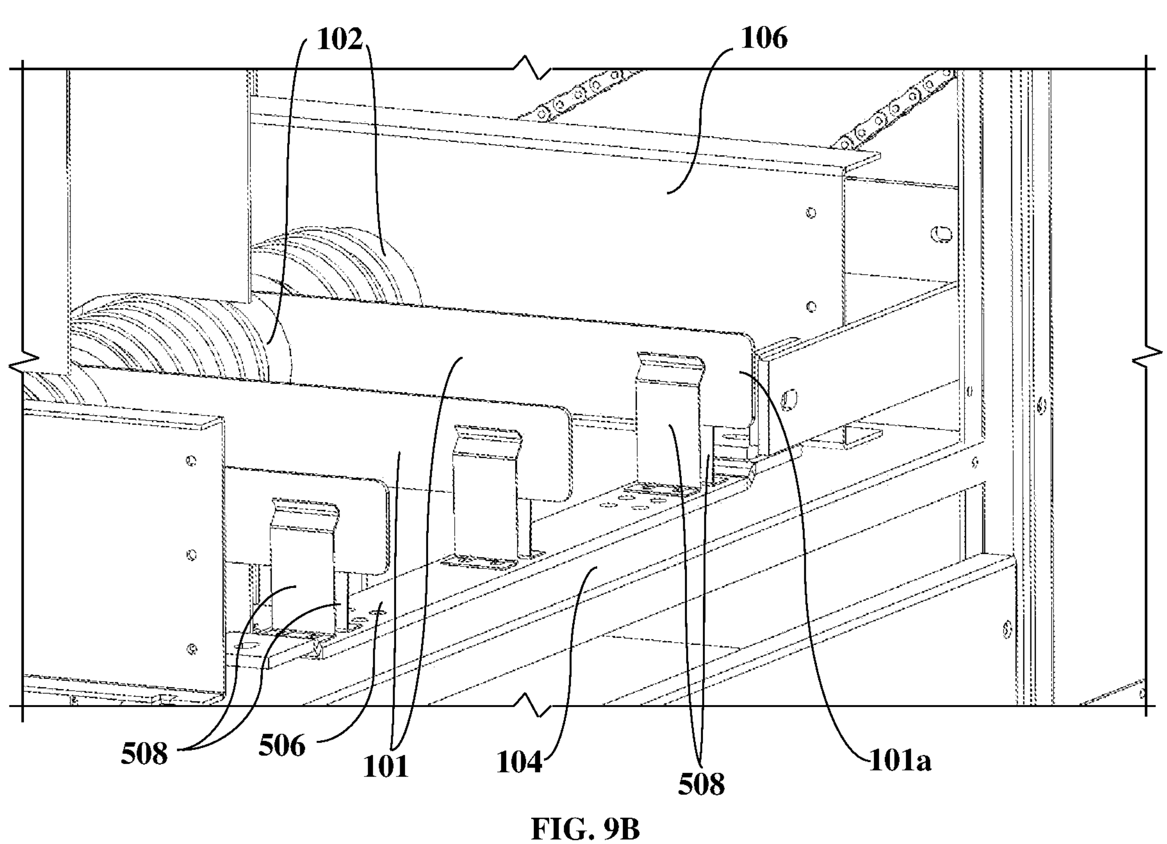
FIG. 9B illustrates a perspective view showing switch blades of the 15 kV voltage transformer disconnect switch in a grounded position, where upper parts of the switch blades are connected to lower grounding clips.

FIG. 9B illustrates a perspective view showing the switch blades 101 of the 15 kV voltage transformer disconnect switch 100 in a grounded position, where the upper parts 101*a* of the switch blades 101 are connected to the lower grounding clips 508. The lower grounding clips 508 are attached to the ground bus 506 using fasteners, for example, screws, bolts, etc. The ground bus 506 is disposed on and supported by the ground bus support channel 104. When the medium voltage switchgear is shut down for maintenance or service, the voltage transformer disconnect switch 100 is grounded for safety by connecting the upper parts 101*a* of the switch blades 101 to the ground bus 506 via the lower grounding clips 508 as illustrated in FIG. 9B. The voltage transformer disconnect switch 100, when in the grounded position, serves the purpose of grounding the voltage transformer (not shown) to provide safety for personnel and equipment, particularly during maintenance or troubleshooting activities of a voltage transformer section. While the voltage transformer is safely serviced by the voltage transformer disconnect switch 100 in the grounded position, there is a need for servicing the current transformer and cable compartment 710 in the back of the enclosure 701 illustrated in FIGS. 7E-7F. In an embodiment, servicing of the current transformer and cable compartment 710 is accomplished by ground studs 711 that are used to connect the riser buses 518*a*, 518*b*, 518*c* to the ground bus 713 at the bottom of the enclosure 701 as illustrated in FIG. 7F. The ground studs 711 are used for safely connecting the riser buses 518*a*, 518*b*, and 518*c* or the main bus 519 to the ground bus 713 for equipment grounding before performing service or maintenance. When the current transformers are installed in the current transformer and cable compartment 710, the riser buses 518*a*, 518*b*, and 518*c* are connected to the main bus 519 and the main bus 519 is grounded while performing service or maintenance. If the current transformers are not yet installed in the current transformer and cable compartment 710, both sides of the riser buses 518*a*, 518*b*, and 518*c* are grounded for safety. In an embodiment, each of the ground studs 711 is covered with an insulating cover or cap 712 when not used, that is, when the equipment is energized. In an embodiment, the insulating cover 712 is snap-fit connected to each of the ground studs 711. The insulating cover 712 is a flexible, non-conductive cover that prevents flashover on the ground studs 711. In an example, the insulating cover 712 is made of a plastisol material that has strong insulation properties.

When grounding is required, a grounding device (not shown) with four clamps, for example, is used to connect all phase buses to the ground bus 713. The riser buses 518*a*, 518*b*, 518*c* connect to the main bus 519 and hence, all the phase buses are connected to the ground. The clamps of the grounding device attach to the ground studs 711 to ensure safety of the current transformer and cable compartment 710 for maintenance and service. When the current transformer is not installed and the B-phase bus link 518*d* illustrated in FIG. 7E is removed, both sides of the current transformer connection are grounded by the ground studs 711 on both sides of the riser buses 518*a*, 518*b*, and 518*c* which in turn connect to the main bus 519.

Figure 9C:
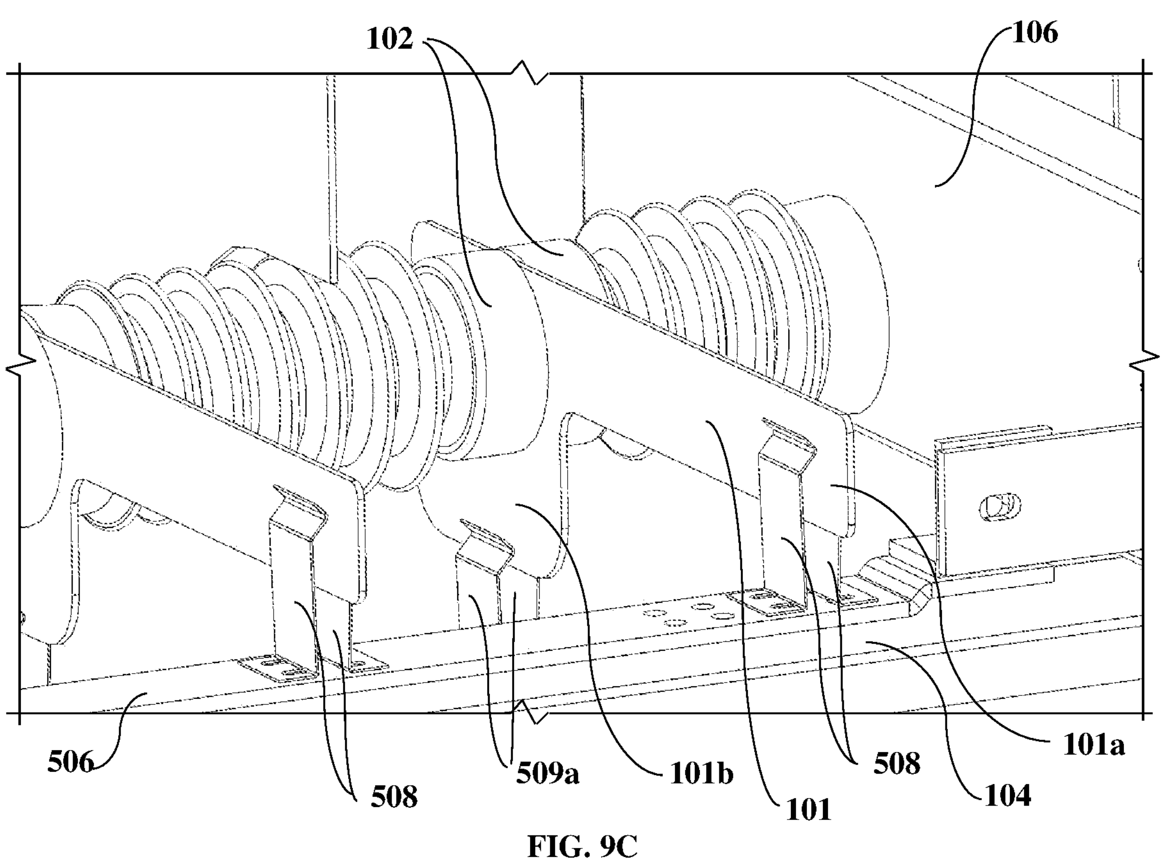
FIG. 9C illustrates a perspective view showing a switch blade of the 15 kV voltage transformer disconnect switch in a grounded position, where a lower part of the switch blade is connected to a fuse clip.

FIG. 9C illustrates a perspective view showing a switch blade 101 of the 15 kV voltage transformer disconnect switch 100 in a grounded position, where a lower part 101*b* of the switch blade 101 is connected to a fuse clip 509*a*. In the grounded position, the upper parts 101*a* of the switch blades 101 of the voltage transformer disconnect switch 100 engage inside the lower grounding clips 508 attached to the ground bus 506 and in an embodiment, the lower parts 101*b* of the switch blades 101 connect to the first fuse clips 509*a* as illustrated in FIG. 9C. The first fuse clips 509*a* connect the switch blades 101 to the upper fuse clip buses 512 illustrated in FIGS. 5A-5B, FIGS. 7C-7D, and FIG. 7J. When the medium voltage switchgear is operational, the upper parts 101*a* of the switch blades 101 of the voltage transformer disconnect switch 100 engage inside the upper main power clips 507 for input bus connections as illustrated in FIG. 9A and in an embodiment, the lower parts 101*b* of the switch blades 101 connect to the upper fuse clip buses 512 via the first fuse clips 509*a* shown in FIG. 9C. The upper fuse clip buses 512 connect the switch blades 101 to the second fuse clips 509*b* installed on the upper fuse clip buses 512. The second fuse clips 509*b* installed on the upper and lower fuse clip buses 512 and 516 illustrated in FIG. 5B, FIG. 5D, and FIGS. 7C-7D, connect the input fuses of the voltage transformer to the voltage transformer switch input bus 510 illustrated in FIG. 9A. The upper fuse clip buses 512 are always connected to the switch blades 101. The upper parts 101*a* of the switch blades 101 either connect to the voltage transformer switch input bus 510 or to the ground bus 506 for safety. The voltage transformer switch input bus 510 connects the voltage transformer to the riser bus 518 in the back via cables (not shown) as illustrated in FIGS. 7E-7F, which in turn connects to the main bus 519 at the top of the enclosure 701 as illustrated in FIG. 7G. In an embodiment, instead of the fuse clips 509*a* illustrated in FIG. 9C, a bare copper cable or wire 523 inside a cable bushing 522 is used to connect the lower part 101*b* of each switch blade 101 to the upper fuse clip bus 512 as illustrated in FIGS. 11C-11D.

Figure 10:
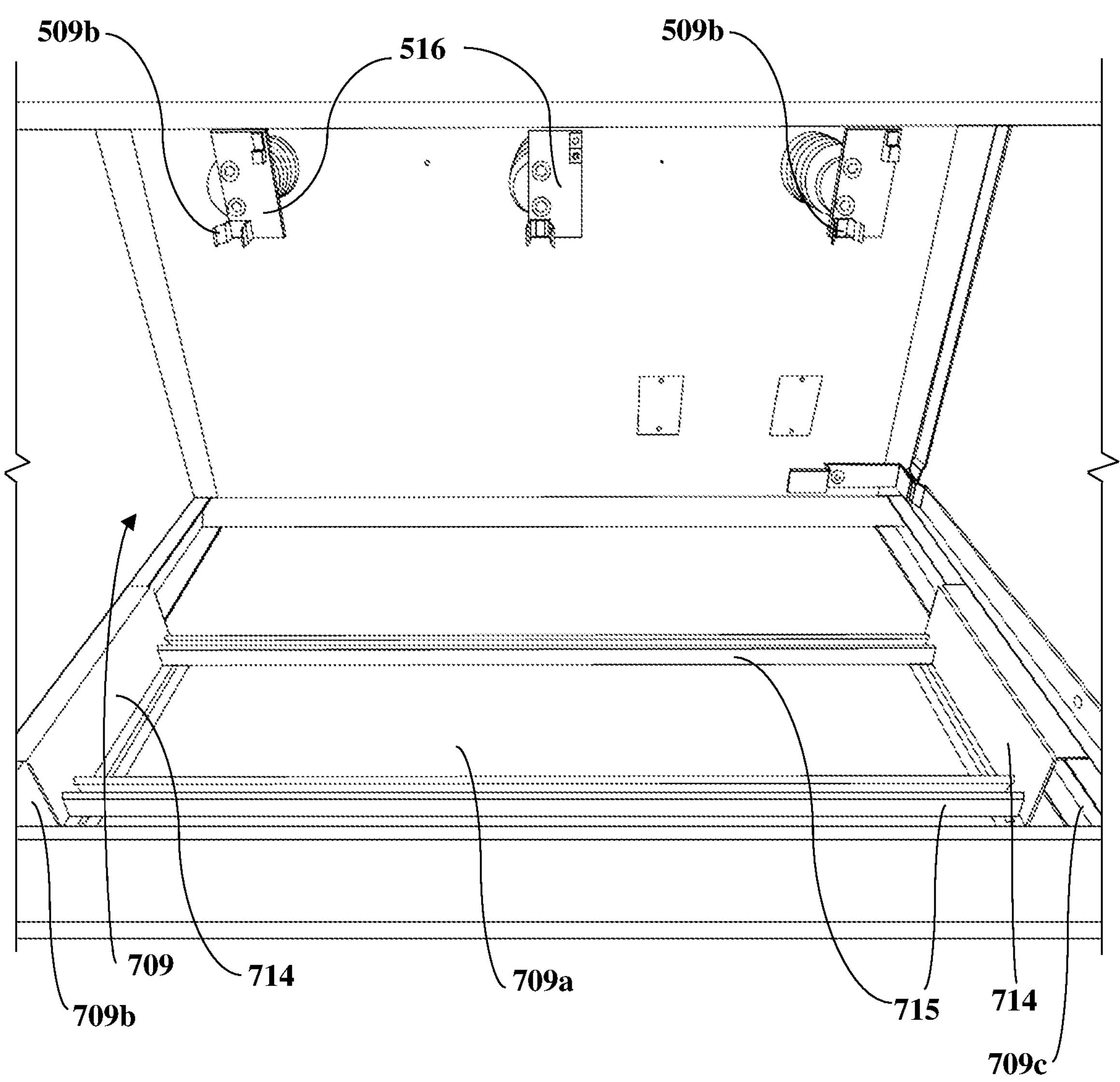
FIG. 10 illustrates a perspective view of the fuse compartment of the 15 kV utility metering cabinet shown in FIG. 7B, showing fuse clips, rails, and mounting brackets for a voltage transformer.

FIG. 10 illustrates a perspective view of the fuse compartment 709 of the 15 kV utility metering cabinet 700 shown in FIG. 7B, showing fuse clips 509*b*, rails 715, and mounting brackets 714 for a voltage transformer (not shown). The fuse compartment 709 accommodates the fuse clips 509*b* for the input fuses of the voltage transformer. The fuse clips 509*b* are installed on the upper fuse clip buses 512 illustrated in FIGS. 7C-7D and on the lower fuse clip buses 516 illustrated in FIGS. 7B-7D, FIG. 7H, and FIG. 10. In an embodiment, rails 715 and mounting brackets 714 are disposed at a bottom end 709*a* of the fuse compartment 709 of the utility metering cabinet 700. The mounting brackets 714 are attached to opposing sides 709*b* and 709*c* of the bottom end 709*a* of the fuse compartment 709. The rails 715 are disposed substantially perpendicular to the mounting brackets 714 as illustrated in FIG. 10. The rails 715 and the mounting brackets 714 at the bottom are configured to mount the voltage transformer in the fuse compartment 709 in accordance with predefined utility requirements, for example, Electric Utility Service Equipment Requirements Committee (EUSERC) requirements. The mounting brackets 714 meet utility requirements as defined by the EUSERC or another specific utility if the utility is not a member of the EUSERC.

FIGS. 11A-11B illustrate perspective views of an embodiment of the 15 kV voltage transformer disconnect switch 100, showing the switch blades 101 mounted between alternative insulators 102*a* and 102*b* in a grounded position and a connected ON position, respectively. The alternative insulators 102*a* and 102*b* illustrated in FIGS. 11A-11B, are made, for example, by Polycast Industrial Products Ltd. In an embodiment, the 15 kV voltage transformer disconnect switch 100 comprises three ¼-inch thick, aluminum switch blades 101 that are tin-plated. The central switch blade 101 is sandwiched between the insulators 102*b* that are 8.75" long with two spring pins 112 illustrated in FIG. 1D and FIGS. 3A-3C, at the joint. At each end, a 6-inch long insulator 102*a* is installed between the arm 105/106 connected to the frame of the voltage transformer switch compartment 707 and one aluminum switch blade 101 as illustrated in FIGS. 11A-11B. The arms 105 and 106 are made, for example, of sheet metal. The insulators 102*a* and 102*b* are secured with two spring pins 112 at each junction and the aluminum switch blades 101 are sandwiched between two insulators 102*b* for the middle B-phase and between the insulators 102*a* and 102*b* for A-phase and C-phase as illustrated in FIG. 1D and FIG. 11A. The insulators 102*a* at the ends are secured to the arms 105 and 106 that are connected to the frame of the voltage transformer switch compartment 707, for example, using steel fasteners. Also illustrated in FIG. 11A are the input cables 520 that connect the voltage transformer switch input bus 510 to the main bus 519 via the riser bus 518 in the rear current transformer and cable compartment 710 as illustrated in FIGS. 7E-7G. Also illustrated in FIG. 11B is a conduit 524 for conveying control cables of meters used in the utility metering cabinet 700 illustrated in FIG. 7A. The conduit 524 is inserted through the control cable bushing 503 configured in the rear barrier 501 illustrated in FIG. 5A.

Figure 11C:
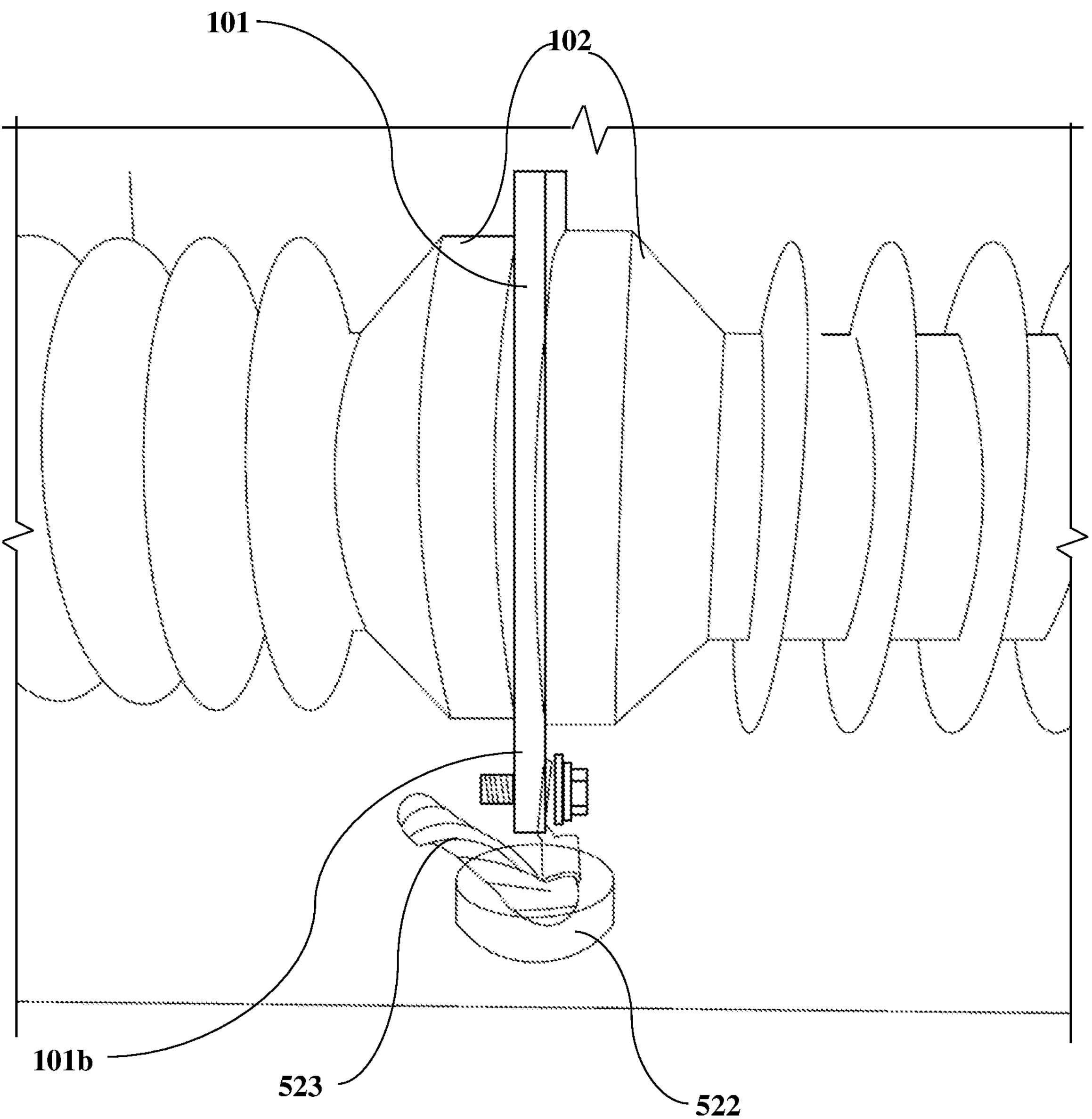
FIGS. 11C-11D illustrate perspective views showing a lower part of the switch blade of the 15 kV voltage transformer disconnect switch connected to an upper fuse clip bus in the fuse compartment using a braided copper element.
Figure 11D:
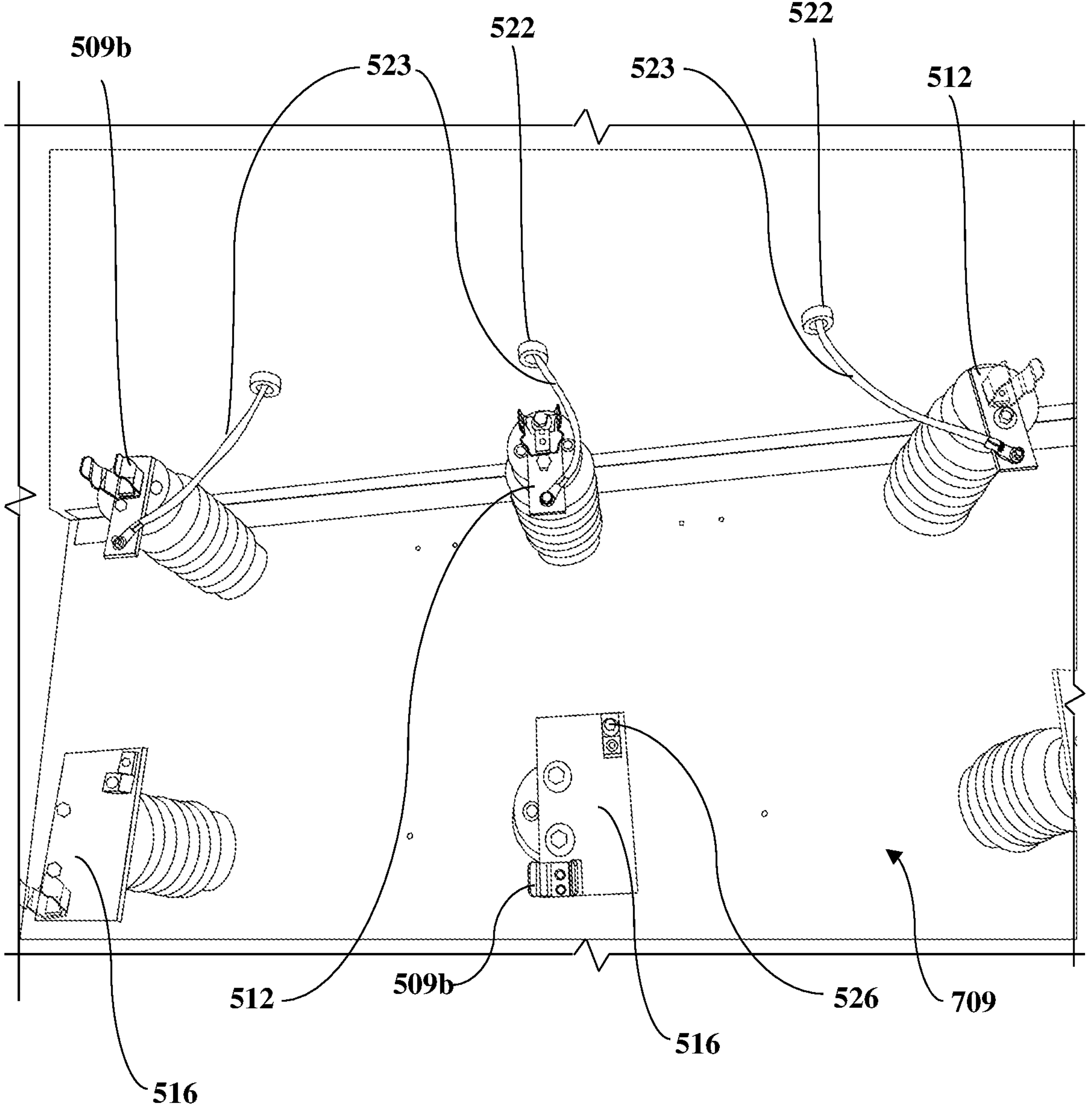

FIGS. 11C-11D illustrate perspective views showing a lower part 101*b* of the switch blade 101 of the 15 kV voltage transformer disconnect switch 100 connected to an upper fuse clip bus 512 in the fuse compartment 709 using a braided copper element, for example, a braided copper cable or wire 523. FIG. 11D illustrates the upper and lower fuse clip buses 512 and 516 and the fuse clips 509*b* installed thereon in the fuse compartment 709. The upper fuse clip buses 512 are configured to connect the voltage transformer disconnect switch 100 to the fuse clips 509*b*. In this embodiment, the braided copper cables or wires 523 connected through cable bushings 522 are used to make the lower bus connections that connect to the fuse clips 509*b* as illustrated in FIGS. 11C-11D. A suitable fuse for the voltage transformer is installed on the fuse clips 509*b* by a utility by pressing a cylindrical medium voltage fuse rated to protect the voltage transformer. The utility also makes a cable connection from the lower fuse clip buses 516 to the voltage transformer.

Figure 12:
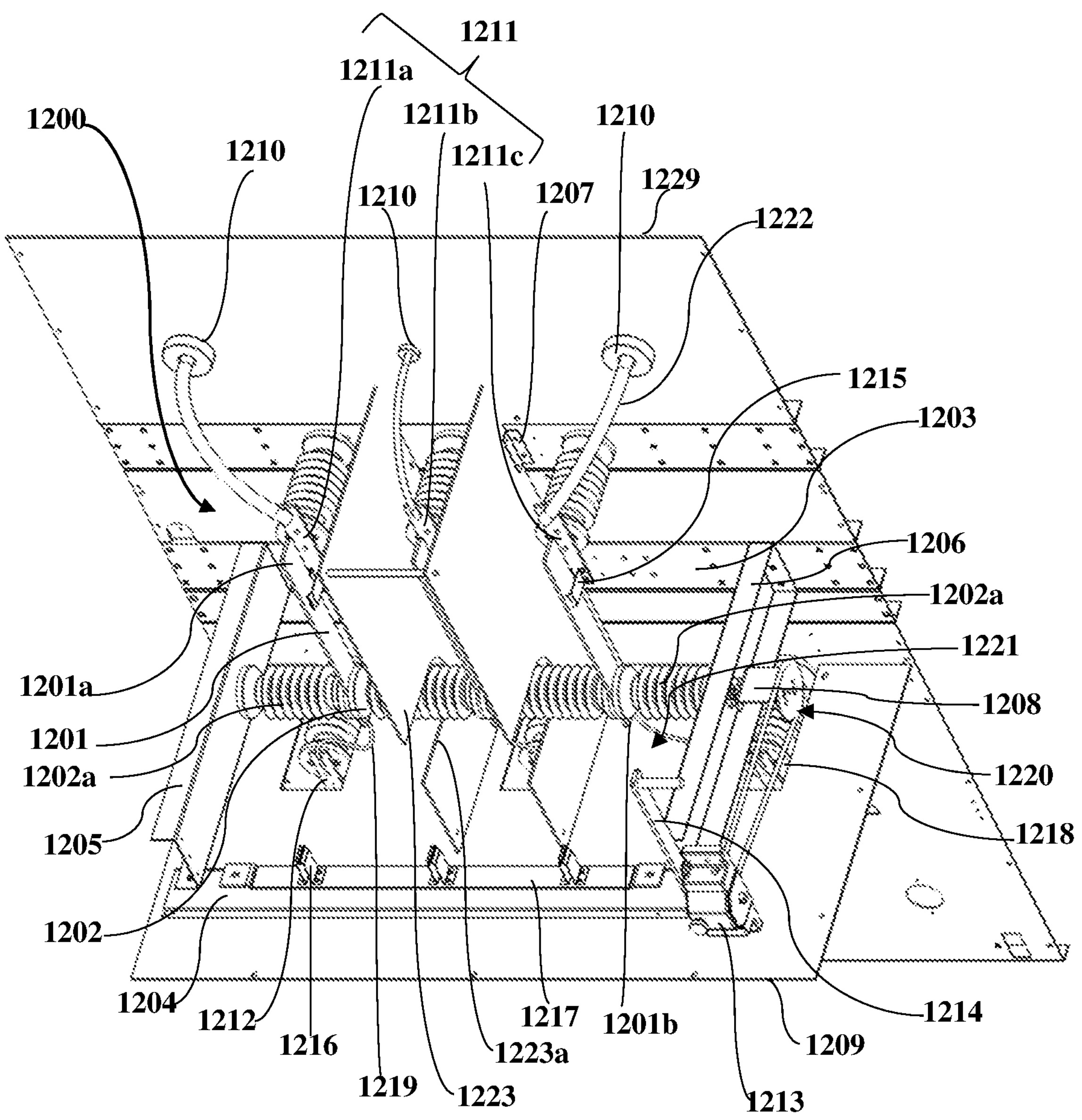
FIG. 12 illustrates a top perspective view of an embodiment of a 27-kilovolt (kV) voltage transformer disconnect switch.

FIG. 12 illustrates a top perspective view of an embodiment of a 27-kilovolt (kV) voltage transformer disconnect switch 1200. The voltage transformer disconnect switch 1200 comprises multiple switch blades 1201, for example, three ¼-inch thick aluminum switch blades 1201, one for each phase of a multi-phase, main medium voltage bus, as illustrated in FIG. 12. The switch blades 1201 are disposed in a space 1221 defined by opposing channels, namely, a rear support channel 1203 and a ground bus support channel 1204, and opposing arms 1205 and 1206. In an example, the length of the rear support channel 1203 is about 56.875 inches; the height of the rear support channel 1203 is about 6 inches, and the width of the rear support channel 1203 is about 2 inches. The rear support channel 1203 is made, for example, of a steel sheet of 7 gauge (ga) size. The ground bus support channel 1204 is configured to support a ground bus 1217 as illustrated in FIG. 12. In an example, the length of the ground bus support channel 1204 is about 44.5 inches; the height of the ground bus support channel 1204 is about 3.875 inches, and the width of the ground bus support channel 1204 is about 1 inch. The ground bus support channel 1204 is made, for example, of a steel sheet of 12 ga size.

The switch blades 1201 are mounted between insulators 1202 in a voltage transformer switch compartment 1706 of a 27 kV utility metering cabinet 1700 illustrated in FIGS. 17A-17I. In an embodiment, each of the switch blades 1201 is configured as a generally rectangular-shaped structure comprising an upper part 1201*a* and a lower part 1201*b*. The insulators 1202 are, for example, 10.5-inch insulators manufactured by Polycast Industrial Products Ltd. A moving bracket 1208 is operably connected to one end insulator 1202*a* via the arm 1206. Multiple clips 1215 and 1216 are configured to connect the voltage transformer disconnect switch 1200 to a main, multi-phase cross bus 1715 illustrated in FIG. 17J, or to the ground bus 1217. The clips 1215 and 1216 are made, for example, of beryllium. The clips 1215 and 1216 are configured for a tight connection to the switch blades 1201, when the switch blades 1201 are engaged with the clips 1215 or 1216. The clips comprise upper main power clips 1215 and lower grounding clips 1216. The upper parts 1201*a* of the switch blades 1201 are configured to connect to (a) a voltage transformer switch input bus 1211 that connects a voltage transformer (not shown) to the main, multi-phase cross bus 1715 of the utility metering cabinet 1700 via cables 1222; or (b) to the ground bus 1217 for safety. In an embodiment, the structure of each of the clips 1215 and 1216 used to connect the 27 kV voltage transformer disconnect switch 1200 to the main, multi-phase cross bus 1715 via the voltage transformer switch input bus 1211 or to the ground bus 1217 shown in FIG. 12, are similar to or the same as the clip 507/508 illustrated in FIGS. 6A-6C.

Figure 17A:
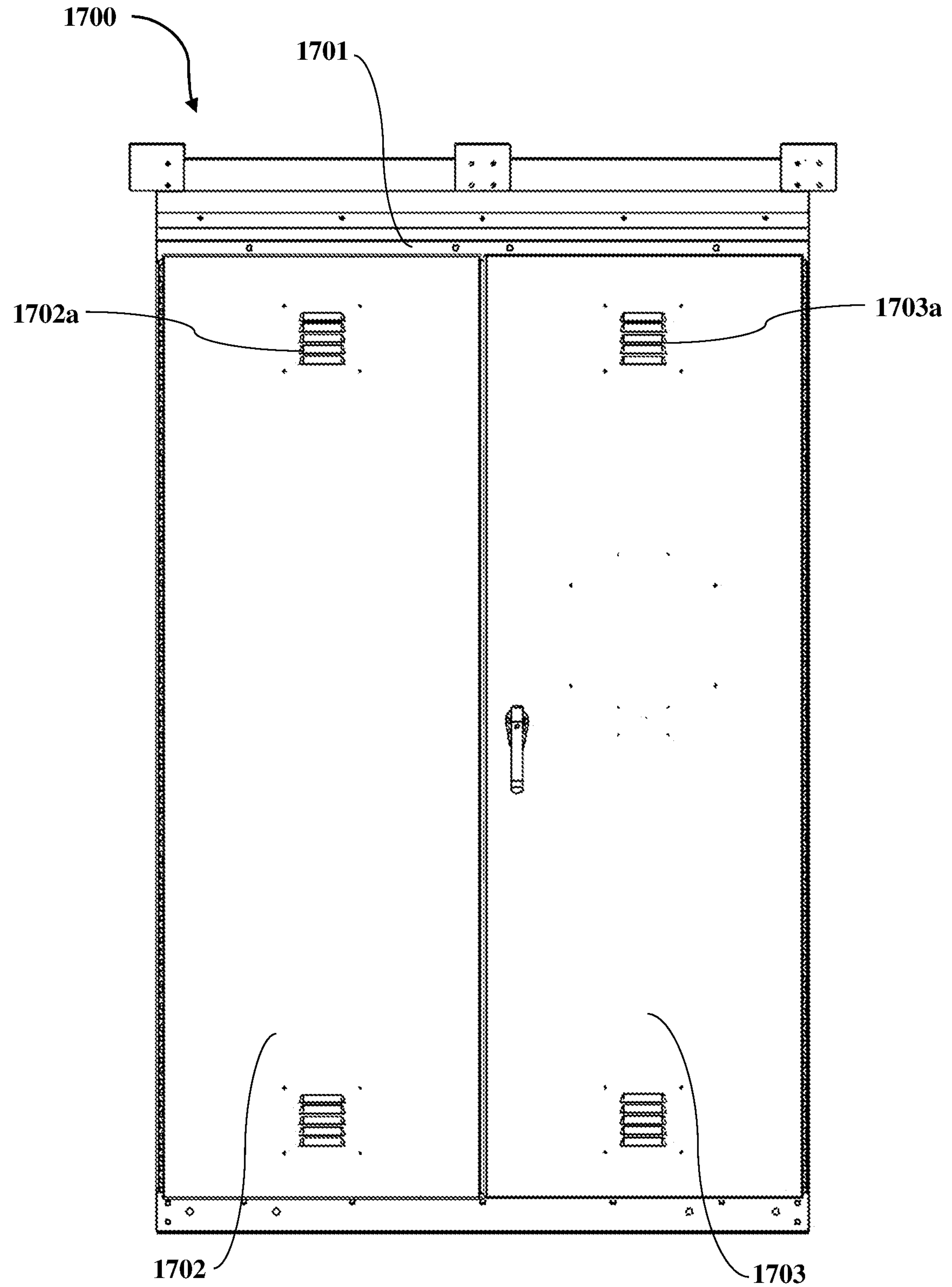
FIG. 17A illustrates a front elevation view of an embodiment of a 27 kV utility metering cabinet, showing front outer doors closed.

The ground bus 1217 is attached to the channel 1204 of the voltage transformer disconnect switch 1200. As illustrated in FIG. 12, the switch blades 1201 are connected to the voltage transformer switch input buses 1211*a*, 1211*b*, and 1211*c* via the upper main power clips 1215. The upper parts 1201*a* of the switch blades 1201 are configured to engage with the upper main power clips 1215 for input bus connections in the utility metering cabinet 1700 and with the lower grounding clips 1216 for ground bus connections in the utility metering cabinet 1700. The input bus connections comprise connections to the voltage transformer switch input bus 1211 and in turn, to the main, multi-phase cross bus 1715 via a riser bus 1711 illustrated in FIGS. 17H-17J. That is, the voltage transformer switch input bus 1211 is connected to the vertical riser bus 1711 using insulated cables 1222. The riser bus 1711 is in turn connected to the main, multi-phase cross bus 1715 as illustrated in FIG. 17J. The upper main power clips 1215 connect the voltage transformer disconnect switch 1200 to the main, multi-phase cross bus 1715 via the voltage transformer switch input bus 1211 using insulated cables 1222. The ground bus connections comprise connections to the ground bus 1217 attached to the ground bus support channel 1204 of the voltage transformer disconnect switch 1200. When the upper parts 1201*a* of the switch blades 1201 are engaged with the upper main power clips 1215, the input buses 1211*a*, 1211*b*, and 1211*c* of the voltage transformer switch input bus 1211 connect the switch blades 1201 to the riser buses 1711*a*, 1711*b*, and 1711*c* via the cables 1222. The voltage transformer switch input bus 1211 connects the voltage transformer to the main, multi-phase cross bus 1715 of the utility metering cabinet 1700 via the cables 1222 and the riser bus 1711. The lower parts 1201*b* of the switch blades 1201 are connected to upper fuse clip buses 1212 illustrated in FIG. 13B, using braided copper elements, for example, braided copper wires 1219. Each upper fuse clip bus 1212 is configured to connect the voltage transformer disconnect switch 1200 to fuse clips 1228 illustrated in FIG. 17C and FIG. 17F.

Figure 17B:
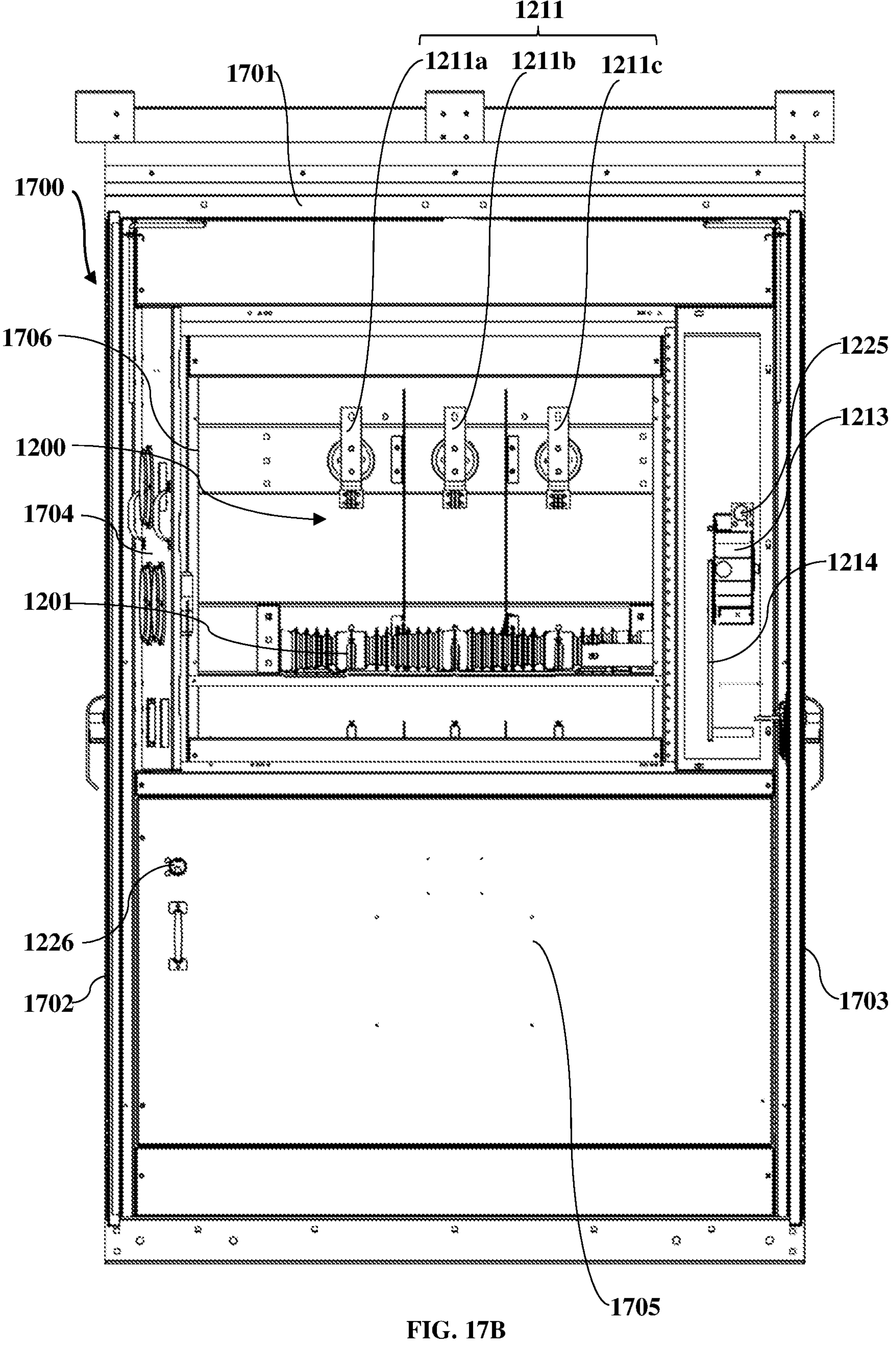
FIG. 17B illustrates a front elevation view of the embodiment of the 27 kV utility metering cabinet shown in FIG. 17A, showing open front outer doors, a closed door of a fuse compartment, and the 27 kV voltage transformer disconnect switch with switch blades in a grounded position in a voltage transformer switch compartment.
Figure 17C:
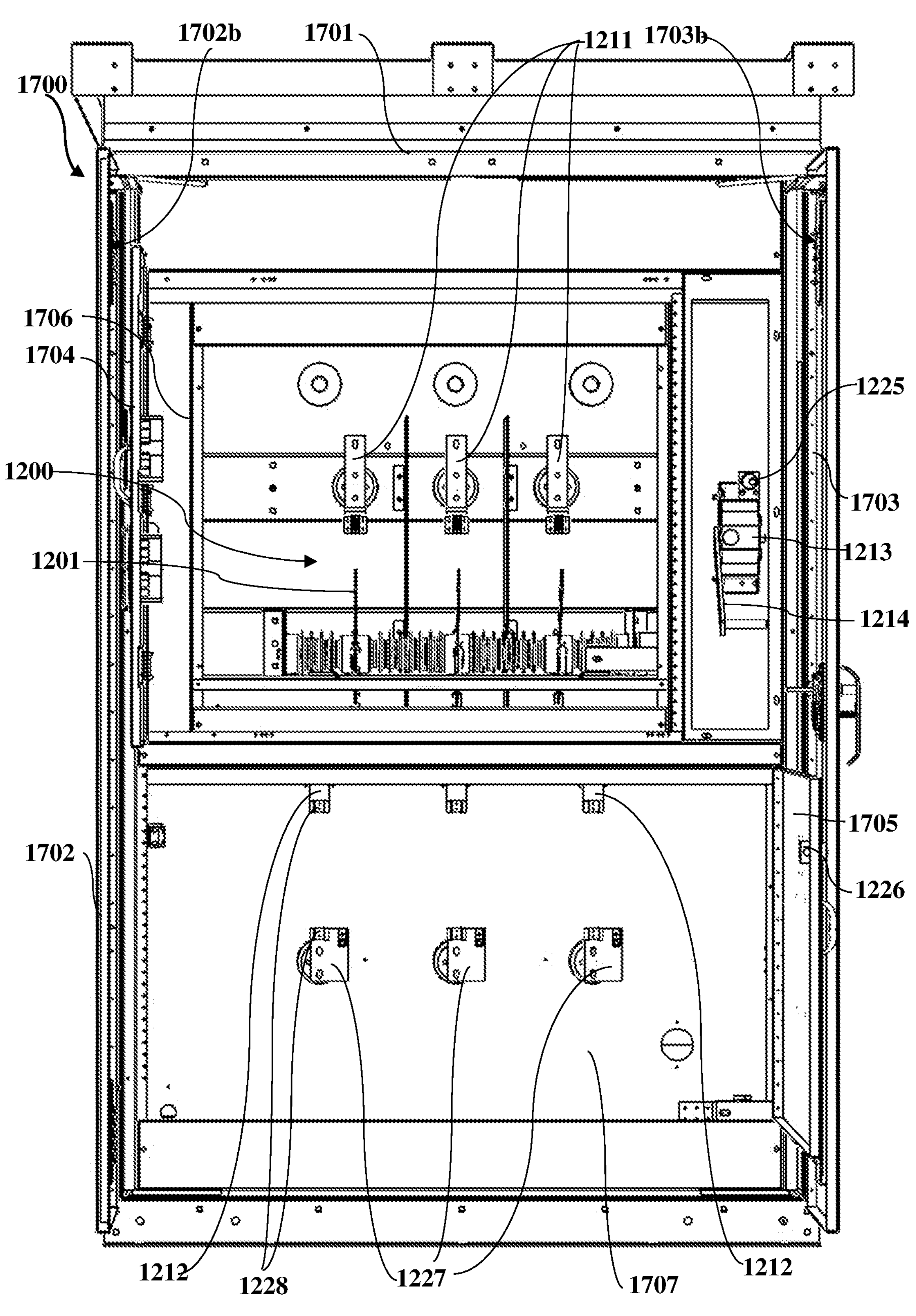
FIG. 17C illustrates a front elevation view of the embodiment of the 27 kV utility metering cabinet shown in FIG. 17A, showing the fuse compartment and the 27 kV voltage transformer disconnect switch with the switch blades in an intermediate position in the voltage transformer switch compartment.

Also illustrated in FIG. 12 are a rear barrier 1229, an insulating barrier 1209 disposed between the voltage transformer switch compartment 1706 and the fuse compartment 1707 illustrated in FIGS. 17B-17C, wall bushings 1210, phase barriers 1223, the input buses 1211*a*, 1211*b*, and 1211*c*, a standoff insulator 1218, and the upper fuse clip buses 1212, the positions and functions of which are similar to respective components 501, 502, 504, 505, 510*a*, 510*b*, 510*c*, 511*b*, and 512 as disclosed in the descriptions of FIGS. 5A-5C. The rear barrier 1229, the insulating barrier 1209, and the phase barriers 1223 are made, for example, of Glastic® GPO-3 materials. The length of the rear barrier 1229 is, for example, about 56.750 inches. The phase barriers 1223 are attached to the rear barrier 1229 using fasteners, for example, L-shaped, angle bracket clamps 1207. In an embodiment, the phase barriers 1223 comprise U-shaped cutouts or openings 1223*a* configured to accommodate the insulators 1202 as illustrated in FIG. 12. The standoff insulator 1218 is, for example, an 8.75-inch insulator manufactured by Polycast Industrial Products Ltd. The upper fuse clip buses 1212 are made, for example, of copper. Also illustrated in FIG. 12 is a switch handle assembly 1213 operably connected to the voltage transformer disconnect switch 1200 via a drive system, for example, a chain drive 1220. The switch handle assembly 1213 comprises a switch handle 1214 configured to operate the voltage transformer disconnect switch 1200. The switch handle assembly 1213 is, for example, the PowerCon® switch handle assembly A013-039. The switch handle assembly 1213 that operates the 27 kV voltage transformer disconnect switch 1200 and the chain drive 1220 are substantially similar to the switch handle assembly 513 and the chain drive 110 of the 15 kV voltage transformer disconnect switch 1200 illustrated in FIGS. 5A-5D, with suitable changes made at the switch end to accommodate the 27 kV switch handle assembly 1213. The chain drive 1220 is substantially similar in structure and function to the chain drive 110 disclosed in the description of FIG. 5D.

Figure 13A:
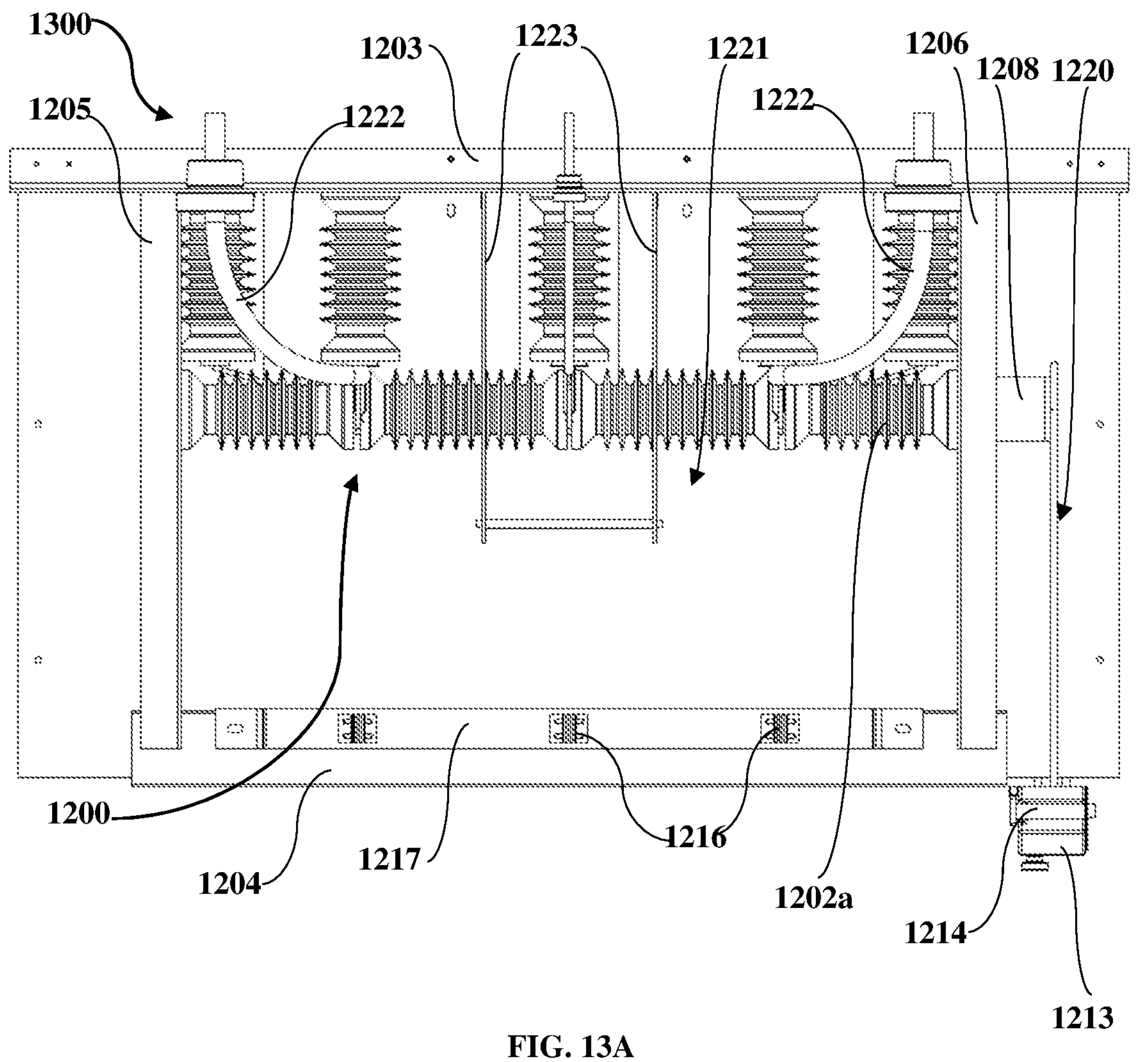
FIG. 13A illustrates a top plan view of an embodiment of a voltage transformer switch assembly comprising the 27 kV voltage transformer disconnect switch shown in FIG. 12.

FIG. 13A illustrates a top plan view of an embodiment of a voltage transformer switch assembly 1300 comprising the 27 kV voltage transformer disconnect switch 1200 shown in FIG. 12. In an example, the width of the space 1221 defined by the opposing channels 1203 and 1204 and the opposing arms 1205 and 1206 illustrated in FIG. 12, is about 28.313 inches.

Figure 13B:
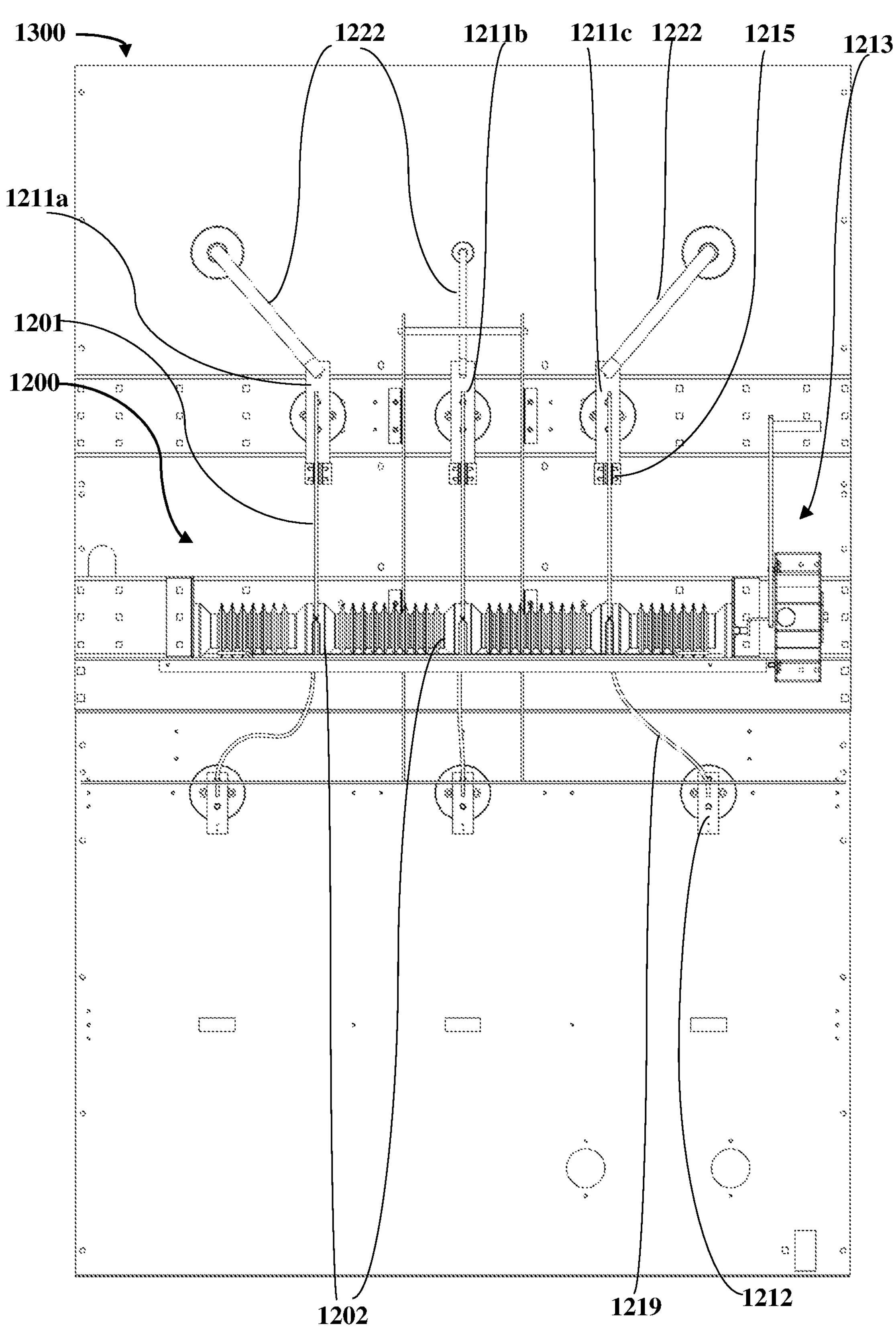
FIG. 13B illustrates a front elevation view of the embodiment of the voltage transformer switch assembly shown in FIG. 13A.

FIG. 13B illustrates a front elevation view of the embodiment of the voltage transformer switch assembly 1300 shown in FIG. 13A. In an example, the distance between the input buses 1211*a*, 1211*b*, and 1211*c* is about 10.625 inches. FIG. 13B illustrates the braided copper elements, for example, the braided copper wires 1219, configured to connect the lower parts 1201*b* of the switch blades 1201 to the upper fuse clip buses 1212.

Figure 13C:
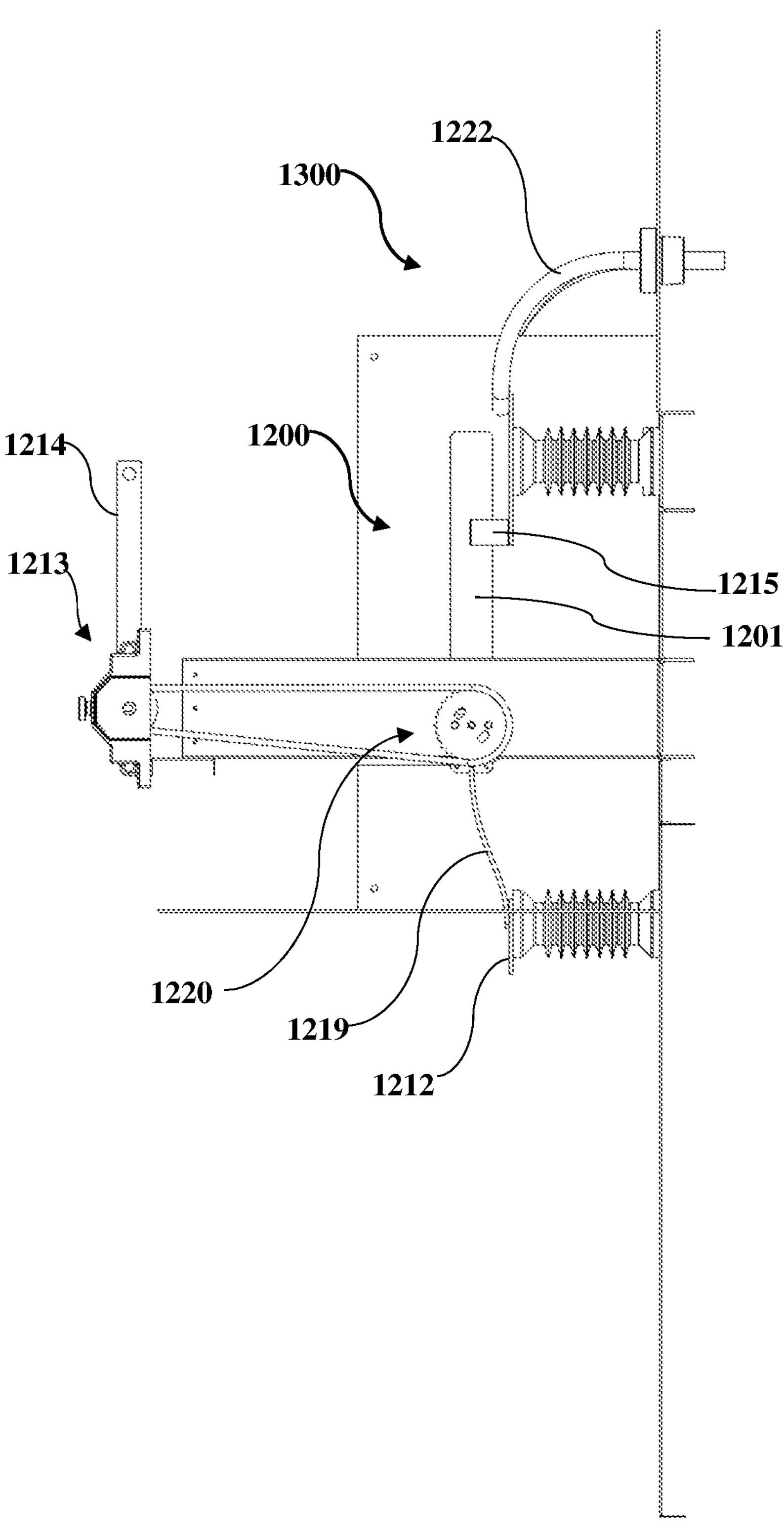
FIG. 13C illustrates a right-side elevation view of the embodiment of the voltage transformer switch assembly shown in FIG. 13A.

FIG. 13C illustrates a right-side elevation view of the embodiment of the voltage transformer switch assembly 1300 shown in FIG. 13A. The side elevation view shows the chain drive 1220 used to drive the operation of the switch handle assembly 1213 and in turn the operation of the 27 kV voltage transformer disconnect switch 1200 shown in FIG. 12.

FIG. 14 illustrates a side elevation view of an embodiment of a switch blade 1201 of the 27 kV voltage transformer disconnect switch 1200 shown in FIG. 12. In an example, the length of the switch blade 1201 is about 20.375 inches, the width of the switch blade 1201 is about 2.5 inches, and the thickness of the switch blade 1201 is about 0.25 inches. The switch blade 1201 is made, for example, from aluminum.

FIGS. 15A-15C illustrate a left-side perspective view, a front elevation view, and a left-side elevation view, respectively, of an embodiment of a spring pin 1224 configured to secure the insulators 1202 to the switch blades 1201 of the 27 kV voltage transformer disconnect switch 1200 shown in FIG. 12 and a 38 kV voltage transformer disconnect switch 1800 shown in FIGS. 18A-18D. The spring pin 1224 comprises a longitudinal slot 1224*a* defined along a length of the spring pin 1224. In an example, the length of the spring pin 1224 is about 1.75 inches, the diameter of the spring pin 1224 is about 0.313 inches, and the thickness of the spring pin 1224 is about 0.062 inches. The spring pin 1224 snaps into place and secures the insulators 1202 to the switch blades 1201 sandwiched therebetween as disclosed in the description of FIG. 1D. The spring pin 1224 is longer than the spring pin 112 used in the 15 kV voltage transformer disconnect switch 100 shown in FIG. 1D and FIGS. 3A-3C, but secures the switch blades 1201 and the insulators 1202 in a similar fashion. A longer spring pin 1224 secures the switch blade-insulator assembly tightly since the 27 kV voltage transformer disconnect switch 1200 is larger and the 27 kV voltage transformer disconnect switch forces during open/close operation are higher than that of the 15 KV voltage transformer disconnect switch 100. The spring pin 1224 is made, for example, from steel. In an embodiment, while the 15 kV voltage transformer disconnect switch 100 uses two spring pins 112 at each connection of the insulators 102 to the switch blade 101 illustrated in FIGS. 1A-1D and FIGS. 3A-3C, the 27 kV voltage transformer disconnect switch 1200 and the 38 kV voltage transformer disconnect switch 1800, each uses four spring pins 1224 at each connection of the insulators 1202/1802 to the switch blade 1201/1801 to provide the required strength and rigidity to the respective voltage transformer switch assemblies.

Figure 16A:
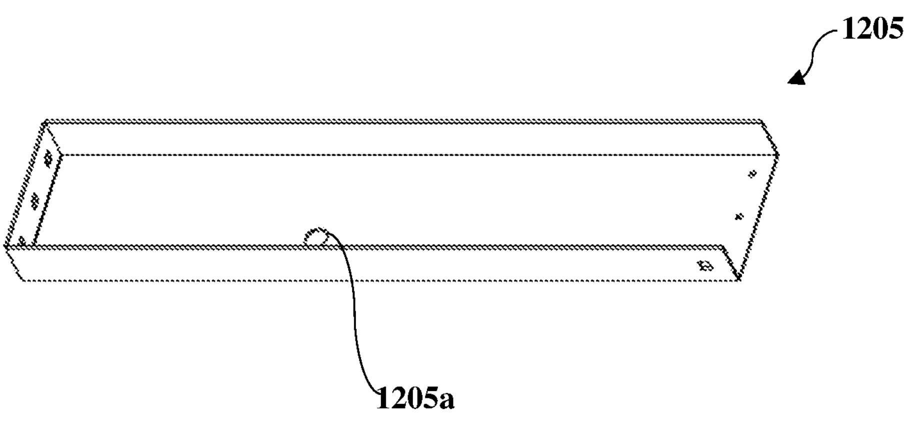
FIGS. 16A-16B illustrate perspective views of opposing arms of the 27 kV voltage transformer disconnect switch.
Figure 16B:
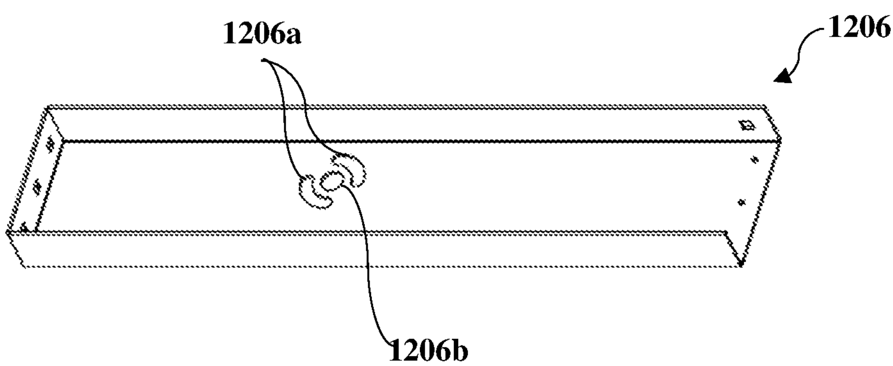

FIGS. 16A-16B illustrate perspective views of the opposing arms 1205 and 1206 of the 27 kV voltage transformer disconnect switch 1200 shown in FIG. 12. The arm 1205 is configured as a sheet metal control bracket with a generally circular hole 1205*a* as illustrated in FIG. 16A. In an embodiment, the insulator 1202*a* proximal to the arm 1205 as illustrated in FIG. 12, is connected to the arm 1205, for example, using a ½-inch bolt inserted through the generally circular hole 1205*a* of the arm 1205. The arm 1206 is configured as a sheet metal control bracket with grooves 1206*a* disposed around a generally circular hole 1206*b* as illustrated in FIG. 16B. In an embodiment, the insulator 1202*a* proximal to the arm 1206 as illustrated in FIG. 12, is connected to the arm 1206, for example, using a ½-inch bolt inserted through the generally circular hole 1206*b* of the arm 1206. In an example, the length, height, and width of the arms 1205 and 1206 are about 28.5 inches, about 6 inches, and about 2 inches, respectively. Each of the opposing arms 1205 and 1206 is made, for example, from a steel sheet of 11 gauge (ga) size.

FIG. 17A illustrates a front elevation view of an embodiment of a 27 kV utility metering cabinet 1700, showing front outer doors 1702 and 1703 closed. The utility metering cabinet 1700 comprises an enclosure 1701 configured to meet predefined electrical enclosure requirements comprising, for example, National Electrical Manufacturers Association (NEMA) 3R requirements and the American National Standards Institute (ANSI)/the Institute of Electrical and Electronics Engineers (IEEE) Category A requirements. For example, the enclosure 1701 is designed for outdoor NEMA 3R and meets IEEE C37.20.3 Category A requirements. In an embodiment, the doors 1702 and 1703 comprise gaskets (not shown) and louvers 1702*a* and 1703*a* with filters 1702*b* and 1703*b*, respectively, as illustrated in FIG. 17A and FIG. 17C. A voltage transformer switch compartment 1706, a fuse compartment 1707, and a current transformer and cable compartment 1710 are housed in the enclosure 1701 of the 27 kV utility metering cabinet 1700 as illustrated in FIGS. 17B-17F and FIGS. 17H-17J. In an example, the dimensions of the 27 kV utility metering cabinet 1700 with the 27 kV voltage transformer disconnect switch 1200 are 60" W×102" D×105" H. In an embodiment, the layout of the 27 kV voltage transformer disconnect switch 1200 illustrated in FIG. 12 is substantially identical to that of the 15 kV voltage transformer disconnect switch 100 illustrated in FIGS. 1A-1D. Since the 27 kV voltage transformer disconnect switch 1200 has to withstand a higher basic insulation level (BIL) and dielectric voltages, the spacing between phases and phase to ground are larger than that of the 15 kV voltage transformer disconnect switch 100.

FIG. 17B illustrates a front elevation view of the embodiment of the 27 kV utility metering cabinet 1700 shown in FIG. 17A, showing open front outer doors 1702 and 1703, a closed door 1705 of the fuse compartment 1707, and the 27 kV voltage transformer disconnect switch 1200 with the switch blades 1201 in a grounded position in the voltage transformer switch compartment 1706. FIG. 17B also illustrates an open door 1704 of the voltage transformer switch compartment 1706, which provides access to the 27 kV voltage transformer disconnect switch 1200. The voltage transformer switch assembly 1300 comprising the voltage transformer disconnect switch 1200 illustrated in FIG. 12 and FIGS. 13A-13C and the switch handle assembly 1213 with the switch handle 1214 is disposed in the enclosure 1701 of the utility metering cabinet 1700. Also illustrated in FIG. 17B are safety interlocking devices 1225 and 1226 connected to the switch handle assembly 1213 and to a door 1705 of the fuse compartment 1707 of the utility metering cabinet 1700 illustrated in FIG. 17C. The safety interlocking devices 1225 and 1226 are, for example, KIRK® keys of Kirk Key Interlock Company, LLC. The safety interlocking devices 1225 and 1226 are configured to provide safety for opening and closing of the fuse compartment 1707, ensuring that the voltage transformer disconnect switch 1200 is grounded before the fuse compartment 1707 is opened for maintenance. The safety interlocking devices 1225 and 1226 ensure that the door 1705 of the fuse compartment 1707 cannot be opened unless the switch blades 1201 of the voltage transformer disconnect switch 1200 are in a grounded position and the fuse compartment 1707 is not energized. In the grounded position, it is safe for the safety interlocking device 1225 on the switch handle assembly 1213 to be released so that the door 1705 of the fuse compartment 1707 can be safely opened for inspection or maintenance.

FIG. 17C illustrates a front elevation view of the embodiment of the 27 kV utility metering cabinet 1700 shown in FIG. 17A, showing the fuse compartment 1707 and the 27 kV voltage transformer disconnect switch 1200 with the switch blades 1201 in an intermediate position in the voltage transformer switch compartment 1706. The door 1705 is opened to provide access to the fuse compartment 1707.

Figure 17D:
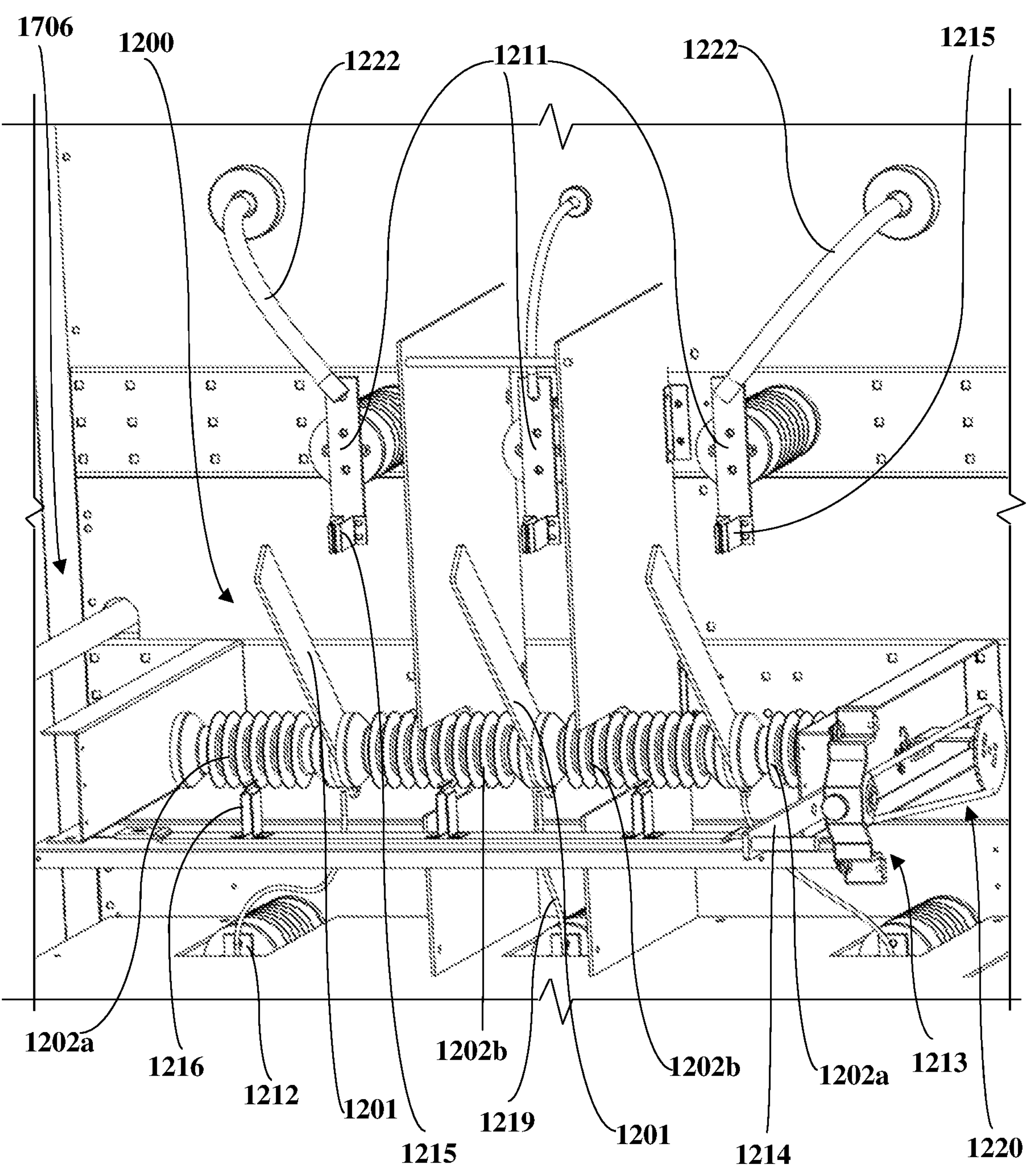
FIG. 17D illustrates an enlarged view of the voltage transformer switch compartment, showing the 27 kV voltage transformer disconnect switch with the switch blades in the intermediate position.

FIG. 17D illustrates an enlarged view of the voltage transformer switch compartment 1706, showing the 27 kV voltage transformer disconnect switch 1200 with the switch blades 1201 in the intermediate or mid position. The construction of the 27 kV voltage transformer disconnect switch 1200 is substantially similar to the 15 kV voltage transformer disconnect switch 100 illustrated in FIGS. 1A-1D. Since the rated voltage is higher for the 27 kV voltage transformer disconnect switch 1200, the 27 kV voltage transformer disconnect switch 1200 is configured to withstand higher basic insulation level (BIL) and dielectric voltages. The length of the insulators 1202*b* between phases is, for example, about 10.75 inches, and the length of the insulators 1202*a* at the ends is about 8.75 inches. In an example, the distance between an outside A or C phase and the frame of the 27 kV voltage transformer disconnect switch 1200, that is, the phase-to-ground distance, is about 8.75 inches.

Figure 17E:
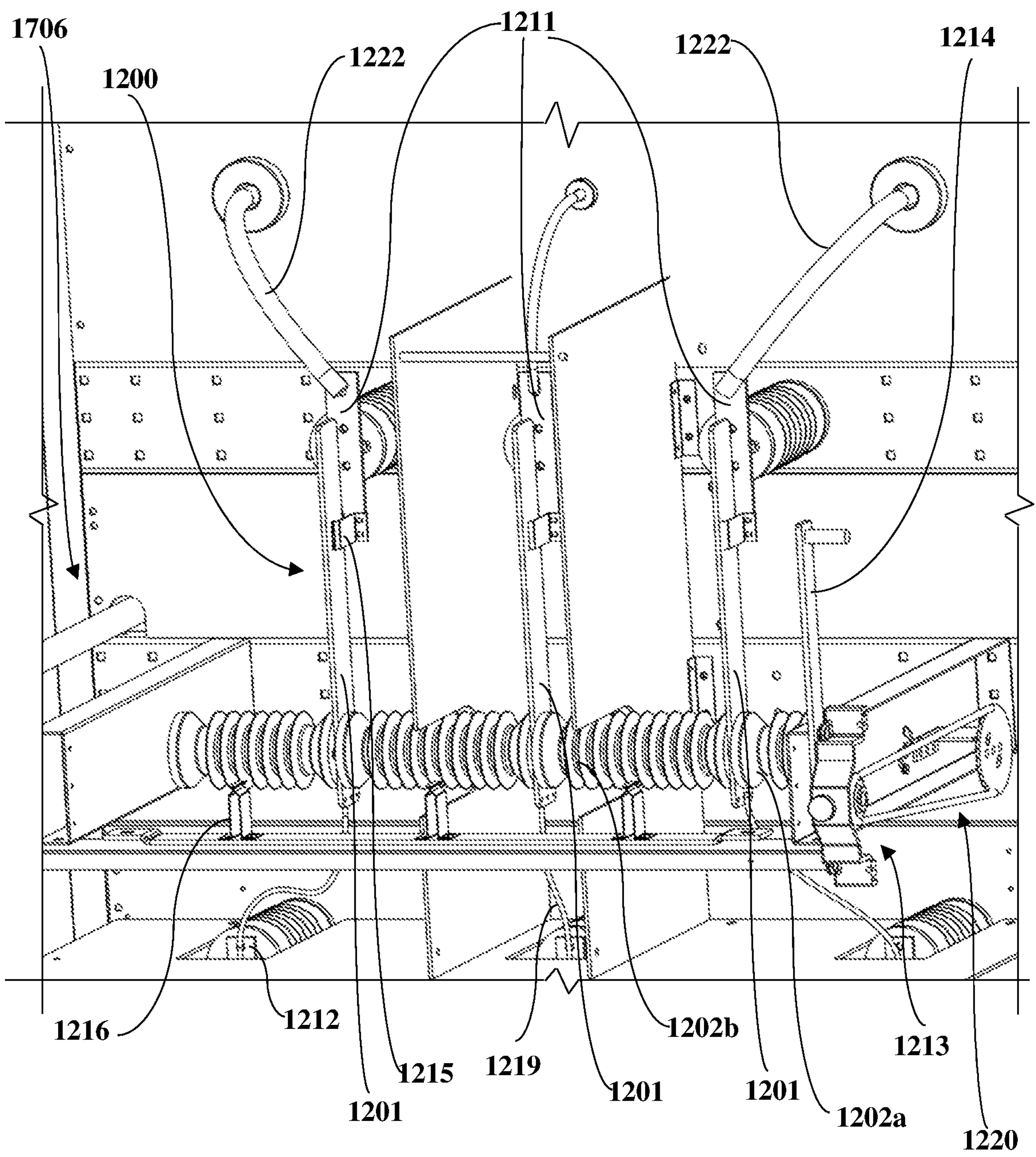
FIG. 17E illustrates an enlarged view of the voltage transformer switch compartment, showing the 27 kV voltage transformer disconnect switch with the switch blades in the connected ON position.

FIG. 17E illustrates an enlarged view of the voltage transformer switch compartment 1706, showing the 27 kV voltage transformer disconnect switch 1200 with the switch blades 1201 in the connected ON position. The switch handle 1214 of the switch handle assembly 1213 is moved to the upward or top position to render the 27 kV voltage transformer disconnect switch 1200 in the connected ON position. In the connected ON position, the switch blades 1201 of the voltage transformer disconnect switch 1200 engage with the upper main power clips 1215 for connections to the voltage transformer switch input bus 1211. The voltage transformer switch input bus 1211 connects a voltage transformer (not shown) to the main, multi-phase cross bus 1715 of the 27 kV utility metering cabinet 1700 illustrated in FIGS. 17A-17C via the cables 1222 and the riser bus 1711 illustrated in FIGS. 17H-17J.

Figure 17F:
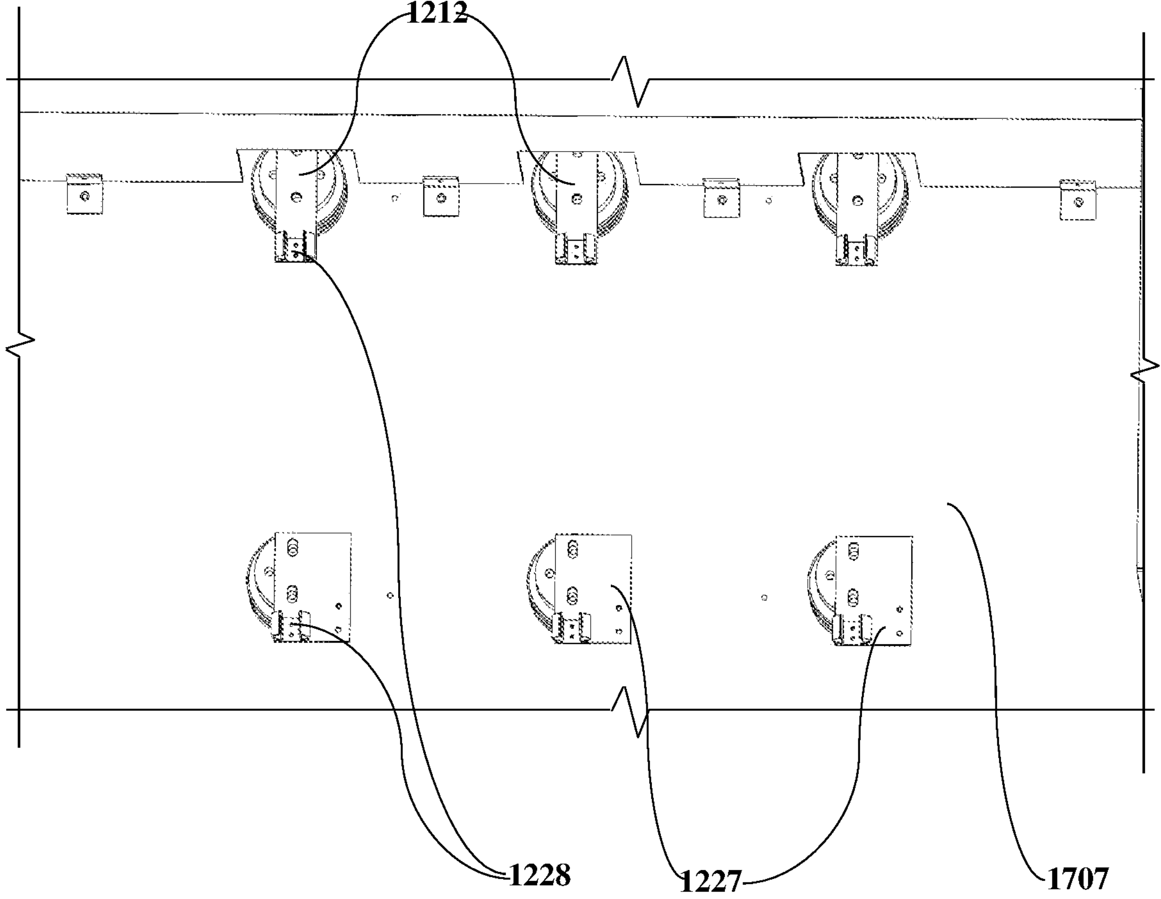
FIG. 17F illustrates a front elevation view of the fuse compartment of the 27 kV utility metering cabinet shown in FIGS. 17A-17C.

FIG. 17F illustrates a front elevation view of the fuse compartment 1707 of the 27 kV utility metering cabinet 1700 shown in FIGS. 17A-17C. The fuse clips 1228 are installed on the fuse clip buses 1212 and 1227 disposed in the fuse compartment 1707 of the utility metering cabinet 1700. The fuse clips 1228 are configured to connect input fuses (not shown) of the voltage transformer (not shown) to the voltage transformer switch input bus 1211 illustrated in FIGS. 17B-17E. A utility typically installs the fuses, and therefore, the utility metering cabinet 1700 from a manufacturer is supplied without the fuses.

Figure 17G:
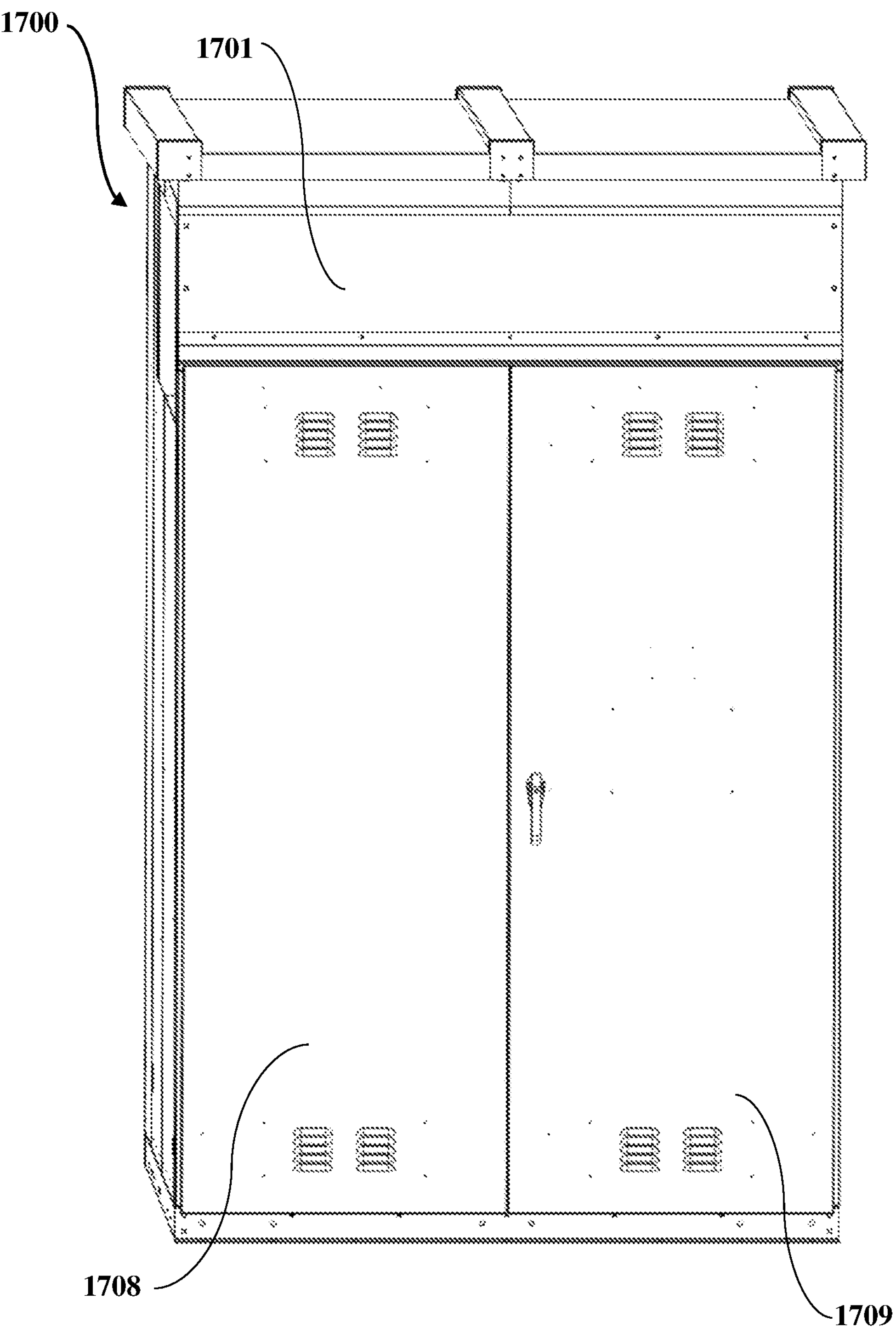
FIG. 17G illustrates a rear perspective view of the embodiment of the 27 kV utility metering cabinet shown in FIG. 17A, showing rear outer doors closed.

FIG. 17G illustrates a rear perspective view of the embodiment of the 27 kV utility metering cabinet 1700 shown in FIG. 17A, showing rear outer doors 1708 and 1709 closed.

Figure 17H:
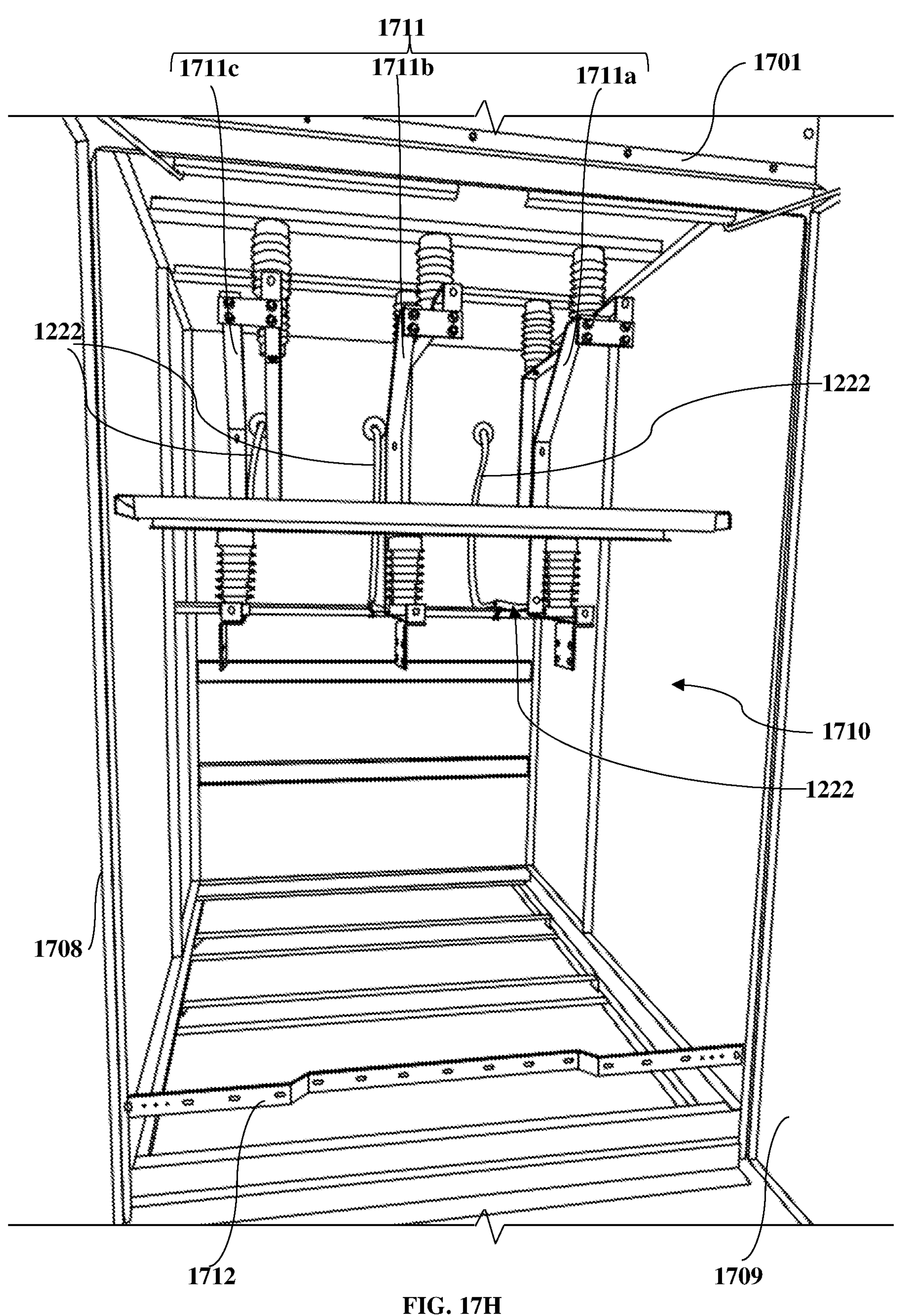
FIG. 17H illustrates a partial, rear perspective view of the embodiment of the 27 kV utility metering cabinet shown in FIG. 17A, showing a riser bus disposed in a current transformer and cable compartment.

FIG. 17H illustrates a partial, rear perspective view of the embodiment of the 27 kV utility metering cabinet 1700 shown in FIG. 17A, showing the riser bus 1711 disposed in the current transformer and cable compartment 1710. The rear outer doors 1708 and 1709 of the 27 kV utility metering cabinet 1700 are opened to expose and provide access to the current transformer and cable compartment 1710. The riser bus 1711 comprises three riser phase buses 1711*a*, 1711*b*, and 1711*c* that connect to the main, multi-phase cross bus 1715 of the 27 kV utility metering cabinet 1700 illustrated in FIG. 17J. The riser bus 1711 is used for cable and current transformer connections. FIG. 17H also illustrates a ground bus 1712 disposed in the current transformer and cable compartment 1710. The ground bus 1712 provides a path for fault current to safely dissipate into the ground, thereby preventing excessive current from flowing through conductive components in the enclosure 1701, minimizing the risk of overheating, fires, and equipment damage in the 27 kV utility metering cabinet 1700. FIG. 17H also illustrates connections of the cables 1222 from the voltage transformer switch input bus 1211 illustrated in FIGS. 17B-17E, to the riser bus 1711.

Figure 17I:
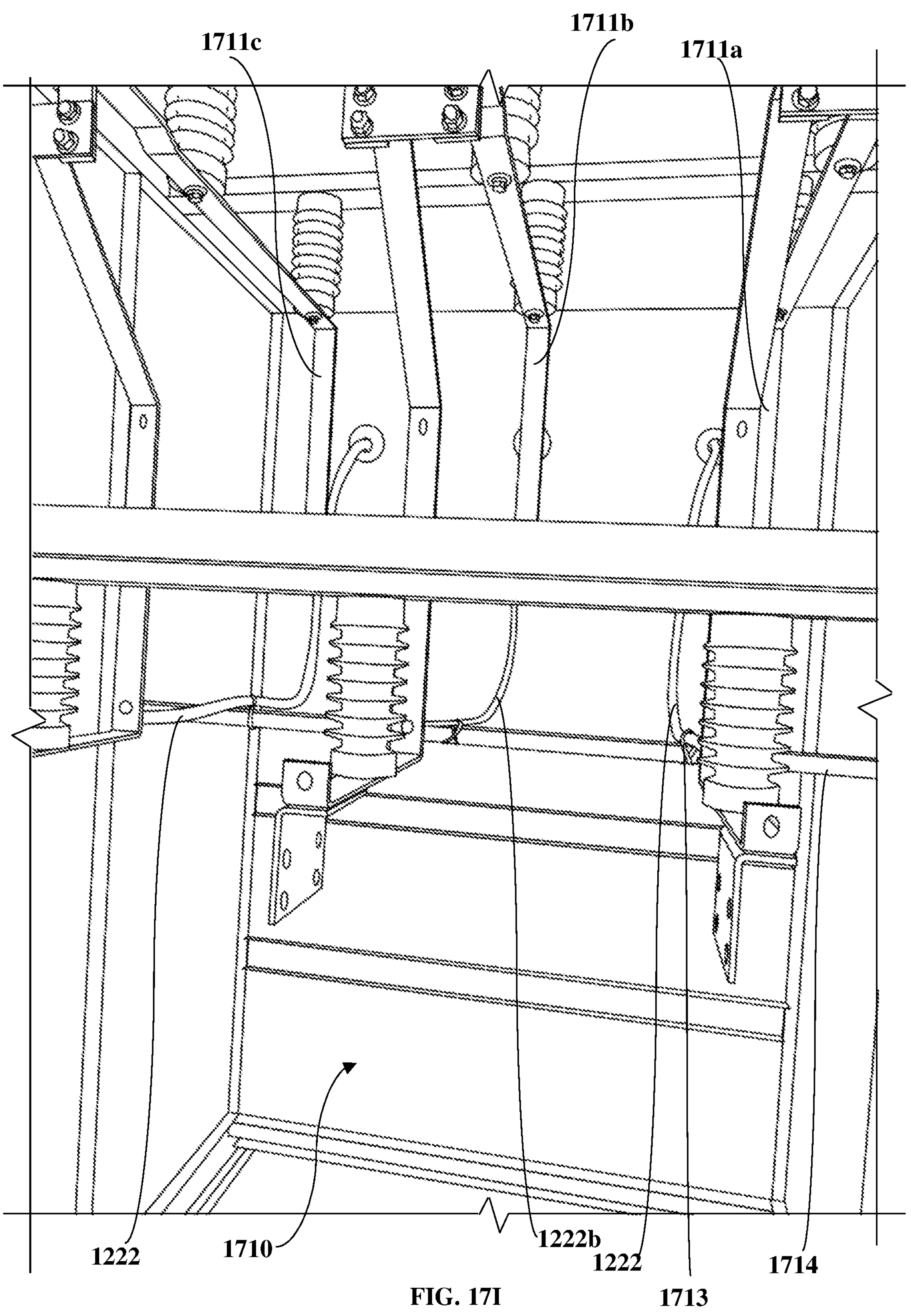
FIG. 17I illustrates a partial, rear perspective view of the embodiment of the 27 kV utility metering cabinet shown in FIG. 17A, showing voltage transformer cable connections to the riser bus in the current transformer and cable compartment.
Figure 17J:
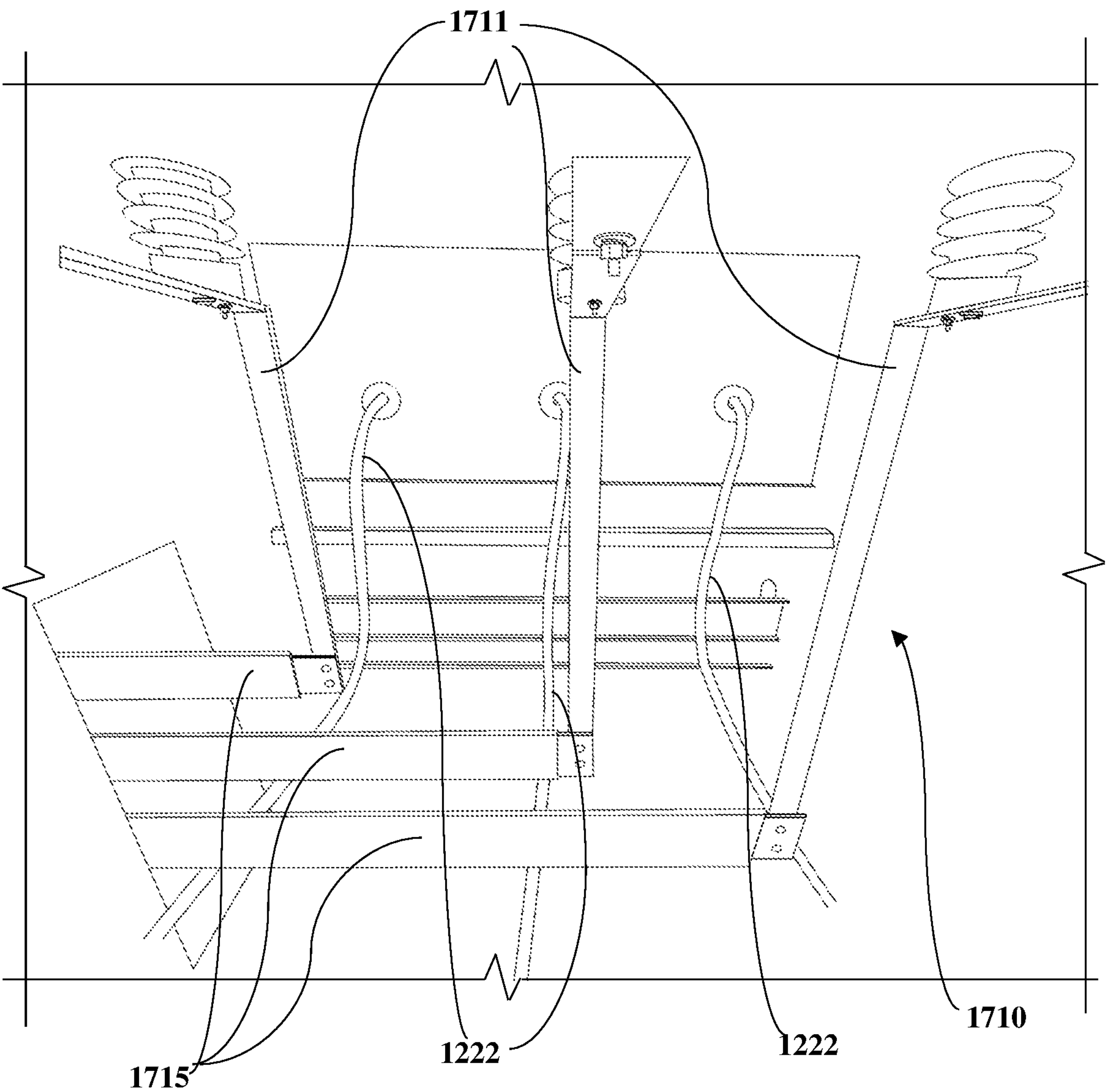
FIG. 17J illustrates a perspective, partial view of the current transformer and cable compartment, showing cable connections to a main, multi-phase cross bus via a riser bus.

FIG. 17I illustrates a partial, rear perspective view of the embodiment of the 27 kV utility metering cabinet 1700 shown in FIG. 17A, showing voltage transformer cable connections to the riser bus 1711 in the current transformer and cable compartment 1710. The cables 1222 from the voltage transformer switch input bus 1211 illustrated in FIGS. 17B-17E, are connected to the riser bus 1711 as illustrated in FIG. 17I. The cables 1222 are secured to Glastic supports 1714 with cable ties 1713 as illustrated in FIG. 17I. Since the phase-to-phase and phase-to-ground distances for the cables 1222 are large, in an embodiment, a stiff 600V AC-rated cable 1222*b* with a polyvinyl chloride (PVC) insulation manufactured, for example, by Grayline, LLC, for the B-phase is used for input connections. The 600V AC-rated cable 1222*b* is easy to route inside the enclosure 1701 of the 27 kV utility metering cabinet 1700 shown in FIG. 17A and to maintain a proper distance between the phases, which provides a reliable connection that saves cost.

FIG. 17J illustrates a perspective, partial view of the current transformer and cable compartment 1710, showing cable connections to the main, multi-phase cross bus 1715 via the riser bus 1711. The input cables 1222 that connect the voltage transformer switch input bus 1211 illustrated in FIGS. 17B-17E, to the main, multi-phase cross bus 1715 via the riser bus 1711 in the rear current transformer and cable compartment 1710 are illustrated in FIG. 17J. The phase distance between the riser buses 1711*a*, 1711*b*, and 1711*c* is, for example, about 18 inches. In an embodiment, the main, multi-phase cross bus 1715 is coated with epoxy. The width of each of the buses of the main, multi-phase cross bus 1715 is, for example, about 4.25 inches. The spacing between the buses of the main, multi-phase cross bus 1715 is, for example, about 10 inches to about 11 inches. The spacing is required if switchgear sections connected to the utility metering cabinet 1700 illustrated in FIGS. 17A-17C and FIG. 17G, contain vacuum breakers. The main, multi-phase cross bus 1715 connects the enclosure 1701 containing the 27 kV voltage transformer disconnect switch 1200, the voltage transformer (not shown), the current transformers (not shown), and the meters, to a metal-enclosed switchgear that contains main load interrupter (LI) switches and/or vacuum breakers for medium voltage power distribution. Instead of being positioned at the top of the enclosure 701 as illustrated in FIG. 7G, in an embodiment, the main bus of the 27 kV utility metering cabinet 1700, that is, the main, multi-phase cross bus 1715, is disposed in the middle of the current transformer and cable compartment 710 as illustrated in FIG. 17J.

The utility metering section, for example, the 27 kV utility metering cabinet 1700, is typically one section of a typical multi-section, medium voltage, metal-enclosed switchgear line-up. The utility metering section is connected to load interrupter (LI) switch sections or vacuum circuit breaker sections along with other customer sections that contain voltage transformers and current transformers for measurement, relaying, and control. In addition, there may be control power transformers to supply control power to relays and meters installed in the switchgear line-up. In an embodiment, there are multiple input load interrupter switches or vacuum breakers and multiple output load interrupter switches or vacuum breakers for various connected loads. The main, multi-phase cross bus 1715 conveniently connects all the switchgear compartments in the utility metering section.

Figure 18A:
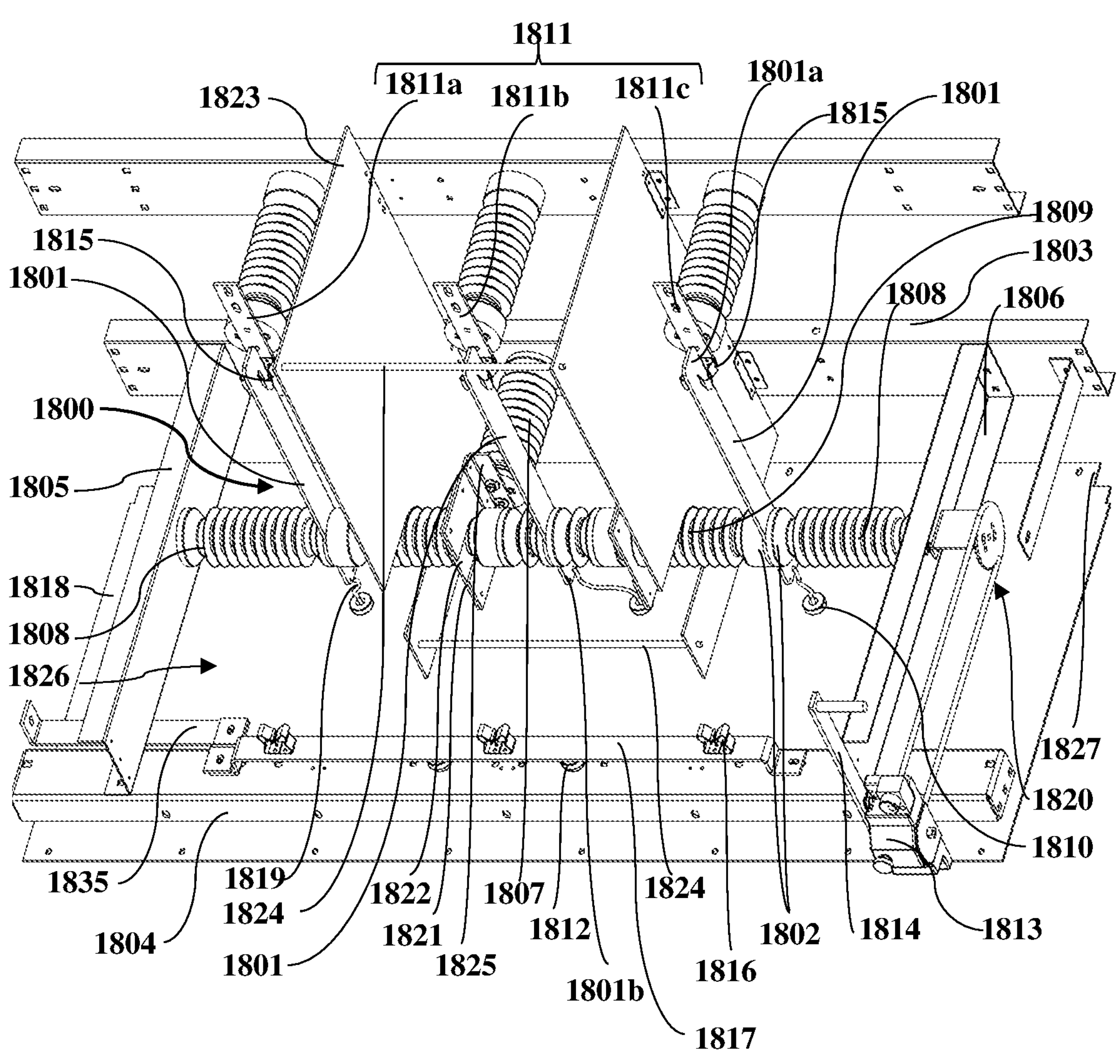
FIG. 18A illustrates a top perspective view of an embodiment of a 38-kilovolt (kV) voltage transformer disconnect switch.

FIG. 18A illustrates a top perspective view of an embodiment of a 38-kilovolt (kV) voltage transformer disconnect switch 1800. The voltage transformer disconnect switch 1800 comprises multiple switch blades 1801, for example, three switch blades 1801, one for each phase of a voltage transformer switch input bus 1811 as illustrated in FIG. 18A. In an example, the switch blades 1801 are made of ¼-inch thick aluminum. The switch blades 1801 are disposed in a space 1826 defined by opposing channels, namely, a rear support channel 1803 and a ground bus support channel 1804, and opposing arms 1805 and 1806. In an example, the length of the rear support channel 1803 is about 73.375 inches; the height of the rear support channel 1803 is about 6 inches, and the width of the rear support channel 1803 is about 2 inches. The rear support channel 1803 is made, for example, of a steel sheet of 11 gauge (ga) size. The ground bus support channel 1804 is configured to support a ground bus 1817 as illustrated in FIG. 18A. In an example, the length of the ground bus support channel 1804 is about 73.625 inches; the height of the ground bus support channel 1804 is about 4.375 inches, and the width of the ground bus support channel 1804 is about 2.562 inches. The ground bus support channel 1804 is made, for example, of a steel sheet of 7 ga size.

The switch blades 1801 are mounted between insulators 1802 in a voltage transformer switch compartment 2308 of a 38 kV utility metering cabinet 2300 illustrated in FIGS. 23A-23D. The insulators 1802 comprises end insulators 1808 and central insulators 1809 connected between the end insulators 1808. In an embodiment, each of the switch blades 1801 is configured as a generally rectangular-shaped structure comprising an upper part 1801*a* and a lower part 1801*b*. Multiple clips 1815 and 1816 are configured to connect the voltage transformer disconnect switch 1800 to a main bus 1831 illustrated in FIG. 23D and FIG. 23G via the voltage transformer switch input bus 1811, or to the ground bus 1817. The clips 1815 and 1816 are made, for example, of phosphor bronze. The clips 1815 and 1816 are configured for a tight connection to the switch blades 1801, when the switch blades 1801 are engaged with the clips 1815 or 1816. These clips comprise upper main power clips 1815 and lower grounding clips 1816. The upper parts 1801*a* of the switch blades 1801 are configured to connect to (a) the voltage transformer switch input bus 1811 that connects a voltage transformer (not shown) to the main bus 1831 of the utility metering cabinet 2300 via cables (not shown); or (b) the ground bus 1817 for safety. The ground bus 1817 is attached to the ground bus support channel 1804 of the voltage transformer disconnect switch 1800.

As illustrated in FIG. 18A, the switch blades 1801 are connected to the input buses 1811*a*, 1811*b*, and 1811*c* via the upper main power clips 1815. The upper parts 1801*a* of the switch blades 1801 are configured to engage with the upper main power clips 1815 for input bus connections in the utility metering cabinet 2300 and with the lower grounding clips 1816 for ground bus connections in the utility metering cabinet 2300. The input bus connections comprise connections to the voltage transformer switch input bus 1811 and in turn, to the main bus 1831. In an embodiment, the voltage transformer switch input bus 1811 connects directly to the main bus 1831 as illustrated in FIG. 23D and FIG. 23G. In an embodiment (not shown), the voltage transformer switch input bus 1811 connects to the main bus 1831 via cables (not shown). The upper main power clips 1815 connect the voltage transformer disconnect switch 1800 to the main bus 1831 via the voltage transformer switch input bus 1811. The ground bus connections comprise connections to the ground bus 1817 attached to the ground bus support channel 1804 of the voltage transformer disconnect switch 1800. The input buses 1811*a*, 1811*b*, and 1811*c* and the ground bus 1817 are made, for example, of copper.

When the upper parts 1801*a* of the switch blades 1801 are engaged with the upper main power clips 1815, the input buses 1811*a*, 1811*b*, and 1811*c* connect the switch blades 1801 to the main bus 1831, thereby connecting the voltage transformer to the main bus 1831 of the utility metering cabinet 2300. The lower parts 1801*b* of the switch blades 1801 are connected to upper fuse clip buses 1832 in the fuse compartment 2309 using braided copper elements, for example, braided copper wires 1819 as illustrated in FIG. 23E. The upper and lower fuse clip buses 1832 and 1833 illustrated in FIG. 23E, allow a utility to install fuses at the two fuse clips 1834 for each phase. The utility uses a short cable (not shown) to connect the voltage transformer to the lower fuse clip bus 1833. The upper fuse clip buses 1832 are configured to connect the voltage transformer disconnect switch 1800 to the fuse clips 1834 illustrated in FIG. 23E, and in turn, to the input fuses of the voltage transformer.

Also illustrated in FIG. 18A are insulating barriers 1818 and 1827 between the voltage transformer switch compartment 2308 and the fuse compartment 2309 illustrated in FIGS. 23D-23E, standoff insulators 1807, 1808, and 1809, wall bushings 1810, insulators 1812, support clamps 1821 and 1822 for the insulators 1802, phase barriers 1823, support rods 1824, and an angle bracket 1825 for the support clamps 1821 and 1822. The insulating barriers 1818 and 1827 and the phase barriers 1823 are made, for example, of thermoset fiberglass-reinforced polyester insulating materials, for example, Glastic GPO-3 materials produced by the Glastic company. The insulating barriers 1818 and 1827 provide sufficient clearance and creepage distances required at 38 kV class in the rear and bottom of the voltage transformer switch compartment 2308. An insulating barrier 1818 is configured to isolate the voltage transformer switch compartment 2308 from the fuse compartment 2309 for safety. The phase barriers 1823 provide sufficient clearance and creepage distances required at 38 kV class between phases. The stand-off insulators 1807, 1808, and 1809 provide more creepage for a given height since the insulator skirts multiply the effective creepage distance. The phase barriers 1823 are secured and supported by the support clamps 1821 and 1822 and the support rods 1824. For 38 kV, a larger creepage distance is required since the basic insulation level (BIL) is 150 kV. The 38 kV voltage transformer disconnect switch 1800 is made substantially compact by using Glastic barriers 1818, 1827, and 1823, the wall bushings 1810, and the standoff insulators 1807, 1808, and 1809. The standoff insulators 1807, 1808, and 1809 provide electrical insulation and prevent direct contact between different phases of conductive components such as busbars, circuit breakers, and other equipment within the utility metering cabinet 2300. The stand-off insulators 1807, 1808, and 1809 provide large creepage distances that are required to withstand a 150 kV lightning impulse voltage for a 38 kV switchgear. The lengths of the standoff insulators 1807, 1808, and 1809 are, for example, about 3.5 inches, 10.5 inches, 11 inches, and 12.75 inches, respectively. The standoff insulators 1807, 1808, and 1809 are, for example, manufactured by Polycast Industrial Products Ltd. The insulators 1812 disposed below the ground bus 1817 separate and keep the ground bus 1817 away from the painted metal surface of the ground bus support channel 1804. The insulators 1812 disposed below the ground bus 1817 are made, for example, of glass polyester. The length of the insulators 1812 is, for example, about 1.375 inches. A bus 1835 on the left side of the ground bus 1817 is configured to be connected to the ground bus 2312 disposed at the bottom in the rear current transformer and cable compartment 2310 illustrated in FIG. 23F. The ground bus 1817 is configured to be connected to the ground bus 2312, which in turn, is connected to the building or service ground.

The wall bushings 1810 are disposed on the bottom Glastic insulating barrier 1827 of the voltage transformer switch compartment 2308. The wall bushings 1810 provide insulation for cables by increasing the creepage distance between a phase and the ground. In an embodiment, the wall bushings 1810 are installed in the Glastic insulating barrier 1827 to provide a better creepage distance between phase cables and the ground. The wall bushings 1810 provide a controlled and insulated passage for the braided copper wires 1819 to pass through the Glastic insulating barrier 1827 into the fuse compartment 2309 and connect to the upper fuse clip buses 1832 illustrated in FIG. 23E. The wall bushings 1810 are made, for example, of glass polyester or porcelain. The phase barriers 1823 extend substantially perpendicularly to the rear support channel 1803. The phase barriers 1823 are configured to accommodate the insulators 1809 as illustrated in FIG. 18A. The phase barriers 1823 separate the input buses 1811*a*, 1811*b*, and 1811*c* of the voltage transformer switch input bus 1811. The phase barriers 1823 serve as insulating barriers between the input buses 1811*a*, 1811*b*, and 1811*c* and prevent electrical arcing or short circuits between adjacent phases by increasing clearance and creepage distances within the voltage transformer disconnect switch 1800. The support rods 1824 are connected to the phase barriers 1823 as illustrated in FIG. 18A. The support rods 1824 provide support to the phase barriers 1823 within the voltage transformer disconnect switch 1800. The support rods 1824 are made, for example, of glass polyester, nylon, etc.

The clamps 1821 and 1822 and the angle bracket 1825 for the clamps 1821 and 1822 are made, for example, of thermoset fiberglass-reinforced polyester insulating materials, for example, Glastic GPO-3 materials produced by the Glastic company. The structure and function of the clamps 1821 and 1822 and the angle bracket 1825 for the clamps 1821 and 1822 are disclosed in the description of FIGS. 22A-22C. The spring pins 1224 illustrated in FIGS. 15A-15C are also used in the 38 kV voltage transformer disconnect switch 1800 for securing the insulators 1802 to the switch blades 1801 of the 38 kV voltage transformer disconnect switch 1800 as disclosed in the description of FIGS. 15A-15C. Also illustrated in FIG. 18A is a switch handle assembly 1813 operably connected to the voltage transformer disconnect switch 1800 via a drive system, for example, a chain drive 1820. The switch handle assembly 1813 comprises a switch handle 1814 configured to operate the voltage transformer disconnect switch 1800. In an embodiment, the switch handle assemblies 1213 and 1813 of the 27 kV voltage transformer disconnect switch 1200 and the 38 kV voltage transformer disconnect switch 1800 illustrated in FIG. 12 and FIG. 18A, respectively, are of a larger size and weight than the switch handle assembly 513 of the 15 kV voltage transformer disconnect switch 100 illustrated in FIG. 8A, thereby requiring a larger bolt of high strength.

Figure 18B:
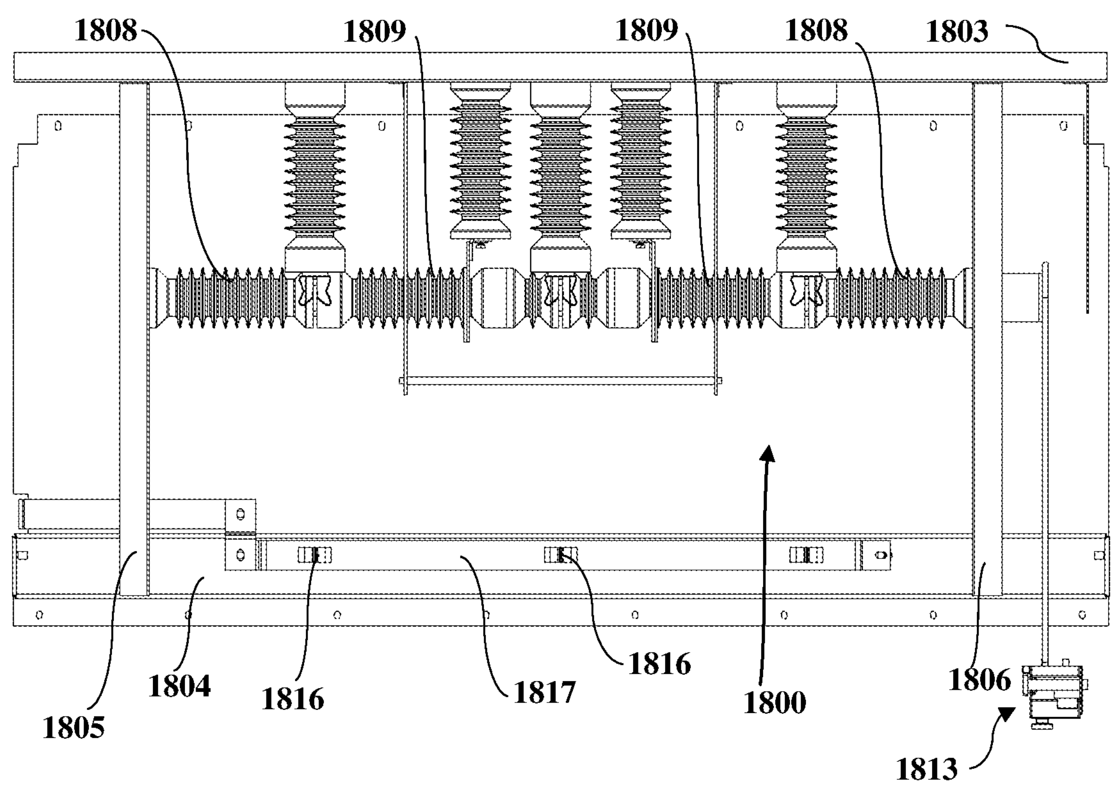
FIG. 18B illustrates a top plan view of the embodiment of the 38 kV voltage transformer disconnect switch shown in FIG. 18A.
Figure 18C:
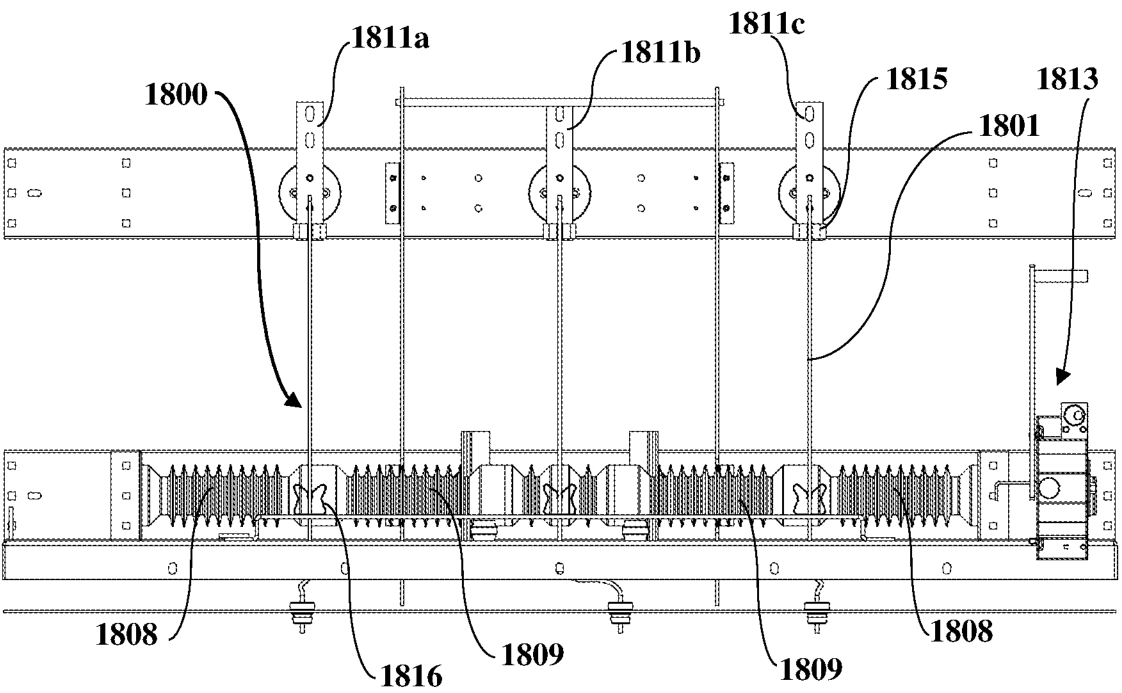
FIG. 18C illustrates a front elevation view of the embodiment of the 38 kV voltage transformer disconnect switch shown in FIG. 18A.

FIG. 18B illustrates a top plan view of the embodiment of the 38 kV voltage transformer disconnect switch 1800 shown in FIG. 18A. FIG. 18C illustrates a front elevation view of the embodiment of the 38 kV voltage transformer disconnect switch 1800 shown in FIG. 18A.

Figure 18D:
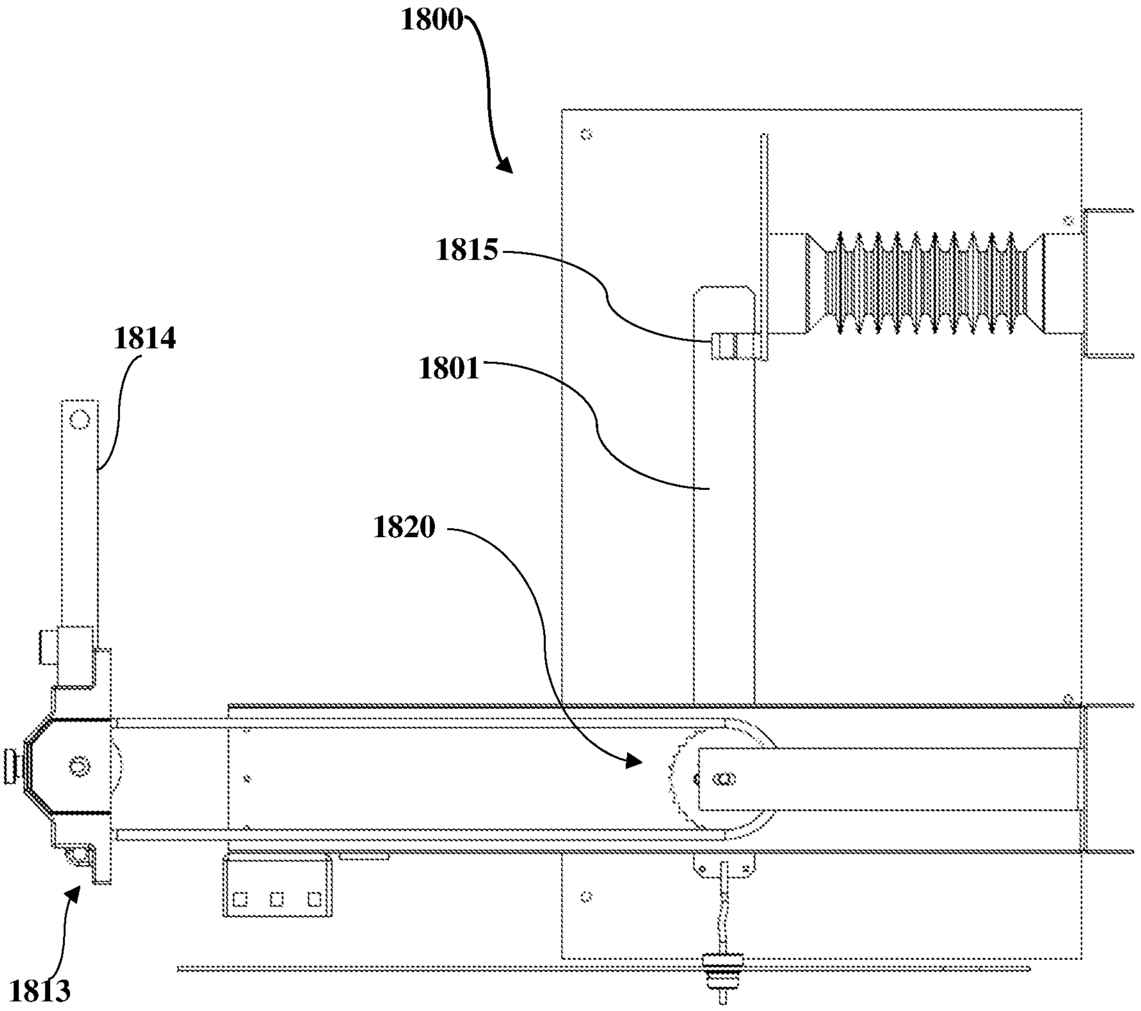
FIG. 18D illustrates a right-side elevation view of the embodiment of the 38 kV voltage transformer disconnect switch shown in FIG. 18A.

FIG. 18D illustrates a right-side elevation view of the embodiment of the 38 kV voltage transformer disconnect switch 1800 shown in FIG. 18A. The right-side elevation view shows the switch handle assembly 1813 operably connected to the voltage transformer disconnect switch 1800 via the chain drive 1820. The switch handle assembly 1813 is, for example, the PowerCon® switch handle assembly A013-039. The chain drive 1820 is similar in structure and function to the chain drive 110 disclosed in the description of FIG. 5D.

Figure 19:
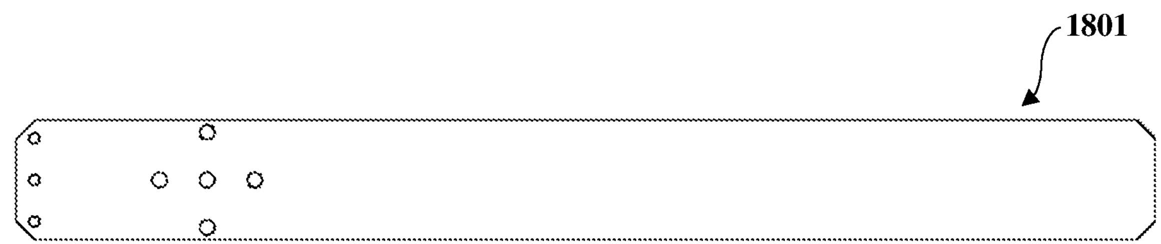
FIG. 19 illustrates a side elevation view of an embodiment of a switch blade of the 38 kV voltage transformer disconnect switch shown in FIG. 18A.

FIG. 19 illustrates a side elevation view of an embodiment of a switch blade 1801 of the 38 kV voltage transformer disconnect switch 1800 shown in FIG. 18A. In an example, the length of the switch blade 1801 is about 23.875 inches, the width of the switch blade 1801 is about 2.5 inches, and the thickness of the switch blade 1801 is about 0.25 inches. The switch blade 1801 is made, for example, from aluminum.

Figure 20A:
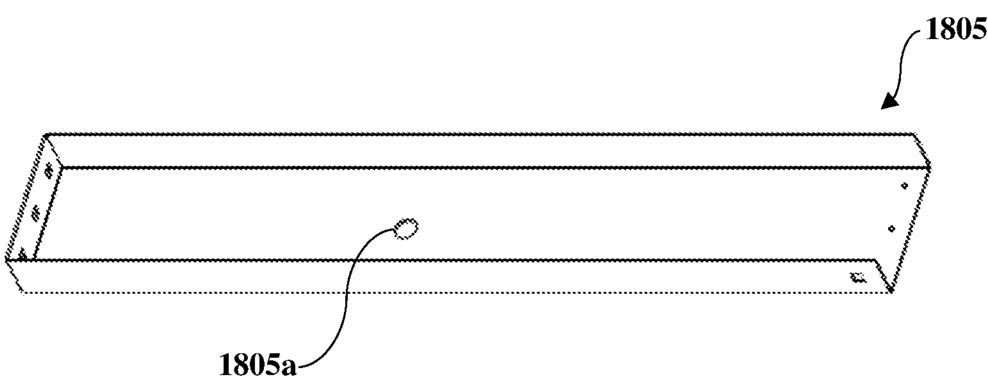
FIGS. 20A-20B illustrate perspective views of opposing arms of the 38 kV voltage transformer disconnect switch.
Figure 20B:
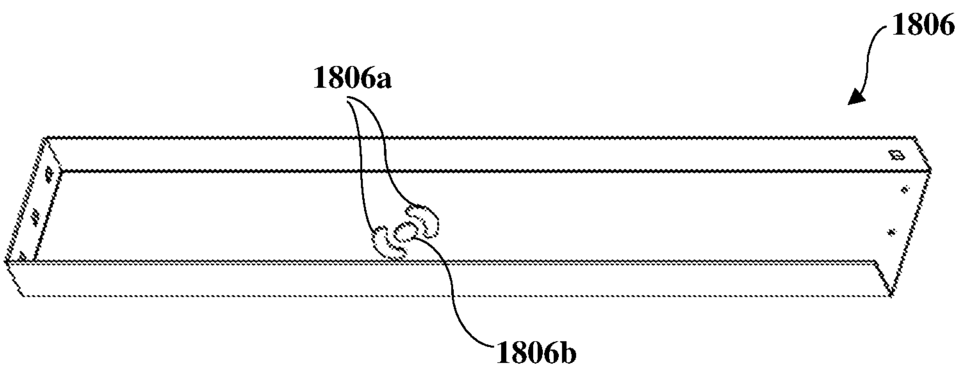

FIGS. 20A-20B illustrate perspective views of the opposing arms 1805 and 1806 of the 38 kV voltage transformer disconnect switch 1800 shown in FIG. 18A. The arm 1805 is configured as a sheet metal control bracket with a generally circular hole 1805*a* as illustrated in FIG. 20A. In an embodiment, the insulator 1808 proximal to the arm 1805 illustrated in FIG. 18A, is connected to the arm 1805, for example, using a ½-inch bolt inserted through the generally circular hole 1805*a* of the arm 1805. The arm 1806 is configured as a sheet metal control bracket with grooves 1806*a* disposed around a generally circular hole 1806*b* as illustrated in FIG. 20B. In an embodiment, the insulator 1808 proximal to the arm 1806 illustrated in FIG. 18A, is connected to the arm 1806, for example, using a ½-inch bolt inserted through the generally circular hole 1806*b* of the arm 1806. In an example, the length, height, and width of the arms 1805 and 1806 are about 34.5 inches, about 6 inches, and about 2 inches, respectively. Each of the opposing arms 1805 and 1806 is made, for example, from a steel sheet of 11 gauge (ga) size.

FIGS. 21A-21C illustrate a perspective view, a side elevation view, and a top plan view, respectively, of an embodiment of a clip 1815/1816 configured to connect the 38 kV voltage transformer disconnect switch 1800 shown in FIG. 18A, to the main bus 1831 or to the ground bus 1817 shown in FIG. 23D. A pair of clips 1815/1816 of the type shown in FIGS. 21A-21C is attached back to back such that their curved front ends 1815*a*/1816*a* abut each other to allow a tight engagement with the switch blades 1801 as illustrated in FIG. 18A. Bases 1815*b*/1816*b* of each clip 1815/1816 are attached to the voltage transformer switch input bus 1811 or the ground bus 1817 as illustrated in FIG. 18A, to allow a tight connection of the upper main power clips 1815 and the lower grounding clips 1816 to the corresponding switch blades 1801. In an example, the length of each clip 1815/1816 is about 1 inch, the height of each clip 1815/1816 is about 2.011 inches, the width of the base 1815*b*/1816*b* of each clip 1815/1816 is about 1.05 inches, and the thickness of each clip 1815/1816 is about 0.05 inch. The clip 1815/1816 is made, for example, from a phosphor bronze sheet of 17 gauge (ga) size.

Figures 22A, 22B:
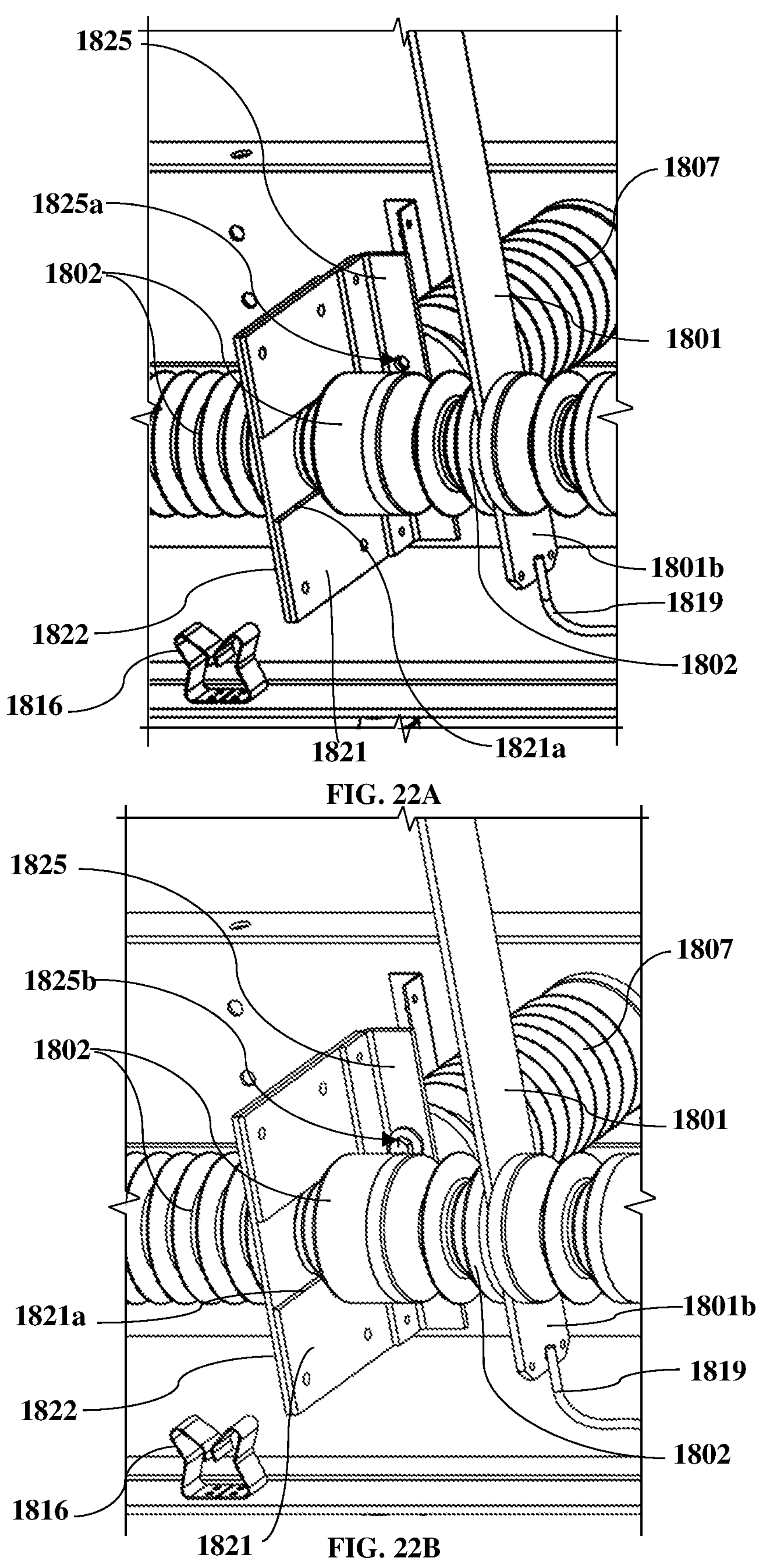
FIGS. 22A-22C illustrate enlarged, perspective views of support clamps configured to support the insulators within the 38 kV voltage transformer disconnect switch.
Figure 22C:
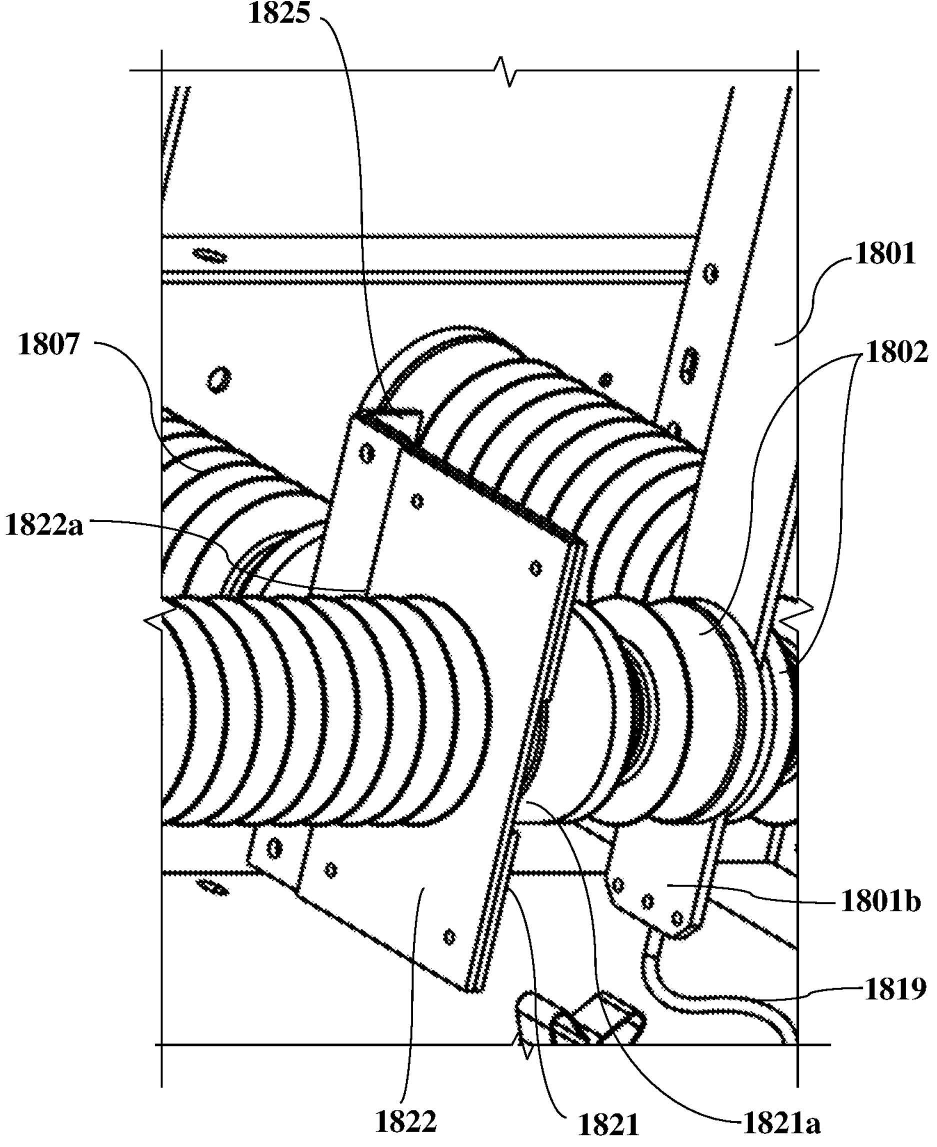

FIGS. 22A-22C illustrate enlarged, perspective views of support clamps 1821 and 1822 configured to support the insulators 1802 and 1807 within the 38 kV voltage transformer disconnect switch 1800 shown in FIG. 18A. The support clamps 1821 and 1822 are bolted between the insulators 1802 and 1807. The support clamps 1821 and 1822 are configured to support the insulators 1802 and 1807 within the voltage transformer switch assembly. In an embodiment, the support clamps 1821 and 1822 comprise U-shaped openings 1821*a* and 1822*a*, respectively, configured to accommodate and support the insulators 1802. In an embodiment, the support clamps 1821 and 1822 are two Glastic pieces with U-shaped cutouts or openings 1821*a* and 1822*a*, respectively. The support clamps 1821 and 1822 are disposed flush against each other in opposite directions, such that their U-shaped openings 1821*a* and 1822*a* are aligned with each other to accommodate the insulators 1802. The support clamps 1821 and 1822 are bolted to the standoff insulator 1807 using the angle bracket 1825. In an embodiment, the angle bracket 1825 is an L-shaped Glastic bracket as illustrated in FIGS. 22A-22C. Two bolts, for example, ⅜-inch steel bolts 1825*b*, one of which is illustrated in FIG. 22B, are inserted into openings 1825*a* of the angle bracket 1825, one of which is illustrated in FIG. 22A, for securing the support clamps 1821 and 1822 to the standoff insulator 1807. The angle bracket 1825 bolted to the standoff insulator 1807 supports both the support clamps 1821 and 1822 with the U-shaped openings 1821*a* and 1822*a*, respectively. Also illustrated in FIGS. 22A-22C is a switch blade 1801 sandwiched between the insulators 1802 and a braided copper wire 1819 attached to the lower part 1801*b* of the switch blade 1801.

The two support clamps 1821 and 1822 provide additional strong support required by the 38 kV voltage transformer disconnect switch-insulator assembly which is long and heavy. The support clamps 1821 and 1822 are disposed at a point with the smallest diameter, that is, in between the two skirts of the insulators 1802. The steel bolts 1825*b* used for securing the two support clamps 1821 and 1822 to the standoff insulator 1807 provide strength and rigidity to the support. The steel bolts 1825*b* get charged when a high lightning impulse voltage of, for example, about 150 kV, is applied to the 38 kV voltage transformer disconnect switch 1800. The switch blades 1801 of the 38 kV voltage transformer disconnect switch 1800 are charged and that charge, in turn, charges the steel bolts 1825*b*. In an embodiment, a barrier is disposed between the steel bolt 1825*b* and the adjacent phase switch blade 1801 to preclude occurrence of a flash-over, thereby ensuring safety. Furthermore, since sufficient distance is provided between two switch blades 1801 with a Glastic phase barrier 1823 between phases as illustrated in FIG. 18A, the charged steel bolts 1825*b* do not have any ground or phase nearby to discharge, thereby ensuring safety. The 38 kV voltage transformer disconnect switch 1800 is fully tested at 150 kV lightning impulse voltages. In an embodiment, for added safety, an insulating cap made, for example, of a plastisol material is disposed over each steel bolt 1825*b* on both sides for the nut and the bolt.

Figure 23A:
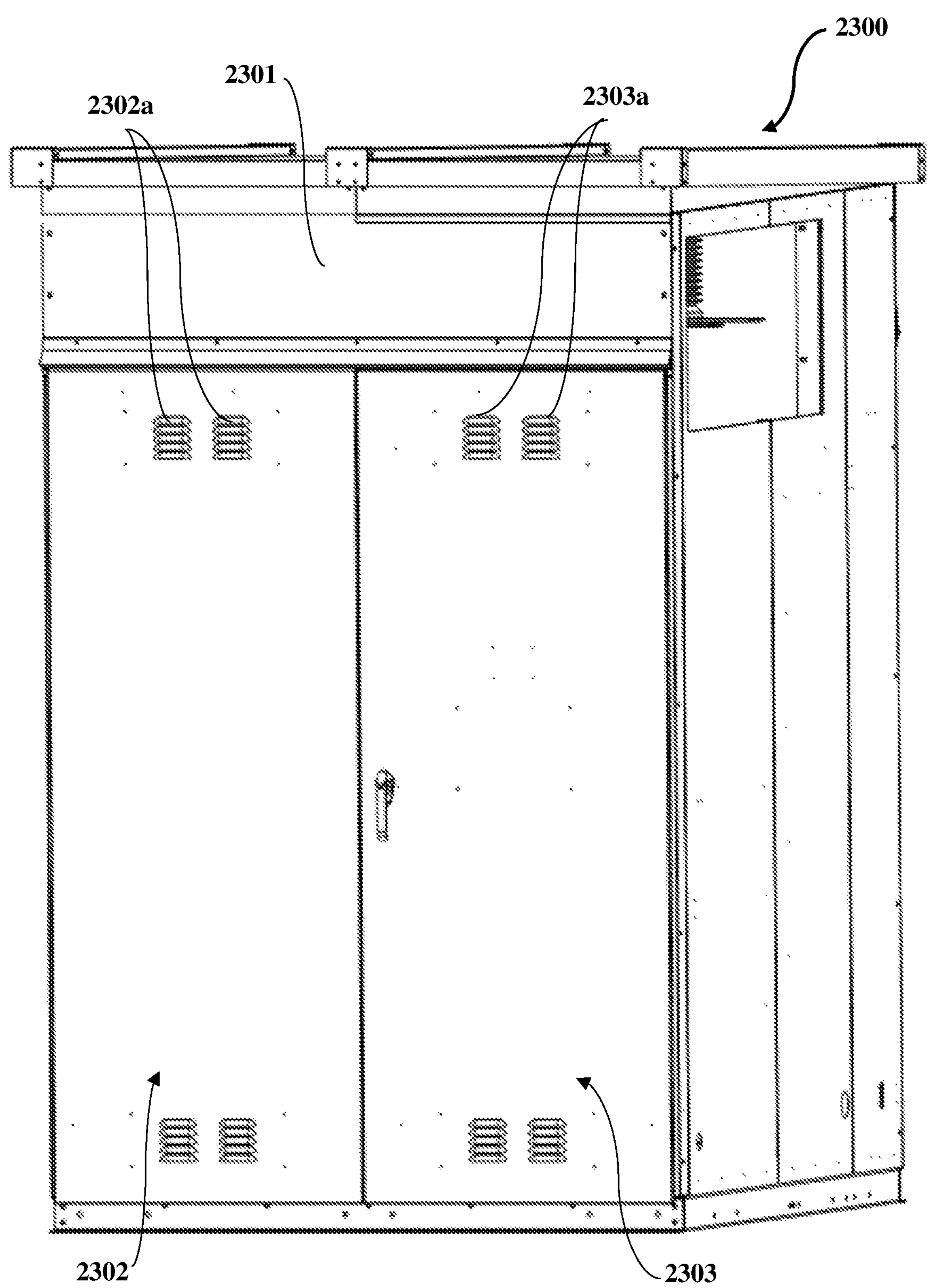
FIG. 23A illustrates a front perspective view of an embodiment of a 38 kV utility metering cabinet, showing front outer doors closed.

FIG. 23A illustrates a front perspective view of an embodiment of the 38 kV utility metering cabinet 2300, showing front outer doors 2302 and 2303 closed. The utility metering cabinet 2300 comprises an enclosure 2301 configured to meet predefined electrical enclosure requirements comprising, for example, National Electrical Manufacturers Association (NEMA) 3R requirements and the American National Standards Institute (ANSI)/the Institute of Electrical and Electronics Engineers (IEEE) Category A requirements. For example, the enclosure 2301 is designed for outdoor NEMA 3R and meets IEEE C37.20.3 Category A requirements. In an embodiment, the doors 2302 and 2303 comprise gaskets (not shown) and louvers 2302*a* and 2303*a* with filters (not shown). A voltage transformer switch compartment 2308, a fuse compartment 2309, and a current transformer and cable compartment 2310 are housed in the enclosure 2301 of the 38 kV utility metering cabinet 2300 as illustrated in FIGS. 23D-23F. The enclosure 2301 of the 38 kV utility metering cabinet 2300 is larger than the enclosures 701 and 1701 of the 15 kV utility metering cabinet 700 and the 27 kV utility metering cabinet 1700 illustrated in FIGS. 7A-7D and FIGS. 17A-17C, respectively. In an example, the dimensions of the 38 kV utility metering cabinet 2300 with the voltage transformer disconnect switch 1800 are 74" W×98" D×122" H. While the width of the enclosure of the utility metering cabinet is optimized for each kV rating due to the phase-to-phase and phase-to-ground distances required at each voltage rating, the depth and the height of the enclosure of the utility metering cabinet is configured to be flexibly adjusted to meet space requirements of various utilities for installation.

Figure 23B:
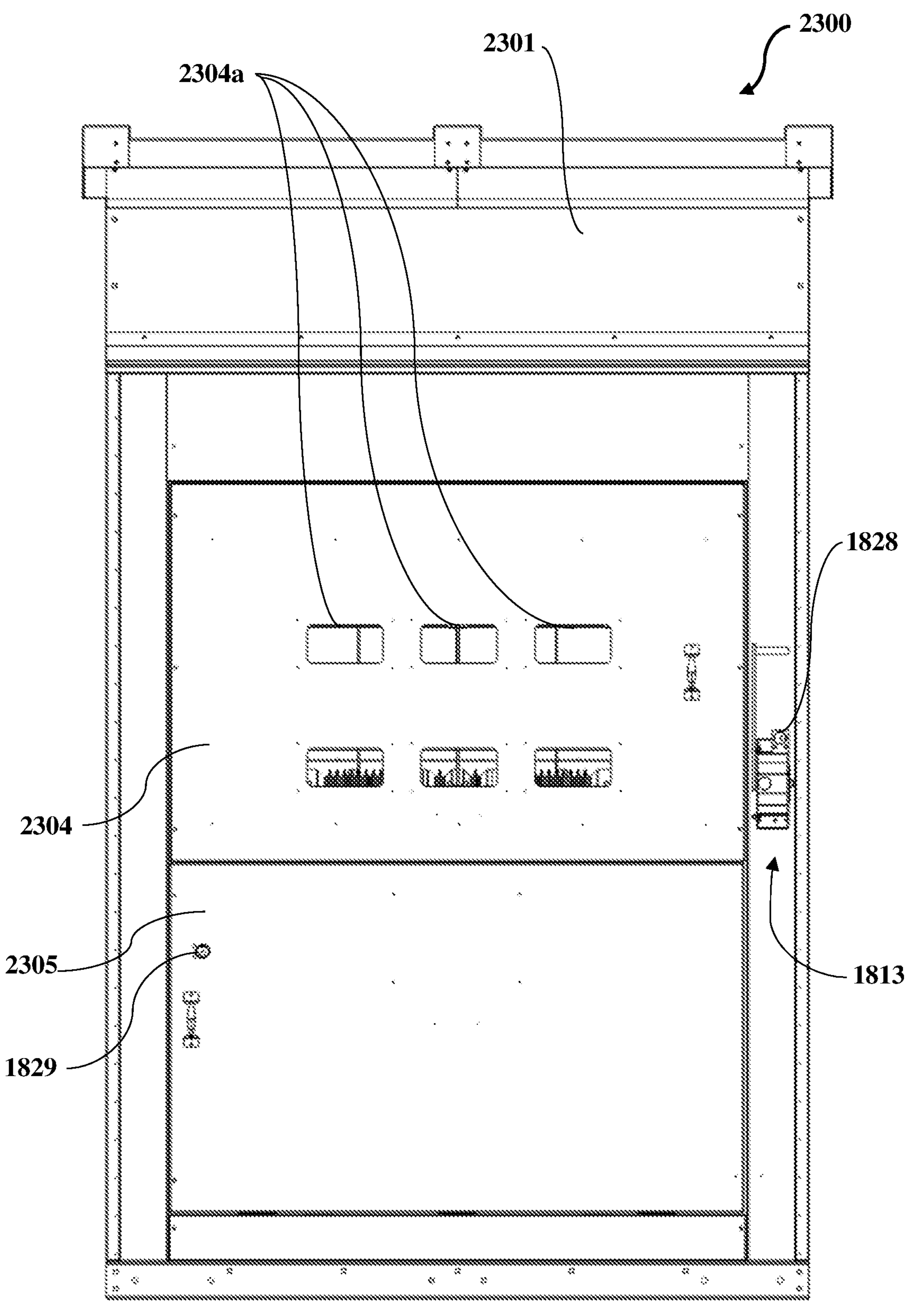
FIG. 23B illustrates a front perspective view of the embodiment of the 38 kV utility metering cabinet shown in FIG. 23A, showing open doors of a voltage transformer switch compartment and a fuse compartment.

FIG. 23B illustrates a front perspective view of the embodiment of the 38 kV utility metering cabinet 2300 shown in FIG. 23A, showing open doors 2304 and 2305 of the voltage transformer switch compartment 2308 and the fuse compartment 2309, respectively. Also illustrated in FIG. 23B are safety interlocking devices 1828 and 1829 connected to the switch handle assembly 1813 and to the door 2305 of the fuse compartment 2309 of the utility metering cabinet 2300. The safety interlocking devices 1828 and 1829 are, for example, KIRK® keys of Kirk Key Interlock Company, LLC. The safety interlocking devices 1828 and 1829 are configured to provide safety for opening and closing of the fuse compartment 2309, ensuring that the voltage transformer disconnect switch 1800 illustrated in FIGS. 18A-18D is grounded before the fuse compartment 2309 is opened for maintenance. In an embodiment, multiple viewing windows 2304*a*, for example, six Lexan© windows, are disposed on the door 2304 of the voltage transformer switch compartment 2308, two for each phase, to view the position of the voltage transformer disconnect switch 1800 and to visually ensure that the switch blades 1801 of the voltage transformer disconnect switch 1800 are grounded before attempting to open the door 2305 of the fuse compartment 2309 with the safety interlocking device 1829, thereby providing an added level of safety for field personnel.

Figure 23C:
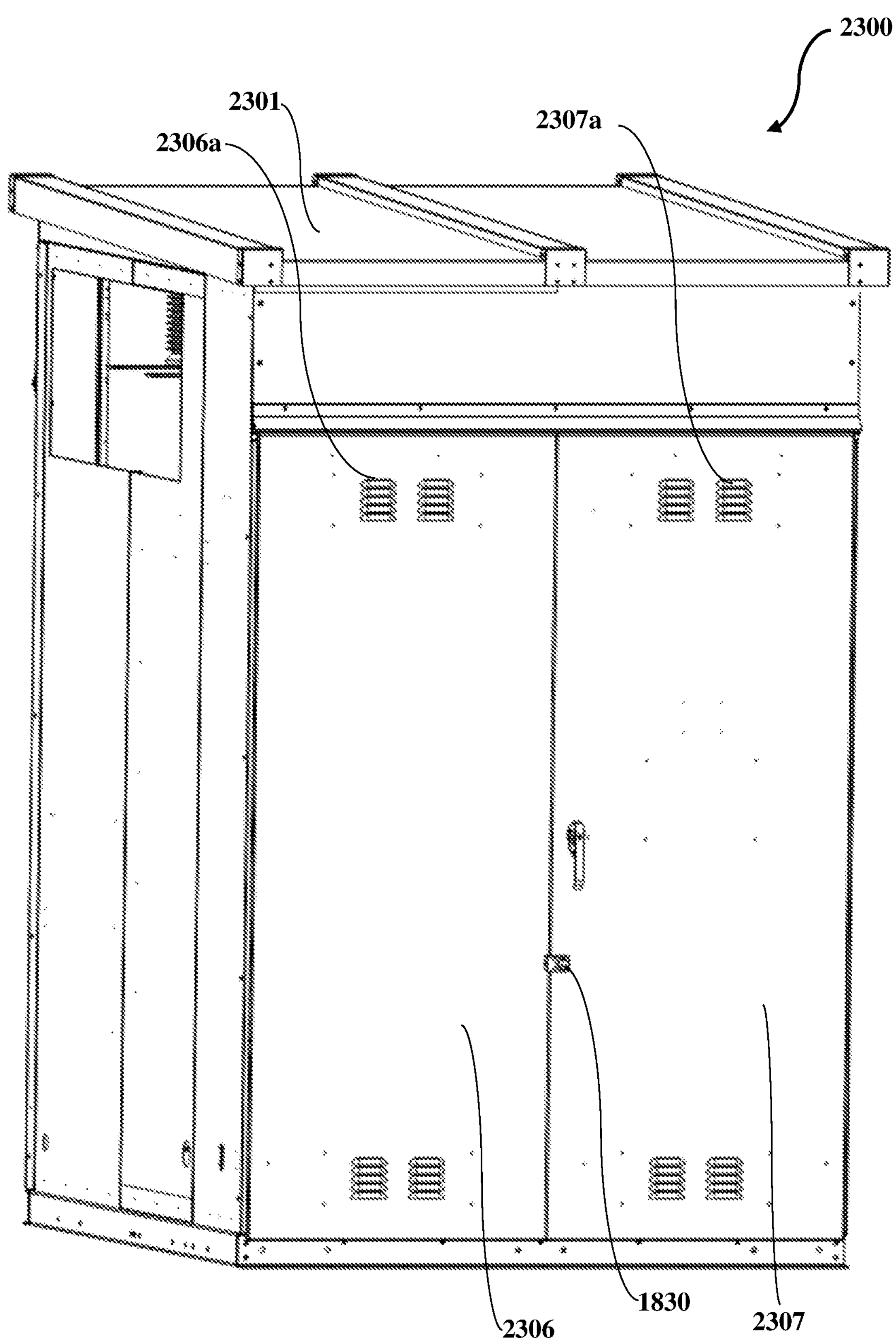
FIG. 23C illustrates a rear perspective view of the embodiment of the 38 kV utility metering cabinet, showing rear outer doors closed.
Figure 23D:
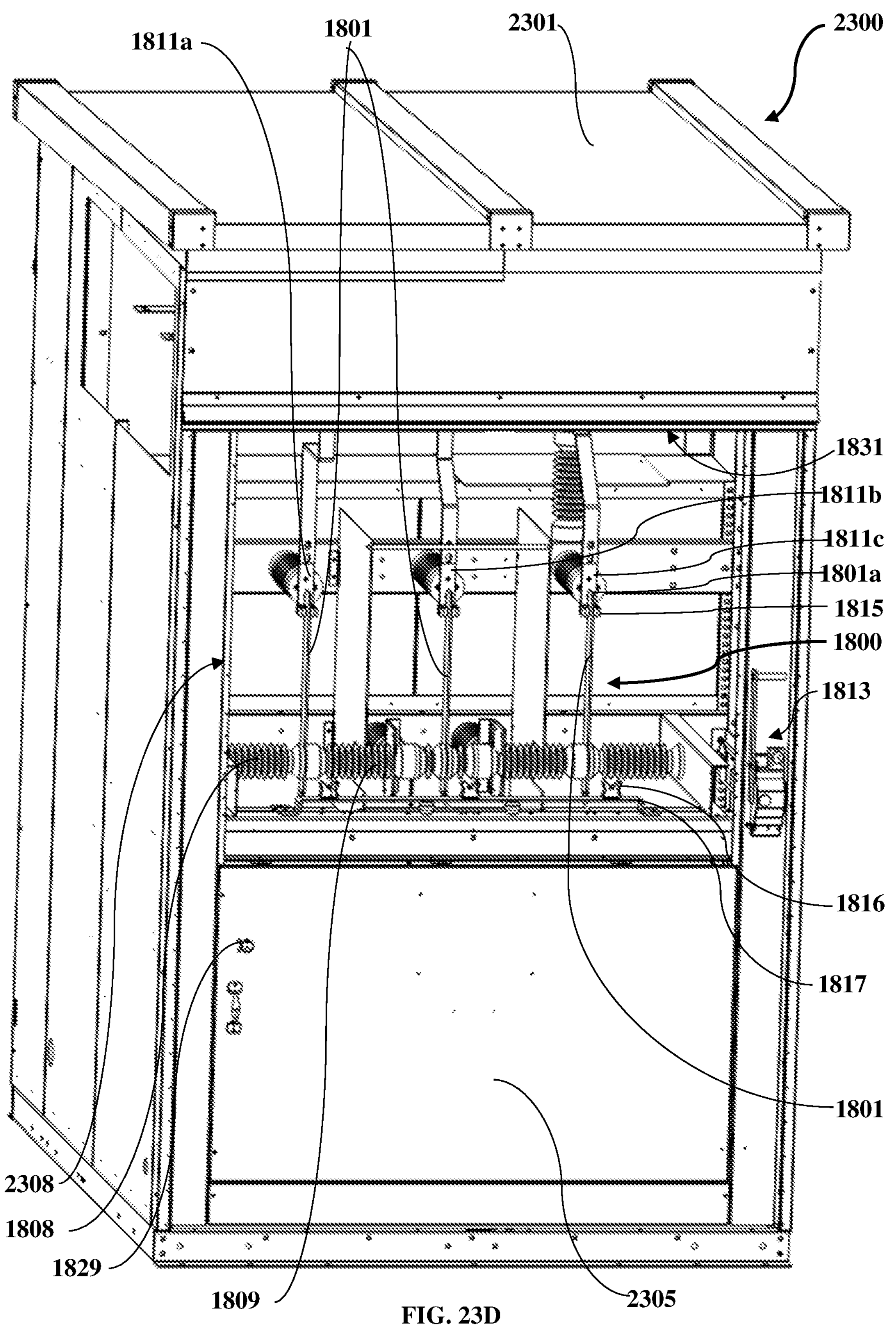
FIG. 23D illustrates a front perspective view of the embodiment of the 38 kV utility metering cabinet, showing the switch blades of the 38 kV voltage transformer disconnect switch in the connected ON position in the voltage transformer switch compartment.
Figure 23E:
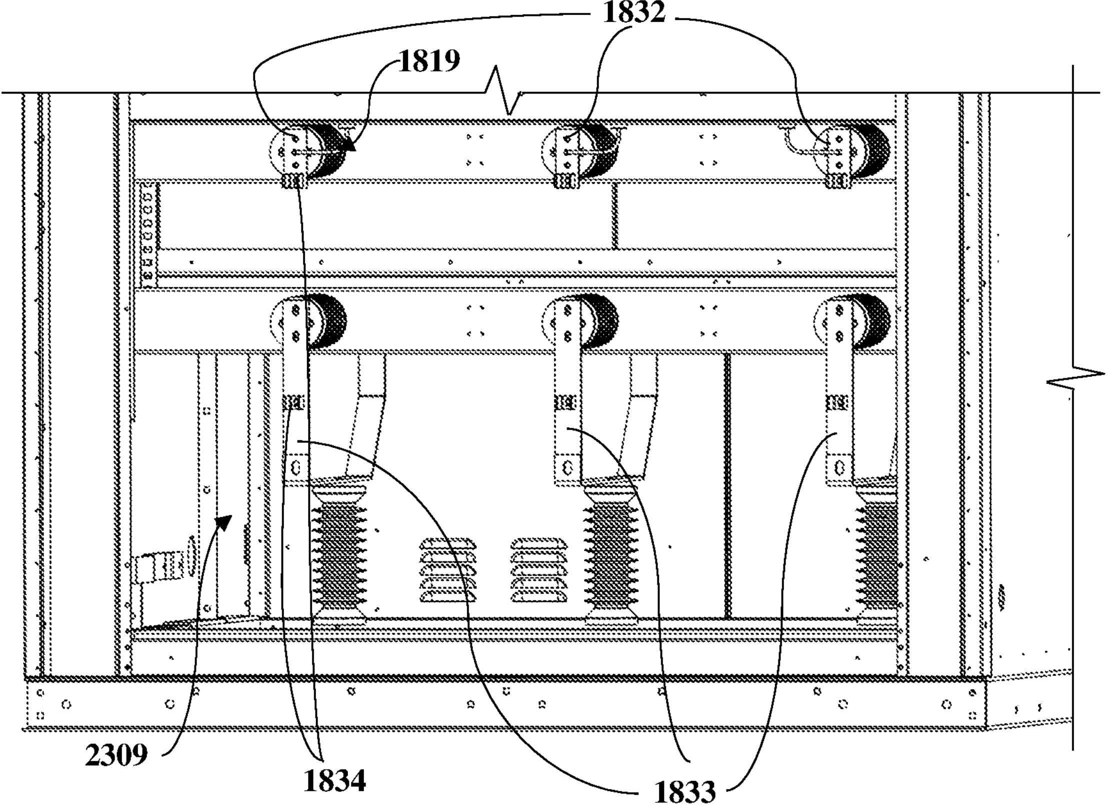
FIG. 23E illustrates a partial, front perspective view of a fuse compartment of the 38 kV utility metering cabinet shown in FIG. 23A.
Figure 23F:
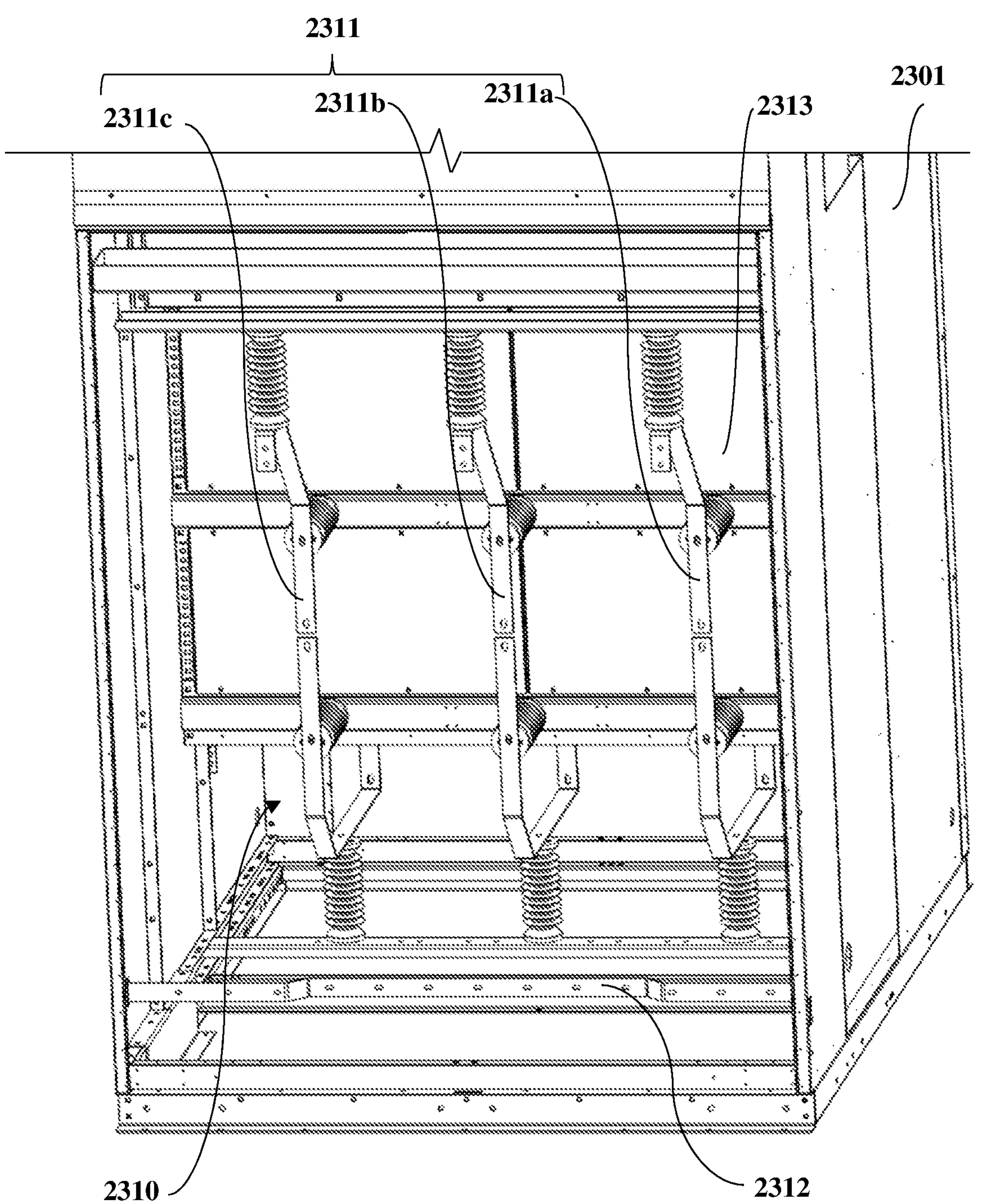
FIG. 23F illustrates a partial, rear perspective view of the 38 kV utility metering cabinet shown in FIG. 23A, showing a phase current transformer and cable bus and a ground bus in a current transformer and cable compartment.
Figure 23G:
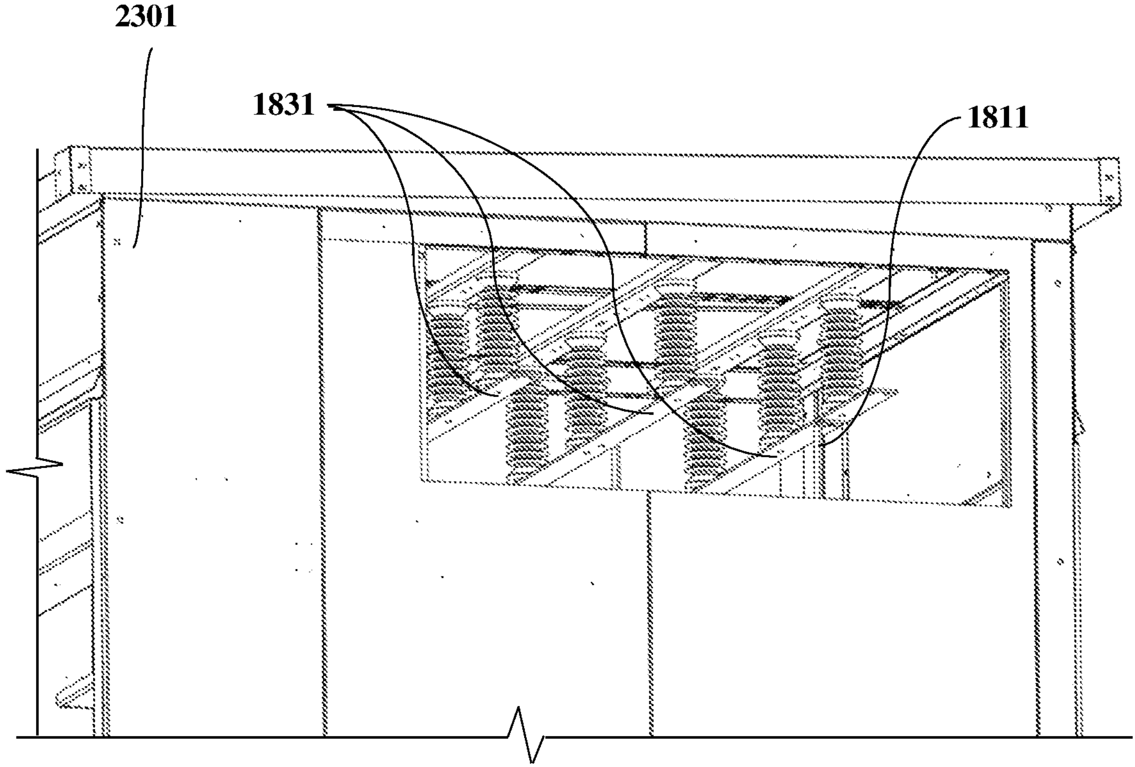
FIG. 23G illustrates a partial, right-side perspective view of the 38 kV utility metering cabinet shown in FIG. 23A, showing a direct connection of a voltage transformer switch input bus to a main bus.

FIG. 23C illustrates a rear perspective view of the embodiment of the 38 kV utility metering cabinet 2300, showing rear outer doors 2306 and 2307 closed. In an embodiment, the doors 2306 and 2307 comprise gaskets (not shown) and louvers 2306*a* and 2307*a* with filters (not shown). In an embodiment as illustrated in FIG. 23C, a safety interlocking device 1830, for example, a KIRK® key of Kirk Key Interlock Company, LLC, is used for securing the rear outer doors 2306 and 2307 of the 38 kV utility metering cabinet 2300. The safety interlocking device 1830 is used to ensure that the rear outer doors 2306 and 2307 are not opened unless the voltage transformer disconnect switch 1800 illustrated in FIGS. 18A-18D is in the grounded position and the utility metering cabinet 2300 is not energized.

FIG. 23D illustrates a front perspective view of the embodiment of the 38 kV utility metering cabinet 2300, showing the switch blades 1801 of the voltage transformer disconnect switch 1800 in the connected ON position in the voltage transformer switch compartment 2308. The voltage transformer switch input bus 1811 comprising the input buses 1811*a*, 1811*b*, and 1811*c* illustrated in FIG. 18A, is connected to the main bus 1831 as illustrated in FIG. 23D. In an embodiment, the voltage transformer switch input bus 1811 serves as a riser bus that directly connects to the main bus 1831, without a cable connection. Also illustrated in FIG. 23D are the upper main power clips 1815 engaging the upper parts 1801*a* of the switch blades 1801 in the connected ON position, and the lower grounding clips 1816 attached to the ground bus 1817 of the 38 kV voltage transformer disconnect switch 1800 in the voltage transformer switch compartment 2308. The construction of the 38 kV voltage transformer disconnect switch 1800 is similar to that of the 27 kV voltage transformer disconnect switch 1200 illustrated in FIG. 12, except that the switch blades 1801 of the 38 kV voltage transformer disconnect switch 1800 are longer than the switch blades 1201 of the 27 kV voltage transformer disconnect switch 1200 illustrated in FIG. 12. To accommodate the longer switch blades 1801, stronger clips 1815 and 1816 are utilized in the 38 kV voltage transformer disconnect switch 1800 for securing the switch blades 1801 in their closed or connected ON position and the open or grounded position, respectively. To accommodate longer distances within the 38 kV voltage transformer disconnect switch 1800, the switch blades 1801 are sandwiched between longer insulators 1802 that those of the 27 kV voltage transformer disconnect switch 1200. For example, the insulators 1808 at the ends of the 38 kV voltage transformer disconnect switch 1800 are about 11 inches long and the insulators 1809 between phases are about 12.75 inches long. The mechanisms of the switch handle assembly 1813 and the chain drive 1820 in the 38 kV voltage transformer disconnect switch 1800 are similar to those of the 27 kV voltage transformer disconnect switch 1200 with accommodations made for the larger 38 kV voltage transformer disconnect switch 1800.

FIG. 23E illustrates a partial, front perspective view of the fuse compartment 2309 of the 38 kV utility metering cabinet 2300 shown in FIG. 23A. The fuse compartment 2309 accommodates the fuse clip buses 1832 and 1833 configured to connect the voltage transformer disconnect switch 1800 shown in FIGS. 18A-18D to the fuse clips 1834. The fuse clips 1834 are configured to connect the input fuses of the voltage transformer to the multi-phase, main medium voltage bus. Since the 38 kV voltage transformer fuses are longer that those of the 15 kV voltage transformer or the 27 kV voltage transformer, the fuse clip buses 1832 and 1833 are longer and the fuse clips 1834 are larger to accommodate larger fuses. Utilities typically supply their own fuses that vary from utility to utility and, therefore, the fuses are not supplied by a manufacturer of the medium voltage switchgear.

FIG. 23F illustrates a partial, rear perspective view of the 38 kV utility metering cabinet 2300 shown in FIG. 23A, showing a phase current transformer and cable bus 2311 and a ground bus 2312 in the current transformer and cable compartment 2310. The phase current transformer and cable bus 2311 connects to the main bus 1831 illustrated in FIG. 23G via the voltage transformer switch input bus 1811 illustrated in FIG. 18A and FIG. 23D which serves as a riser bus. The main bus 1831 is disposed at the top of the enclosure 2301 as illustrated in FIG. 23D and FIG. 23G. The voltage transformer switch input bus 1811 is behind the metal barrier 2313 illustrated in FIG. 23F. The main bus 1831 in turn connects to adjacent medium voltage, metal-enclosed switchgear sections (not shown) that incorporate either a load interrupter (LI) switch or a vacuum circuit breaker. The rear outer doors 2306 and 2307 of the 38 kV utility metering cabinet 2300 illustrated in FIG. 23C, are opened to expose the current transformer and cable compartment 2310. In an embodiment, the phase bus 2311 comprises three phase buses 2311*a*, 2311*b*, and 2311*c*. The ground bus 2312 provides a path for fault current to safely dissipate into the ground, thereby preventing excessive current from flowing through conductive components in the enclosure 2301, minimizing the risk of overheating, fires, and equipment damage in the 38 kV utility metering cabinet 2300. Proper grounding also prevents any electric shock or injury for personnel touching the enclosure 2301 if there is a short circuit or an electrical fault, for example, a phase-to-ground fault. The ground bus 1817 illustrated in FIG. 18A is directly connected to the ground bus 2312 of the enclosure 2301 by a copper bus 1835 illustrated in FIG. 18A. The current transformer connections and the cable connections are housed in the current transformer and cable compartment 2310.

FIG. 23G illustrates a partial, right-side perspective view of the 38 kV utility metering cabinet 2300 shown in FIG. 23A, showing a direct connection of the voltage transformer switch input bus 1811 to the main bus 1831. In this embodiment, the voltage transformer switch input bus 1811 serves as a riser bus that directly connects to the main bus 1831, without a cable connection.

Figure 24A:
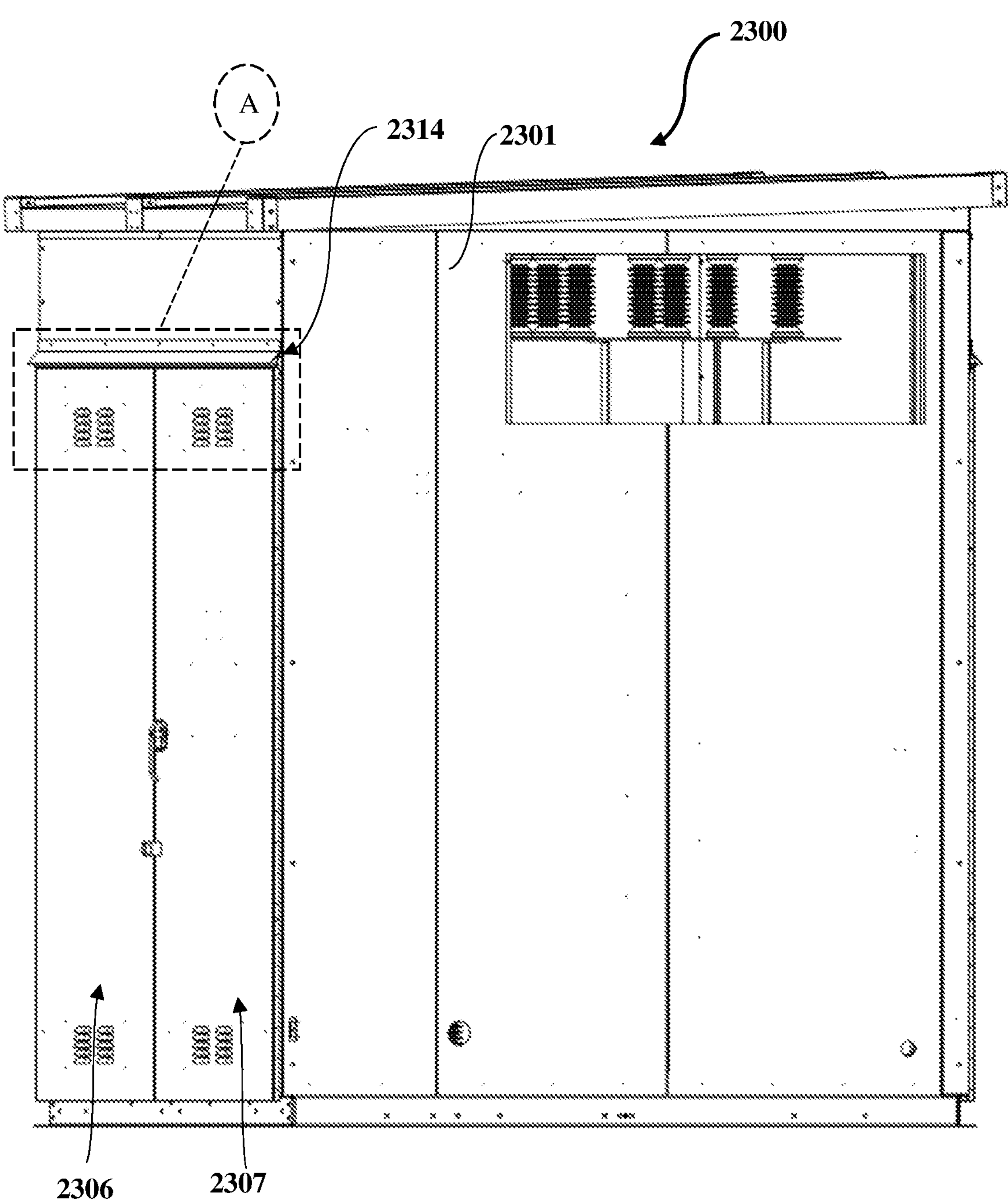
FIG. 24A illustrates a rear, side perspective view of the 38 kV utility metering cabinet shown in FIG. 23A, showing a rain shield assembly configured to prevent water from entering the 38 kV utility metering cabinet.

FIG. 24A illustrates a rear, side perspective view of the 38 kV utility metering cabinet 2300 shown in FIG. 23A, showing a rain shield assembly 2314 configured to prevent water from entering the 38 kV utility metering cabinet 2300. The enclosure 2301 of the 38 kV utility metering cabinet 2300 is configured to withstand predefined stringent rain tests comprising, for example, the Institute of Electrical and Electronics Engineers (IEEE) rain tests by using the rain shield assembly 2314.

Figure 24B:
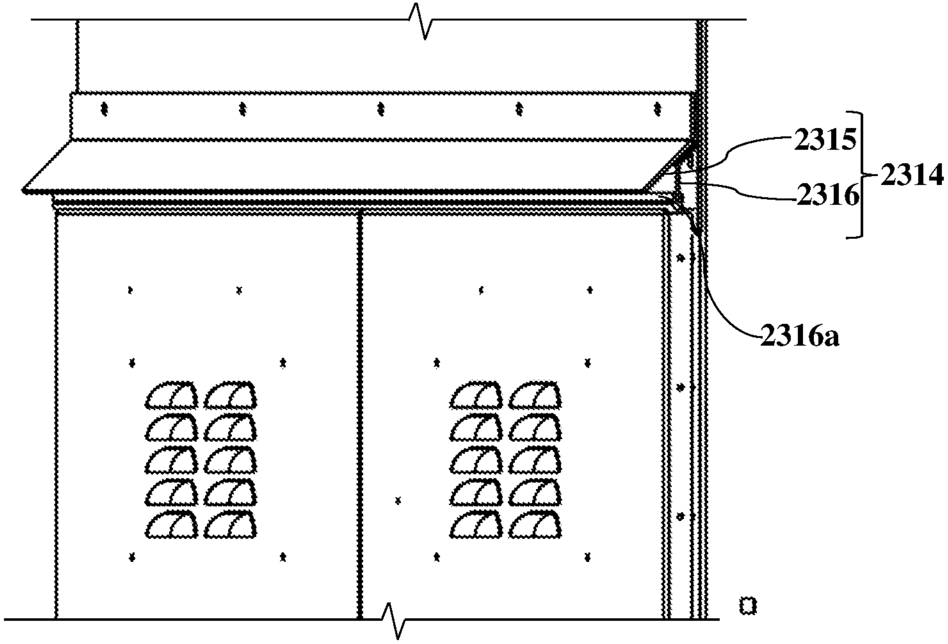
FIG. 24B illustrates an enlarged view of a portion marked A in FIG. 24A, showing the rain shield assembly.

FIG. 24B illustrates an enlarged view of a portion marked A in FIG. 24A, showing the rain shield assembly 2314. In an embodiment, the rain shield assembly 2314 comprises a first shield 2315 and a second shield 2316 with a gasket 2316*a*. The first shield 2315 is configured to prevent water from entering the enclosure 2301 from the top of the enclosure 2301. The first shield 2315 prevents water from entering the enclosure 2301 from the top of the enclosure 2301 during an American National Standards Institute (ANSI) rain test as disclosed in the description of FIG. 25. The second shield 2316 with the gasket 2316*a* is configured to prevent water directed at the enclosure 2301 via wind gusts. The second shield 2316 with the gasket 2316*a* prevents rain entering during an IEEE rain test that simulates, for example, about 30 miles per hour (mph) wind gusts.

The large 74-inch wide 38 kV utility metering cabinet 2300 prevents water from entering the enclosure 2301. The inner doors 2304 and 2305 in the 38 kV utility metering cabinet 2300 illustrated in FIG. 23B prevent water from entering the front of the enclosure 2301. The rain shield assembly 2314 prevents entry of rain into the enclosure 2301 in the rear of the 38 kV utility metering cabinet 2300. The rain shield assembly 2314 prevents rain from seeping between the rear doors 2306 and 2307 of the 38 kV utility metering cabinet 2300, coming in contact with live parts, and touching the ground bus 2312 at the bottom in the current transformer and cable compartment 2310 at the rear of the 38 kV utility metering cabinet 2300 illustrated in FIG. 23F. The rain shield assembly 2314 has been successfully proven to pass the stringent ANSI/IEEE rain tests performed on the enclosure 2301 of the 38 kV utility metering cabinet 2300.

Figure 25:
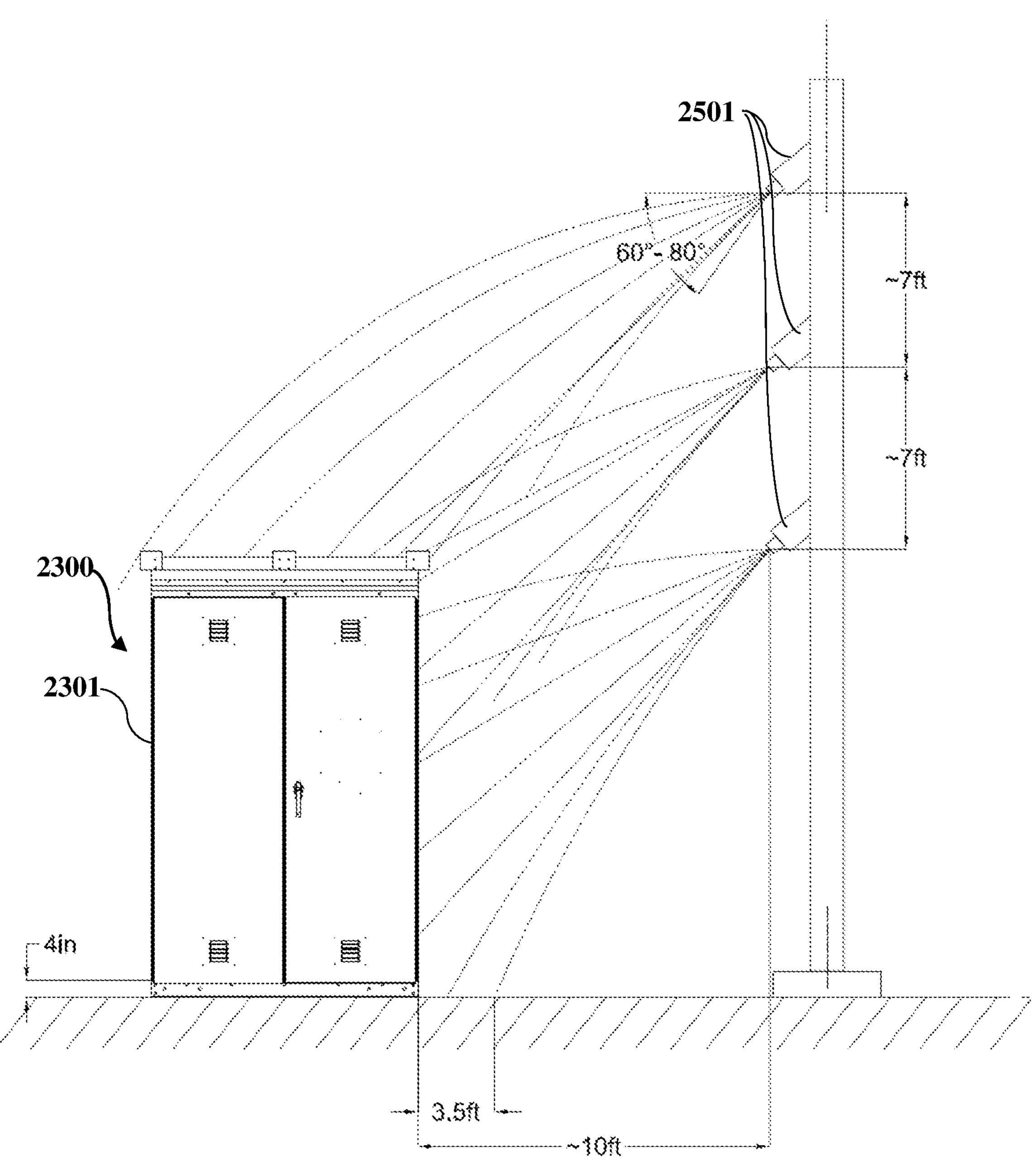
FIG. 25 illustrates a schematic showing an arrangement of nozzles for performing stringent rain tests on an enclosure of the utility metering cabinet of the medium voltage switchgear.

FIG. 25 illustrates a schematic showing an arrangement of nozzles 2501 for performing a stringent rain test on the enclosure 2301 of the 38 kV utility metering cabinet 2300 of the medium voltage switchgear shown in FIGS. 23A-23D and FIG. 23F. In an example, the American National Standards Institute (ANSI) rain test requires three nozzles 2501 at three different heights spraying jets of water, each at 60 pounds per square inch (psi), on each side of the enclosure 2301 of the 38 kV utility metering cabinet 2300 as illustrated in FIG. 25. The nozzles 2501 are spaced, for example, about 7 feet apart from each other. The 38 kV utility metering cabinet 2300 of the medium voltage switchgear is at a distance of, for example, about 10 feet away from the nozzles 2501. The rain shield assembly 2314 of the 38 kV utility metering cabinet 2300 illustrated in FIGS. 24A-24B has successfully proven to pass the stringent ANSI rain test performed on the enclosure 2301 of the 38 kV utility metering cabinet 2300.

The voltage transformer switch assembly disclosed herein provides a medium voltage transformer disconnect switch for a 5 kV, 15 kV, 27 kV, and 38 kV utility metering section of a medium voltage, metal-enclosed switchgear. The unified design of the voltage transformer disconnect switch is adapted for different voltage ratings by suitable changes in the length of the insulators used and the components used for insulation such as Glastic© GPO-3 barriers. The voltage transformer switch assembly disclosed herein uses a standard off-the-shelf switch handle assembly and a chain drive that are adapted to operate the voltage transformer disconnect switch efficiently. The clips in the voltage transformer switch assembly are shaped such that there is a tight connection when the switch blades are engaged in the clips. The voltage transformer switch assembly utilizes spring pins to secure the insulator and switch blade assembly that snap into place without additional hardware and assembly time. The chain drive of the voltage transformer disconnect switch interface prevents the switch handle of the switch handle assembly from operating more than 180 degrees top to bottom by a suitable slot or groove in the arm for the transfer of motion between the switch handle and the voltage transformer disconnect switch. The safety interlocking devices, for example, the KIRK® keys, incorporated in the enclosure of the utility metering section provide safety for opening and closing of the fuse compartment, thereby ensuring that the voltage transformer disconnect switch is grounded before the fuse compartment can be opened for maintenance. Furthermore, the enclosure is configured to meet National Electrical Manufacturers Association (NEMA) 3R Category A requirements and withstand IEEE stringent rain tests. The voltage transformer switch compartment, the fuse compartment, and the current transformer and cable compartment in the enclosure of the utility metering section of the medium voltage switchgear are arranged to meet Electric Utility Service Equipment Requirements Committee (EUSERC) requirements and are flexible to meet other utility requirements for the utility metering section of the medium voltage switchgear. The rain shield assembly for the wide 38 kV utility metering section prevents water from entering the enclosure via a gap between the twin doors in the rear of the enclosure.

The utility metering section of the medium voltage switchgear disclosed herein meets predefined utility requirements, for example, the Electric Utility Service Equipment Requirements Committee (EUSERC) requirements, without affecting the design of the voltage transformer disconnect switch. The voltage transformer disconnect switch at various operating voltages withstands both dielectric and lightning impulse voltages that depend on the operating voltage. When designs for 5 kV and 15 kV voltage classes are combined into a single product, the combined design meets the requirements for a 15 kV voltage class. Since the voltage transformer disconnect switch disclosed herein carries a low current, and is not required to open when energized, a low current rating of, for example, about 20 amperes (20 A) is more than sufficient, thereby rendering a low-cost, optimized design that is simple and easy to manufacture for utility metering.

The voltage transformer disconnect switch meets Underwriters Laboratories (UL) safety requirements for mechanical and environmental factors. The voltage transformer disconnect switch passes all UL rain tests and UL mechanical and electrical safety tests. The voltage transformer disconnect switch operates 500 cycles continuously without failure in conjunction with the safety interlocking devices to meet UL safety requirements. The voltage transformer disconnect switch follows the Electric Utility Service Equipment Requirements Committee (EUSERC) guidelines and accommodates minor changes, for example, enclosure dimensional changes, number of current transformers connected therewithin such as three (3) current transformers instead of two (2) current transformers, etc., required by other utilities that are not members of the EUSERC. Since the basic insulation level (BIL) and dielectric test voltages are different, the clearance and creepage distances required are also different. Therefore, sizes of the enclosures for different voltage classes are also different. The 38 kV voltage transformer disconnect switch is much larger than the 15 kV voltage transformer disconnect switch or the 27 kV voltage transformer disconnect switch. Consequently, the enclosure for the 15 kV voltage transformer disconnect switch is the smallest of the enclosures of the three voltage transformer disconnect switch designs.

The voltage transformer disconnect switch disclosed herein meets Category A safety requirements. As the enclosure of the voltage transformer disconnect switch is designed to meet Category A requirements, the enclosure also meets the requirements of Category B and Category C by elimination of some design features that are not necessary. In addition to a stringent rain test that simulates rain driven by 30 miles per hour (mph) wind at the rate of 0.2 inch per minute per vertical surface for 5 minutes, the enclosure of the utility metering section that houses the voltage transformer disconnect switch meets the mechanical tests for the enclosure and door handles. For safety, the outer doors of the enclosure protect all viewing windows. Furthermore, the enclosure passed an electrical rod entry test that was performed to ensure that a 0.5-inch or 13-millimeter (mm) diameter rod inserted through any opening in the enclosure does not touch any live parts inside the enclosure. The voltage transformer disconnect switch disclosed herein is a simple, low-cost, easy-to-build, and easy-to-manufacture switch that is fully tested to all applicable safety standards defined, for example, by the American National Standards Institute (ANSI), the Institute of Electrical and Electronics Engineers (IEEE), the Underwriter Laboratories (UL), and the Canadian Standards Association (CSA). The enclosure that houses the voltage transformer disconnect switch fulfils stringent ANSI test requirements and meets ANSI/IEEE Category A requirements for safety. The voltage transformer disconnect switch has an optimal design with a low current rating of, for example, about 20 amperes, for voltage transformer disconnection applications.

The utility metering section, for example, the medium voltage, metal-enclosed utility metering cabinet, of the medium voltage switchgear disclosed herein provides flexibility and cost savings of a completely factory-assembled, primary utility metering cabinet, where a customer can choose voltage transformers and current transformers to be incorporated therein. A utility typically installs the voltage transformers and the current transformers in the utility metering cabinet onsite. A manufacturer, therefore, supplies the utility metering cabinet without the voltage transformers and the current transformers. Provisions are made such that the mounting brackets provided at the bottom end of the enclosure meet utility requirements as defined by the Electric Utility Service Equipment Requirements Committee (EUSERC) or a specific utility if the utility is not a member of the EUSERC. Moreover, the customer is provided the flexibility of choosing between three distinct voltage transformer disconnect switches, that is, the 5 kV/15 kV voltage transformer disconnect switch, the 27 kV voltage transformer disconnect switch, and the 38 kV voltage transformer disconnect switch based on required features and advantages. The open/closed position of the voltage transformer disconnect switch is easily viewable through viewing windows, ensuring safety of the utility metering section during maintenance.

The foregoing examples and illustrative implementations of various embodiments have been provided merely for explanation and are in no way to be construed as limiting the embodiments disclosed herein. Dimensions of various parts of the voltage transformer switch assembly and the utility metering section disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A voltage transformer switch assembly for a utility metering section of a medium voltage switchgear, the voltage transformer switch assembly comprising:

a voltage transformer disconnect switch housed in a voltage transformer switch compartment of the utility metering section of the medium voltage switchgear, wherein the voltage transformer disconnect switch comprises a plurality of switch blades, one for each phase of a voltage transformer switch input bus, wherein the switch blades are mounted between insulators in the voltage transformer switch compartment;

pin members configured to snap into place and secure the insulators to the switch blades sandwiched therebetween in the voltage transformer switch compartment;

a plurality of clips configured to connect the voltage transformer disconnect switch to one of a main bus via the voltage transformer switch input bus, and a ground bus, wherein the clips comprising upper main power clips and lower grounding clips are configured for a tight connection to the switch blades, when the switch blades are engaged with the clips; and a switch handle assembly operably connected to the voltage transformer disconnect switch via a drive system, wherein the switch handle assembly comprises a switch handle configured to operate the voltage transformer disconnect switch.

2. The voltage transformer switch assembly of claim 1, wherein the switch blades are connected to the ground bus to ground the voltage transformer disconnect switch for safety during maintenance and service.

3. The voltage transformer switch assembly of claim 1, wherein upper parts of the switch blades are configured to connect to one of: (a) the voltage transformer switch input bus that connects a voltage transformer to the main bus of the utility metering section via cables; and (b) the ground bus for safety.

4. The voltage transformer switch assembly of claim 1, wherein upper parts of the switch blades are configured to engage with the upper main power clips for connections to the voltage transformer switch input bus and with the lower grounding clips for connections to the ground bus.

5. The voltage transformer switch assembly of claim 1, wherein the utility metering section comprises a fuse compartment disposed in a front, bottom location of the utility metering section, wherein the fuse compartment is configured to accommodate a voltage transformer and input fuses of the voltage transformer.

6. The voltage transformer switch assembly of claim 5, further comprising first fuse clips disposed in the fuse compartment of the utility metering section, wherein lower parts of the switch blades are configured to engage with the first fuse clips for lower bus connections in the fuse compartment.

7. The voltage transformer switch assembly of claim 6, further comprising second fuse clips installed on fuse clip buses disposed in the fuse compartment of the utility metering section, wherein the fuse clip buses are configured to connect the voltage transformer disconnect switch to the second fuse clips, and wherein the second fuse clips are configured to connect the input fuses of the voltage transformer to the voltage transformer switch input bus.

8. The voltage transformer switch assembly of claim 7, wherein lower parts of the switch blades are connected to upper ones of the fuse clip buses in the fuse compartment using the first fuse clips.

9. The voltage transformer switch assembly of claim 7, wherein lower parts of the switch blades are connected to upper ones of the fuse clip buses in the fuse compartment using braided copper elements.

10. The voltage transformer switch assembly of claim 5, further comprising safety interlocking devices connected to the switch handle assembly and to a door of the fuse compartment of the utility metering section, wherein the safety interlocking devices are configured to provide safety for opening and closing of the fuse compartment, ensuring that the voltage transformer disconnect switch is grounded before the fuse compartment is opened for maintenance.

11. The voltage transformer switch assembly of claim 5, wherein rails and mounting brackets are disposed at a bottom end of the fuse compartment of the utility metering section, wherein the rails and the mounting brackets are configured to mount the voltage transformer in the fuse compartment in accordance with predefined utility requirements.

12. The voltage transformer switch assembly of claim 5, wherein the utility metering section further comprises a current transformer and cable compartment disposed in a rear location of the utility metering section and configured to house current transformers and the main bus, wherein the voltage transformer switch compartment disposed in a front, upper location of the utility metering section, the fuse compartment, and the current transformer and cable compartment are arranged to meet predefined utility requirements comprising Electric Utility Service Equipment Requirements Committee (EUSERC) requirements for the utility metering section of the medium voltage switchgear.

13. The voltage transformer switch assembly of claim 1, wherein the drive system is a chain drive comprising a chain wrapped around a first sprocket wheel and a second sprocket wheel, wherein the first sprocket wheel is connected to the switch handle assembly, and the second sprocket wheel is operably connected to an end one of the insulators to facilitate smooth motion of the voltage transformer disconnect switch and the switch handle.

14. The voltage transformer switch assembly of claim 13, wherein the second sprocket wheel is further operably connected to a fixed bracket and a moving bracket via a shaft configured to facilitate motion of the switch handle, wherein the moving bracket is operably connected to the end one of the insulators via an arm of the voltage transformer switch assembly, wherein the arm is configured as a sheet metal bracket comprising grooves cut thereinto, and wherein the grooves of the arm are configured to restrict motion of the moving bracket to only about 90 degrees via bushings moving within the grooves of the arm.

15. The voltage transformer switch assembly of claim 14, wherein the arm and the moving bracket define an interface between the drive system and the voltage transformer disconnect switch to prevent the switch handle from operating more than about 180 degrees from a top position to a bottom position, wherein the grooves of the arm are configured to transfer motion between the moving bracket and the voltage transformer disconnect switch, and wherein the moving bracket is configured to move only about 90 degrees about the shaft to move the switch blades from a connected position to a grounded position.

16. The voltage transformer switch assembly of claim 1, further comprising support clamps bolted between the insulators and configured to support the insulators within the voltage transformer switch assembly, wherein the support clamps comprise U-shaped openings configured to accommodate and support the insulators.

17. The voltage transformer switch assembly of claim 1 disposed in an enclosure configured to meet predefined electrical enclosure requirements comprising National Electrical Manufacturers Association (NEMA) 3R requirements and the American National Standards Institute (ANSI)/the Institute of Electrical and Electronics Engineers (IEEE) Category A requirements.

18. The voltage transformer switch assembly of claim 17, wherein the enclosure is further configured to withstand predefined stringent rain tests comprising the Institute of Electrical and Electronics Engineers (IEEE) rain test and the American National Standards Institute (ANSI) rain test by using a rain shield assembly, wherein the rain shield assembly comprises:

a first shield configured to prevent water from entering the enclosure from top of the enclosure; and a second shield with a gasket configured to prevent water directed at the enclosure via wind gusts.

19. The voltage transformer switch assembly of claim 1 adapted for a substantially low current rating and a plurality of voltage ratings comprising 5 kilovolts, 15 kilovolts, 27 kilovolts, and 38 kilovolts.

* * * * *